(12) United States Patent
Hattori et al.

(10) Patent No.: US 11,960,967 B2
(45) Date of Patent: Apr. 16, 2024

(54) INFORMATION PROCESSING SYSTEM, AREA DETERMINATION METHOD, AND MEDIUM

(71) Applicant: PFU LIMITED, Kahoku (JP)

(72) Inventors: Katsuhiro Hattori, Kahoku (JP);
Yutaka Harano, Kahoku (JP);
Tomoaki Wada, Kahoku (JP); Ken Yanai, Kahoku (JP)

(73) Assignee: PFU LIMITED, Kahoku (JP)

( * ) Notice: Subject to any disclaimer, the term of this patent is extended or adjusted under 35 U.S.C. 154(b) by 259 days.

(21) Appl. No.: 17/240,279

(22) Filed: Apr. 26, 2021

(65) Prior Publication Data
US 2021/0390326 A1    Dec. 16, 2021

(30) Foreign Application Priority Data

Apr. 28, 2020 (JP) ................................ 2020-078785
Apr. 22, 2021 (JP) ................................ 2021-072545

(51) Int. Cl.
*G06K 9/00* (2022.01)
*G06K 7/14* (2006.01)
(Continued)

(52) U.S. Cl.
CPC .............. *G06K 7/1447* (2013.01); *G06T 3/40* (2013.01); *G06T 3/60* (2013.01); *G06T 5/50* (2013.01);
(Continued)

(58) Field of Classification Search
CPC . G06T 2207/30176; G06T 3/60; G06T 3/602; G06T 3/608; G06T 7/70;
(Continued)

(56) References Cited

U.S. PATENT DOCUMENTS 6,798,905 B1    9/2004  Sugiura et al.
9,373,031 B2 *  6/2016  Ghessassi ............... G06F 16/93
(Continued)

FOREIGN PATENT DOCUMENTS

JP       2000-32247 A      1/2000
JP       2010-262578 A     11/2010
(Continued)

OTHER PUBLICATIONS

Non-Final Office Action dated May 9, 2023, issued in U.S. Appl. No. 17/230,287. (12 pages).
Related co-pending U.S. Appl. No. 17/230,287.

*Primary Examiner* — Emily C Terrell
*Assistant Examiner* — Kevin M Coomber
(74) *Attorney, Agent, or Firm* — WHDA, LLP

(57) ABSTRACT

An information processing system, which determines a partial area used in an erectness determination which determines whether a determination target image is erect based on a determination feature in the partial area in an image having a predetermined format and a position of the partial area in a state in which the image having the predetermined format is erect, includes processor to receive input of a plurality of learning images having the predetermined format, extract area common to the plurality of learning images in an erect state as a candidate for the partial area, determine common area reliability indicative of a degree to which the candidate for the partial area is suitable as the partial area used in the erectness determination, and determine the partial area used in the erectness determination from the candidate for the partial area, based on the common area reliability.

19 Claims, 29 Drawing Sheets

(51) Int. Cl.
  *G06T 3/40* (2006.01)
  *G06T 3/60* (2006.01)
  *G06T 5/50* (2006.01)
  *G06T 7/33* (2017.01)
  *G06T 7/70* (2017.01)
  *G06T 7/73* (2017.01)

(52) U.S. Cl.
  CPC ............... *G06T 7/337* (2017.01); *G06T 7/70* (2017.01); *G06T 7/74* (2017.01); *G06T 2207/20081* (2013.01); *G06T 2207/20104* (2013.01); *G06T 2207/30176* (2013.01)

(58) Field of Classification Search
  CPC .. G06T 7/74; G06T 7/337; G06T 3/40; G06T 2207/20081; G06T 2207/20104; G06T 7/73; G06V 10/751; G06V 30/40; G06K 7/1456; G06K 7/1447
  See application file for complete search history.

(56) References Cited

U.S. PATENT DOCUMENTS

| | | | | |
|---|---|---|---|---|
| 10,616,443 | B1 * | 4/2020 | Lund | G06V 10/242 |
| 10,867,171 | B1 * | 12/2020 | Contryman | G06V 10/242 |
| 11,610,066 | B2 * | 3/2023 | Downs | G06F 40/186 |
| 2003/0099395 | A1 * | 5/2003 | Wang | H04N 1/00002 382/165 |
| 2007/0071359 | A1 * | 3/2007 | Yumoto | G06V 10/7515 382/209 |
| 2007/0168382 | A1 * | 7/2007 | Tillberg | G06F 16/5846 707/E17.084 |
| 2009/0164894 | A1 | 6/2009 | Takekawa et al. | |
| 2009/0297038 | A1 * | 12/2009 | Ishikawa | G06T 7/74 382/209 |
| 2009/0316235 | A1 * | 12/2009 | Morimoto | H04N 1/00408 358/527 |
| 2012/0038941 | A1 * | 2/2012 | Megawa | G03G 21/04 358/1.14 |
| 2013/0148863 | A1 * | 6/2013 | Muraishi | G06T 7/33 382/112 |
| 2014/0231512 | A1 * | 8/2014 | Onischuk | G07C 13/00 235/386 |
| 2017/0220545 | A1 * | 8/2017 | Gururajan | G06F 40/106 |
| 2021/0240978 | A1 * | 8/2021 | Steeves | G06V 10/82 |

FOREIGN PATENT DOCUMENTS

| | | | | |
|---|---|---|---|---|
| JP | 2014-134963 A | 7/2014 | | |
| WO | 2007/142227 A1 | 12/2007 | | |
| WO | WO-2020090010 A1 * | 5/2020 | | G06T 7/20 |

* cited by examiner

FIG. 11

| DETERMINATION TARGET IMAGE No. | APPLICATION ORDER | MATCHING RESULT |
|---|---|---|
| 1 | A⇒B⇒C⇒D | NO |
| 2 | A⇒B⇒C⇒D | C |
| 3 | C⇒A⇒B⇒D | B |
| 4 | B⇒C⇒A⇒D | B |
| 5 | B⇒C⇒A⇒D | B |
| 6 | B⇒C⇒A⇒D | B |

FIG. 18

| LEARNING IMAGE 1 | LEARNING IMAGE 2 |
|---|---|

(Learning Image 1: blank invoice template with fields INVOICE, MESSRS, INVOICE No., SUBJECT, ○○CO., LTD., TEL, FAX, E-mail, IN CHARGE, TOTAL PRICE ¥0 (TAX INCLUDED), table with columns NO./DESCRIPTION/QUANTITY/UNIT PRICE/PRICE (empty), BANK DETAILS, XX BANK-YY-BRANCH, CURRENT ACCOUNT 0123456, SUB TOTAL ¥0, SALES TAX ¥0, TOTAL ¥0, REMARKS)

(Learning Image 2: filled invoice with ○○CO., LTD., SUBJECT YYYYYYYY, table data:)

| NO. | DESCRIPTION | QUANTITY | UNIT PRICE | PRICE |
|---|---|---|---|---|
|  | AA-4100 | 3 | 5,420 | ¥16,260 |
|  | BB-4200 | 10 | 1,980 | ¥19,800 |

| | |
|---|---|
| SUB TOTAL | ¥36,060 |
| SALES TAX | ¥3,606 |
| TOTAL | ¥39,666 |

REMARKS XXXXXXXX

FIG. 19

PER-COMBINATION CANDIDATE FOR FEATURE AREA
BASED ON LEARNING IMAGES 1 AND 2

FIG. 20

| PER-COMBINATION CANDIDATE FOR FEATURE AREA BASED ON LEARNING IMAGES 1 AND 2 | PER-COMBINATION CANDIDATE FOR FEATURE AREA BASED ON LEARNING IMAGES 3 AND 4 |
|---|---|

Left invoice (based on learning images 1 and 2):

INVOICE

△△COMPANY MESSRS.    INVOICE No.

SUBJECT: YYYYYYY    ○○CO., LTD.
TEL:
FAX:
E-mail:    ~81
IN CHARGE:

TOTAL PRICE ¥39,666 (TAX INCLUDED)

| NO. | DESCRIPTION | QUANTITY | UNIT PRICE | PRICE |
|---|---|---|---|---|
|  | AA-4100 | 3 | 5,420 | ¥16,260 |
|  | BB-4200 | 10 | 1,980 | ¥19,800 |

BANK DETAILS
XX BANK YY BRANCH
CURRENT ACCONT
0123456

| SUB TOTAL | ¥36,060 |
| SALES TAX | ¥3,606 |
| TOTAL | ¥39,666 |

REMARRKS    XXXXXXXX

Right invoice (based on learning images 3 and 4):

INVOICE

XYEK MESSRS.    INVOICE No.

SUBJECT: AAAAAAA    ○○CO., LTD.
TEL:
FAX:
E-mail:    ~82
IN CHARGE: AAAAA

TOTAL PRICE ¥12,100 (TAX INCLUDED)

| NO. | DESCRIPTION | QUANTITY | UNIT PRICE | PRICE |
|---|---|---|---|---|
| 1 | eeeff | 1 | 1,000 | ¥1,000 |
| 2 | gggg | 2 | 5,000 | ¥10,000 |

BANK DETAILS
XX BANK ZZ BRANCH
CURRENT ACCONT
21354

| SUB TOTAL | ¥11,000 |
| SALES TAX | ¥1,100 |
| TOTAL | ¥12,100 |

REMARRKS    erffffffff

FIG. 21

CANDIDATE FOR FEATURE AREA

INVOICE

XYEK MESSRS.  INVOICE No.

SUBJECT: AAAAAAA

○○CO., LTD.

TEL:
FAX: ~83
E-mail:
IN CHARGE: AAAAA

TOTAL PRICE ¥12,100 (TAX INCLUDED)

| NO. | DESCRIPTION | QUANTITY | UNIT PRICE | PRICE |
|---|---|---|---|---|
| 1 | eeeff | 1 | 1,000 | ¥1,000 |
| 2 | gggg | 2 | 5,000 | ¥10,000 |
|  |  |  |  |  |
|  |  |  |  |  |
|  |  |  |  |  |
|  |  |  |  |  |
|  |  |  |  |  |

BANK DETAILS

XX BANK ZZ BRANCH
CURRENT ACCONT
21354

| SUB TOTAL | | ¥11,000 |
|---|---|---|
| SALES TAX | | ¥1,100 |
| TOTAL | | ¥12,100 |

REMARRKS  erffffffff

INFORMATION PROCESSING SYSTEM, AREA DETERMINATION METHOD, AND MEDIUM

CROSS-REFERENCE TO RELATED APPLICATION

This application is based upon and claims the benefit of priority of the prior Japanese Patent Applications No. JP2020-078785, filed on Apr. 28, 2020 and No. JP2021-072545, filed on Apr. 22, 2021, the entire contents of which are incorporated herein by reference.

FIELD

The present disclosure relates to a technique for determining the orientation of an image.

BACKGROUND

Conventionally, there is proposed a method for determining a vertical direction of an input image more accurately without incorporating a special equipment for detecting an inclination in an image acquisition apparatus. In the method, an object candidate detection means detects object candidates from the input image and their angles in the input image, a similarity degree calculation means calculates the degree of similarity between each detected object candidate and each pre-stored object, an input image angle calculation means determines the vertical direction of the input image based on the calculated degree of similarity of each object candidate and the angle in the input image, and, for example, the input image angle calculation means carries out weighting for the angle of each object candidate in the input image based on the degree of similarity, and calculates an inclination angle with respect to the vertical direction of the input image by using the weighted angle (see WO 2007/142227).

In addition, conventionally, there is proposed a method which includes an extraction section which extracts, from a plurality of first images each including orientation information indicative of a vertical direction of an image, a group of feature points which are included in common in at least two of the plurality of first images, a detection section which detects, from the group of feature points extracted in the extraction section, a group of feature points which are distributed in a specific positional relationship with respect to the vertical direction in at least two first images, a retrieval section which retrieves the group of feature points detected in the detection section in a second image which does not have the orientation information, and a determination section which determines the orientation of the second image based on a comparison between a positional relationship of the group of feature points found by the retrieval section and a specific positional relationship corresponding to the group of feature points (see Japanese Patent Application Publication No. 2014-134963).

There is proposed an image recognition apparatus in which an area division section divides image data, which is output from an image signal processing section and is binarized, into a plurality of areas, a reliability determination section determines, for each division area, reliability in the case where the division area is used in vertical direction recognition, and a vertical direction recognition section obtains character data from the area having the highest value of the reliability and executes vertical direction recognition processing (see Japanese Patent Application Publication No. 2000-032247).

There is proposed a form dictionary generation apparatus having a feature extraction means for extracting feature information indicative of a feature of a form from each of model images of a plurality of forms specified as forms of the same type, a common information generation means for generating common information indicative of features of common cells formed by lines common to a plurality of the model images, based on the feature information extracted for each model image, a neglected area determination means for determining, in the case where a cell having a feature different from that of each common cell is present among cells corresponding to the common cell in each model image, that an area of the common cell is a neglected area in recognition of the form, based on the common cell information and the feature information of each model image, and a dictionary generation means for generating data including the common information and information indicative of the neglected area as dictionary data to recognize the form (see Japanese Patent Application Publication No. 2010-262578).

SUMMARY

Conventionally, when a document such as a form is scanned, there are cases where a scanned image which is not erect is obtained, and hence an operation in which a user visually checks the orientations of the scanned images and manually rotates the images having different orientations such that the images have the same predetermined orientation is performed. In addition, in order to increase the efficiency of such an operation, there is proposed a technique for determining the orientation of an image by performing optical character recognition (OCR) processing on a scanned image to determine whether characters are erect. There are cases where a face of a person or a two-dimensional barcode is used as a target in addition to the characters and, in general, a determination of whether objects including the above targets for which a recognition method is established are erect is used in the determination described above. However, in some cases, the recognition method assumed in advance does not work such as the case where an image has a feature which is difficult to recognize by the recognition method or the case where extremely high determination accuracy is required, and an erroneous determination has occurred in the determination of the image orientation.

In view of the above problem, an object of the present disclosure is to increase accuracy in an image orientation determination.

An example of the present disclosure is an information processing system, which determines a partial area used in an erectness determination which determines whether an input determination target image is erect based on a determination feature in the partial area in an image having a predetermined format and a position of the partial area in a state in which the image having the predetermined format is erect, including a processor to receive input of a plurality of learning images having the predetermined format, extract one or more areas common to the plurality of learning images in an erect state as candidates for the partial area, each of which is a candidate for the partial area used in the erectness determination, determine, for each of one or more candidates for the partial area, common area reliability indicative of a degree to which the candidate for the partial area is suitable as the partial area used in the erectness determination, and determine one or more partial areas used in the erectness determination from the one or more candidates for the partial area, based on the common area reliability.

The present disclosure can be understood as an information processing apparatus, a system, a method which is executed by a computer, or a program which a computer is caused to execute. In addition, the present disclosure can also be understood as a non-transitory computer-readable recording medium which can be read by a computer, a device, a machine or the like, which records such a program. Here the recording medium, which can be read by a computer or the like, is a recording medium which stores information such as data and programs by an electric, magnetic, optical, mechanical, or chemical function, and which can be read by a computer or the like.

According to the present disclosure, it becomes possible to increase the accuracy in the image orientation determination.

BRIEF DESCRIPTION OF THE DRAWINGS

FIG. 11 is a diagram showing an example in which the order of the feature area used for the erectness determination processing is changed according to the embodiment;

FIG. 18 is a diagram showing an example of a matching result according to the embodiment;

FIG. 19 is a diagram showing an example of a method for generating the per-combination candidate for the feature area according to the embodiment;

FIG. 20 is a diagram showing an example of a method for generating the candidate for the feature area according to the embodiment;

FIG. 21 is a diagram showing an example of the candidate for the feature area according to the embodiment;

DESCRIPTION OF EMBODIMENTS

Hereinbelow, embodiments of an information processing apparatus, an image orientation determination method, an information processing system, an area determination method and a program according to the present disclosure will be described with reference to the drawings. The following embodiments, however, are examples and are not intended to limit the information processing apparatus, the image orientation determination method, the information processing system, the area determination method and the program according to the present disclosure to the specific configurations described below. In implementation, specific configurations corresponding to the mode of implementation may be appropriately adopted, and various improvements and modifications may be made. In these embodiments, a case when the information processing apparatus, the image orientation determination method, the information processing system, the area determination method and the program according to the present disclosure are implemented in a system in which the orientation of an image of a scanned form is determined, will be described. Note that the information processing apparatus, the image orientation determination method, the information processing system, the area determination method and the program according to the present disclosure can be widely used in a technique for determining the orientation of a captured image, and an application target of the present disclosure is not limited to the examples described in these embodiments.

First Embodiment

System Configuration

Figure 1:
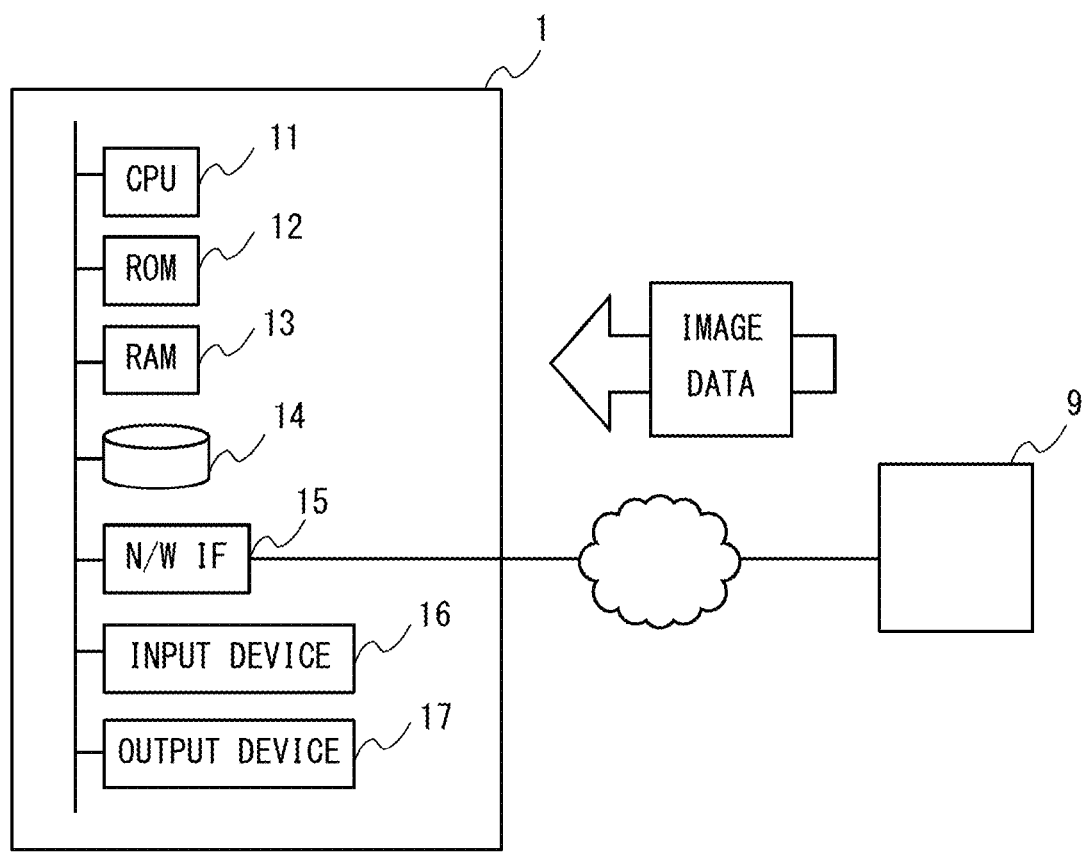
FIG. 1 is a schematic diagram showing a configuration of a system according to an embodiment.

FIG. 1 is a diagram showing the outline of the configuration of a system according to the present embodiment. The system according to the present embodiment includes an information processing apparatus 1 and an image acquisition apparatus 9 which are able to communicate with each other by being connected to a network.

The information processing apparatus 1 is a computer which includes a central processing unit (CPU) 11, a read only memory (ROM) 12, a random access memory (RAM) 13, a storage device 14 such as an electrically erasable and programmable read only memory (EEPROM) or a hard disk drive (HDD), a communication unit such as a network interface card (NIC) 15, an input device 16 such as a keyboard or a mouse, and an output device 17 such as a display. Note that the specific hardware configuration of the information processing apparatus 1 appropriately allows omission, replacement, or addition in accordance with the mode of implementation. In addition, the information processing apparatus 1 is not limited to an apparatus having a single cabinet. The information processing apparatus 1 may be implemented by a plurality of apparatuses which use a technique of what is called a cloud or distributed computing.

The image acquisition apparatus 9 is an apparatus which acquires an image, and examples of the image acquisition apparatus 9 include a scanner or a multifunction machine which acquires a document image by reading a document such as a form, and an imaging apparatus such as a digital camera or a smartphone which captures the image of a person or scenery.

Figure 2:
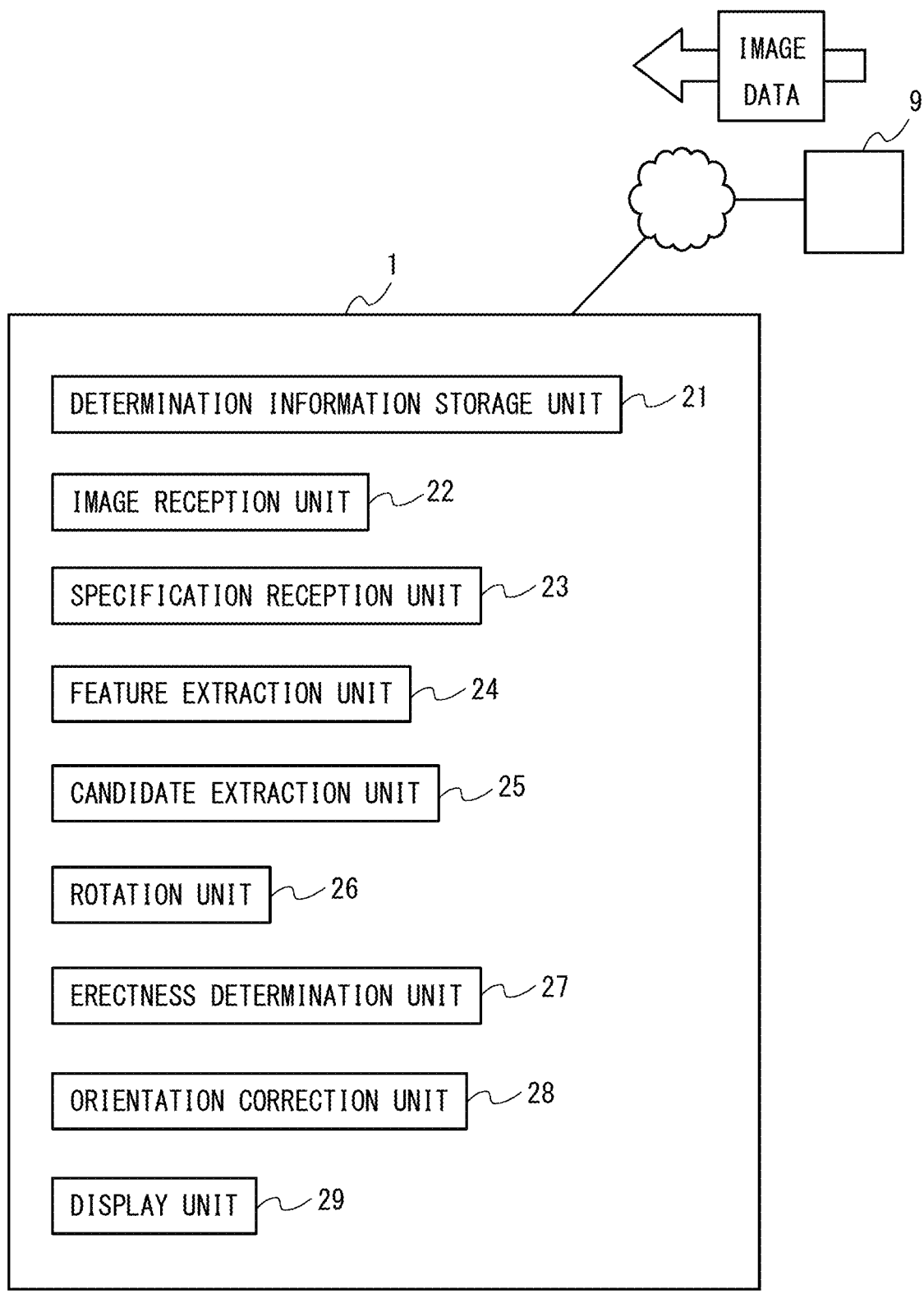
FIG. 2 is a diagram showing an outline of a functional configuration of an information processing apparatus according to the first embodiment.

FIG. 2 is a diagram showing an outline of a functional configuration of the information processing apparatus 1 according to the present embodiment. In the information processing apparatus 1, a program recorded in the storage device 14 is read into the RAM 13 and executed by the CPU 11 and each hardware provided in the information processing apparatus 1 is controlled, and the information processing apparatus 1 thereby functions as the information processing apparatus which includes a determination information storage unit (determination information database) 21, an image reception unit 22, a specification reception unit 23, a feature extraction unit 24, a candidate extraction unit 25, a rotation unit 26, an erectness determination unit 27, an orientation correction unit 28, and a display unit 29. Note that, in the present embodiment and another embodiment described later, the individual functions of the information processing apparatus 1 are executed by the CPU 11 serving as a multi-purpose processor, and part or all of the functions may also be executed by one or a plurality of dedicated processors.

The information processing apparatus 1 according to the present embodiment is implemented on, e.g., a cloud, receives a learning image having a predetermined format from the image acquisition apparatus 9 to thereby learn information (a determination feature in a feature area and a position of the feature area in an erect state) for determining the orientation of the image having the predetermined format, and stores the information in the determination information database 21. Subsequently, when the information processing apparatus 1 receives a determination target image (an image on which an erectness determination is to be performed) from the image acquisition apparatus 9, the information processing apparatus 1 determines whether the determination target image is erect by determining whether a feature corresponding to the determination feature is present at the position corresponding to the feature area in the determination target image.

The determination information storage unit (determination information database) 21 stores (registers) the information (determination information) for determining the orientation of the image having the predetermined format (predetermined format image). The predetermined format image is an image having a predetermined image at a predetermined position in an erect state, and includes, e.g., an image of a document having a predetermined format such as a form or other captured images (camera images or the like). In the present embodiment, the determination information storage unit 21 stores the determination feature in the feature area (an area having a feature) which is a predetermined partial area in the predetermined format image, and the position of the feature area in a state in which the predetermined format image is erect. Specifically, when the feature area is specified in the learning image having the predetermined format, the determination information storage unit 21 stores the determination feature in the specified feature area and the position of the feature area in a state in which the learning image is erect as the determination feature and the position for the image having the predetermined format.

For example, an area including a corporate name or logo, a document title, or a caution is selected as the feature area, and information for determining similarity between an image included in the area and a comparison target image such as image data, a feature point, or a feature amount in the feature area is stored as the determination feature. The determination information storage unit 21 stores the determination feature in one or a plurality of predetermined format images. In addition, in the present embodiment, while one feature area is registered for one predetermined format image, the feature area is not limited thereto, and a plurality of feature areas may also be registered for one predetermined format image.

In addition, the determination information storage unit 21 may use an area (extended area) obtained by adding a surrounding area to an area specified (selected) by a user as the feature area and store the determination feature. In the present embodiment, the feature area is determined by selection of the area in the learning image by the user. However, depending on an extraction method of the feature point, there are cases where the feature point cannot be extracted in predetermined bounds inside the edge of the selected area. Accordingly, in the present embodiment, the extended area is used as the feature area such that the feature points in the entire area specified by the user are detected. Note that the feature area is not limited to the extended area, and the area specified by the user itself may be used as the feature area.

In the case where the surrounding area goes beyond the edge of the predetermined format image, i.e., in the case where, when the area is extended, the extended area reaches the outside of the edge of a manuscript, the determination information storage unit 21 may add a margin area corresponding to a portion beyond the edge as the surrounding area, and store the determination feature.

Figure 3:
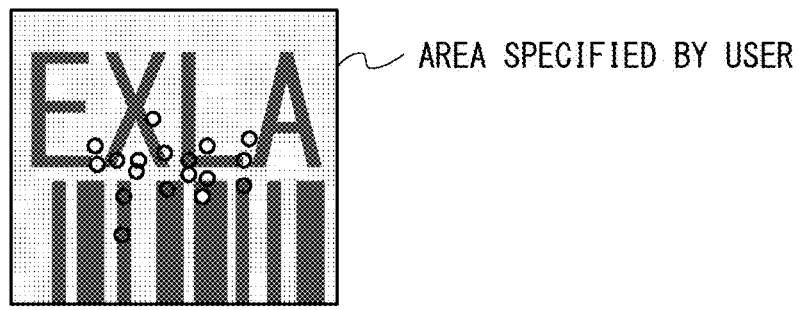
FIG. 3 is a diagram showing an example of a feature area before extension according to the embodiment.

FIG. 3 is a diagram showing an example of the feature area before the extension according to the present embodiment. As shown in FIG. 3, in the feature area before the extension, there are cases where the feature point at the edge portion such as the upper portion of a character is not detected. Therefore, in the present embodiment, for example, an area obtained by extending each of the upper, lower, left, and right sides of the area specified by the user by a predetermined width X px (e.g., 30 px) is used as the feature area.

Figure 4:
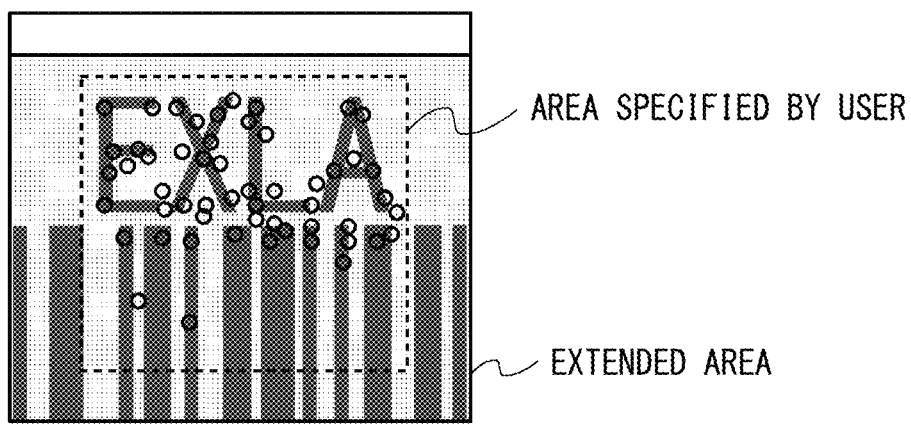
FIG. 4 is a diagram showing an example of the feature area after the extension according to the embodiment.

FIG. 4 is a diagram showing an example of the feature area after the extension according to the present embodiment. As shown in FIG. 4, in the feature area after the extension, it becomes possible to detect the feature points in the entire area (all characters) specified by the user.

Note that, in the example in FIG. 4, the area specified by the user is an area in the uppermost portion of the manuscript and the surrounding area position above the specified area goes beyond the edge of the image, and hence the margin area is added as the surrounding area. In addition, in this case, by setting the width of the margin area added from the edge of the manuscript to a width (e.g., 15 px) which is less than the width (X px) of the surrounding area to be added, an adjustment may be made such that a black area (an area of a black thick line (belt), or a black U-shaped or L-shape area) in the edge portion of the manuscript is not detected as the feature point. For example, in FIG. 4, the area in the uppermost portion of the manuscript is specified by the user. As a result, the margin area (surrounding area) having a width of 15 px is additionally provided on the upper side of the specified area, and the surrounding area having a width of 30 px is additionally provided on each of the lower, right, and left sides thereof.

In addition, the determination information storage unit 21 may store the determination feature at a resolution adjusted in accordance with the size of the feature area. At a worksite where a large amount of scanning is performed, it is necessary to quickly complete scan processing including the erectness determination of the images. However, in the case where the size of the feature area to be registered is large, the amount of data related to the determination feature used in the erectness determination is increased, and hence it may take time to perform the erectness determination (scan processing). To cope with this, in the present embodiment, the determination feature is stored at the resolution which is adjusted in accordance with the size of the feature area such that a reduction in processing speed is prevented while the feature point and the feature amount in the feature area are extracted. In this case, the resolution is adjusted so as to reduce as the size of the feature area increases.

For example, the determination feature is stored at a predetermined resolution (e.g., 300 dpi) for a feature area having a small size of, e.g., 0.3×0.3 inches or the like, and the determination feature is stored at a resolution lower than the predetermined value (e.g., 100 dpi) for a feature area having a large size of 2.0×2.0 inches or the like. Thus, by adjusting the resolution in accordance with the size of the feature area, even in the case where the area size of the feature area to be registered is large, it becomes possible to quickly complete scan processing including the erectness determination. Note that the resolution is adjusted in accordance with the size of the feature area in the present embodiment, but the adjustment of the resolution is not limited thereto, and the same resolution may be used for all feature areas irrespective of the size of the feature area.

In addition, the determination information storage unit 21 may store the size of the predetermined format image as the determination information. For example, when the erectness determination based on the determination information is performed in the case where a manuscript which is not related to a registered manuscript is scanned in erectness determination processing, processing time may be increased and an erroneous determination may occur. To cope with this, in the present embodiment, the size (width, height) of the predetermined format image (learning image) is stored as the determination information such that the erectness determination is not executed on an image of an unregistered manuscript or the like. With this, it becomes possible to determine that the erectness determination is not performed on the determination target image of which the size is not equal or close to the stored size of the predetermined format image.

The image reception unit 22 receives input of the learning image for learning (acquiring) information for determining the orientation of the image and the determination target image (the image on which the erectness determination is to be performed) serving as the determination target of the image orientation. The learning image and the determination target image are, e.g., images of documents such as a form and other captured images (camera images or the like). Note that the image reception unit 22 receives the input of these images from the image acquisition apparatus 9 in the present embodiment, but the image reception unit 22 is not limited thereto, and the image reception unit 22 may acquire (receive the input of) the image pre-stored in the storage device 14.

The specification reception unit 23 receives specification of the feature area in the learning image by the user. For example, a candidate for the feature area extracted by the candidate extraction unit 25 is selected by the user, and the specification reception unit 23 thereby receives the specification of the feature area. Note that, hereinafter, a method for selecting (specifying) a feature area from the candidates (feature proposal) extracted by the candidate extraction unit 25 by the user is referred to as "Auto".

In addition, bounds in the learning image are specified by a manual operation (a mouse operation or the like) by the user, and the specification reception unit 23 may thereby receive the specification of the feature area. Note that, hereinafter, a method in which bounds specification of the feature area is performed by the user is referred to as "Manual".

In addition, the candidate for the feature area extracted by the candidate extraction unit 25 in a proposed target area is selected by the user, and the specification reception unit 23 may thereby receive the specification of the feature area. Specifically, the specification reception unit 23 receives the bounds specification of the area (proposed target area) in the learning image from which the candidate for the feature area is to be extracted. Subsequently, when the candidate for the feature area is extracted in the proposed target area by the candidate extraction unit 25, the candidate is selected by the user and the specification reception unit 23 thereby receives the candidate for the feature area. Note that, hereinafter, a method in which the user selects (specifies) the feature area from the candidates extracted in the specified proposed target area is referred to as "Semi-auto".

The feature extraction unit 24 extracts the determination feature (a feature point, a feature amount, and image data) in the feature area specified in the learning image, and the position (an x coordinate and a y coordinate, for example) of the feature area in the state in which the learning image is erect. In addition, the feature extraction unit 24 extracts a feature (a feature point, a feature amount, and image data) at a position corresponding to the position of the feature area stored in the determination information storage unit 21 in the determination target image (including a rotated state). Specifically, the feature extraction unit 24 extracts an area (an area used in the erectness determination (determination area)) at the position corresponding to (associated with) the position of the feature area from the determination target image, and then extracts the feature point(s), the feature amount(s) and the like in the determination area. For example, the feature extraction unit 24 extracts the determination area having the same size as that of the feature area at the position corresponding to (associated with) the position of the feature area in the determination target image.

Note that known methods can be used in the extraction of the feature point and the feature amount, and the extraction thereof is performed by using a feature amount extraction method such as, e.g., scale-invariant feature transform (SIFT), speed-upped robust feature (SURF), or accelerated KAZE (A-KAZE). For example, the feature extraction unit 24 calculates, for each extracted feature point, the feature amount in a local area having the feature point at the center.

Note that the feature extraction unit 24 may extract the feature point(s), the feature amount(s) and the like by using the extended area (e.g., the area of which the upper, lower, left, and right sides are extended by 0.5 inches) which is obtained by adding the peripheral area to the area corresponding to the registered feature area (the area having the same position and the same size as those of the feature area) as the determination area. With this, even in the case where a misalignment in a scanner apparatus or a correction error of scanned image processing has occurred in the determination target image, it is possible to extract the feature point(s) and the feature amount(s) at the position corresponding to the position of the feature area in the determination target image. In addition, the feature extraction unit 24 may adjust (set) the resolution of the determination area to the resolution of the feature area and then extract the feature point(s) and the feature amount(s) in the determination area.

The candidate extraction unit 25 extracts an area which images each having a predetermined format are highly likely to include in common from the learning image in the erect state, and uses the area as the candidate for the feature area. For example, the candidate extraction unit 25 extracts a plurality of rectangular text areas from the learning image having the predetermined format, calculates a score in which a position in the image, the area of the rectangle, and an aspect ratio are taken into consideration for each rectangular text area, and extracts the area having the highest score as the area (the candidate for the feature area) which the images each having the predetermined format are highly likely to include in common.

For example, it is highly likely that an area which is positioned in the upper portion of the image, has a large area, and has a low aspect ratio (can be assumed to have a character string having a large font size and a small number of characters) is an area which includes a cooperate name, a manuscript name or the like, and hence the calculated score is high. Thus, the candidate extraction unit 25 calculates the score by performing conversion processing in which the score of the area which is assumed to be highly likely to include the cooperate name, the manuscript name or the like is higher based on the position, area, and aspect ratio of the rectangular area. Subsequently, the candidate extraction unit 25 extracts the area having the highest calculated score as the candidate for the feature area. Note that the candidate extraction unit 25 may extract a plurality of candidates for the feature area by extracting a plurality of areas in descending order of the score (e.g., the top three areas). In addition, the candidate extraction unit 25 may extract, based on a plurality of the learning images having the same format, the candidate for the feature area having the same format.

Further, an area in which gradation fluctuation is sharp (gradation fluctuation is not smooth), a large object in which pixels are coupled (an area in which black pixels are concentrated due to binarization or the like), or an area which is common to a plurality of the learning images having the same predetermined format may be extracted as the area which the predetermined format images are highly likely to include in common. For example, the large object in which pixels are coupled is assumed to be a corporate logo or the like.

The rotation unit 26 rotates the image in a range of not less than 0 degrees and less than 360 degrees. The rotation unit 26 rotates the determination target image by at least one angle of one or more angles such that the outer edge shape of the determination target image agrees with the outer edge shape of the predetermined format image in its erect state. For example, in the case where the outer edge shape of the determination target image agrees with the outer edge shape of the predetermined format image in the erect state at angles of 0 degrees, 90 degrees, 180 degrees, and 270 degrees (in the case of a square and the like), the rotation unit 26 rotates the determination target image by at least one of these angles. In addition, in the case where the predetermined format image is a rectangular image (a rectangle or the like) having a long side and a short side, the rotation unit 26 rotates the determination target image by at least one of two angles (e.g., 0 degrees and 180 degrees, or 90 degrees and 270 degrees) which allow the relationship between the long side or the short side and a longitudinal side or a transverse side to agree with that of the predetermined format image in the erect state. In addition, the rotation unit 26 rotates the learning image in an erectness direction in response to a rotation instruction in the erectness direction by the user.

The erectness determination unit 27 determines whether the feature corresponding to the determination feature in the predetermined format image is present at the position (determination area) corresponding to the position of the feature area in the predetermined format image in the determination target image. Subsequently, the erectness determination unit 27 determines whether the determination target image is erect by determining the orientation of the determination target image (a rotation angle with respect to the predetermined format image) based on the determination result of the determination target image at each rotation angle. Hereinafter, processing performed by the erectness determination unit 27 will be specifically described. Hereinafter, the predetermined format image registered in the determination information storage unit 21 is referred to as a registered image.

The erectness determination unit 27 determines whether the feature point is present in the determination area in the determination target image for the determination target image at each rotation angle (e.g., 0 degrees, 90 degrees, 180 degrees, and 270 degrees). Subsequently, in the case where the feature point is extracted in the determination area, the erectness determination unit 27 performs matching processing (feature point (feature amount) matching) between the registered image and the determination target image based on the feature point and the feature amount. As the matching processing between the two images, it is possible to use known methods, and the matching processing is performed by using a method such as, e.g., brute-force or fast library for approximate nearest neighbors (FLANN). Note that, in the present embodiment, the matching processing is not performed in the case where the feature point is not extracted in the determination area, but the matching processing is not limited thereto, and the matching processing may be executed in the case where the feature point is not extracted similarly to the case where the feature point is extracted. However, in this case, the feature point is not detected, and hence the number of matching feature points is determined to be zero.

The erectness determination unit 27 calculates, e.g., a distance on feature point space between the feature amount of the feature point in the registered image (feature area) and the feature amount of the feature point in the determination target image (determination area), and determines points having the calculated distance which is shortest or is less than a threshold value to be matching feature points (feature points corresponding to each other). For example, in the case where the feature amount is a SIFT feature amount, a distance between two points on 128-dimensional space is calculated. The erectness determination unit 27 calculates the number of matching feature points between the two images (between the feature area and the determination area) by this feature point matching.

In addition, the erectness determination unit 27 determines the degree of similarity of the feature amount between two points by comparing the feature amount of the feature point in the registered image (feature area) with the feature amount of the feature point in the determination target image (determination area). For example, the erectness determination unit 27 calculates the degree of similarity of the feature amount between two points by performing conversion processing in which the degree of similarity increases as the distance of the feature amount decreases based on the distance of the feature amount between matching feature points. Note that, as the distance between the feature amounts, a distance such as, e.g., Euclidian distance or Hamming distance is used. The erectness determination unit 27 calculates the degree of similarity of the feature amount (the degree of similarity of the feature amount between the two images) between the feature area (registered image) and the determination area (determination target image) by using the degree of similarity of the feature amount which is calculated for each of the matching feature points. For example, a representative value such as an average, a median, or a mode, or a total value of the degree of similarity of the feature amount calculated for each of the matching feature points may be calculated as the degree of similarity of the feature amount between the two images.

The erectness determination unit 27 determines whether the determination target image is erect according to the result of the matching processing (the number of matching feature points and the degree of similarity of the feature amount). For example, the erectness determination unit 27 performs the erectness determination by comparing the number of matching feature points and the degree of similarity of the feature amount with predetermined threshold values. Specifically, the number of matching feature points and the degree of similarity of the feature amount are compared with the predetermined threshold values for the determination target image at each rotation angle, and the rotation angle of the determination target image in the case where both of them exceed the threshold values is determined to be the orientation of the determination target image.

For example, when the matching processing between the determination target image having a rotation angle of 0 degrees and the registered image is performed, in the case where the number of matching feature points and the degree of similarity of the feature amount exceed the predetermined threshold values, it is determined that the orientation of the determination target image is erect (a difference in angle between the determination target image and the registered image is 0 degrees). In addition, for example, when the matching processing between the determination target image which is rotated counterclockwise by 90 degrees and the registered image is performed, in the case where the number of matching feature points and the degree of similarity of the feature amount exceed the predetermined threshold values, it is determined that the orientation of the determination target image (before rotation) is not erect (the orientation rotated clockwise by 90 degrees with respect to the orientation of the registered image). Note that the erectness determination unit 27 may set a plurality of the predetermined threshold values.

In addition, the erectness determination unit 27 may perform the erectness determination by determining a value indicative of the certainty of erectness of the determination target image at each rotation angle according to the number of matching feature points and the degree of similarity of the feature amount. In this case, the erectness determination unit 27 determines the orientation of the determination target image and performs the erectness determination by comparing the values indicative of the certainty of the erectness at the individual rotation angles. In the present embodiment, the number of votes corresponding to the number of matching feature points is used as the value indicative of the certainty of the erectness, but the value is not limited thereto as long as the value indicates the certainty of the erectness, and the number of votes corresponding to the degree of similarity of the feature amount, a score (points) based on the number of matching feature points and/or the degree of similarity of the feature amount, or the like, may also be used.

For example, the erectness determination unit 27 determines whether the determination target image is erect by comparing the numbers of votes at the individual rotation angles and determining the rotation angle having the highest number of votes as the angle of the determination target image with respect to the registered image.

Figure 5:
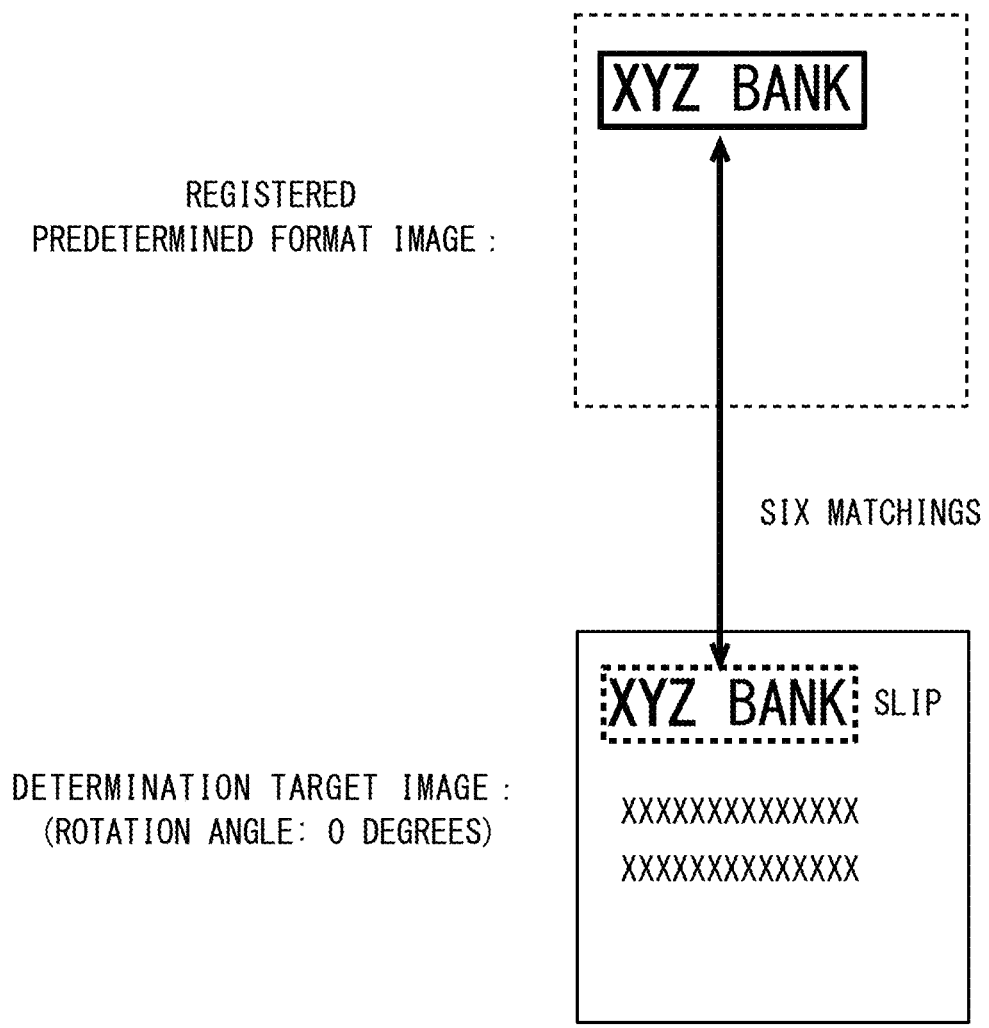
FIG. 5 is a diagram showing an example of erectness determination processing (with matching processing) of a determination target image (rotation angle: 0 degrees) according to the embodiment.

FIG. 5 is a diagram showing an example of erectness determination processing (with matching processing) of the determination target image (rotation angle: 0 degrees) according to the present embodiment. As shown in FIG. 5, in the case of the determination target image having a rotation angle of 0 degrees, as the result of the matching processing between the determination area (determination target image) and the feature area (registered image), it is determined that six feature points match. In the example in FIG. 5, the determination target image is erect, and hence it is determined that six feature points match, i.e., a plurality of feature points match, between the determination area and the registered feature area. In this case, the erectness determination unit 27 determines the number of votes at the rotation angle of 0 degrees to be "6" which is the number of matching feature points.

Figure 6:
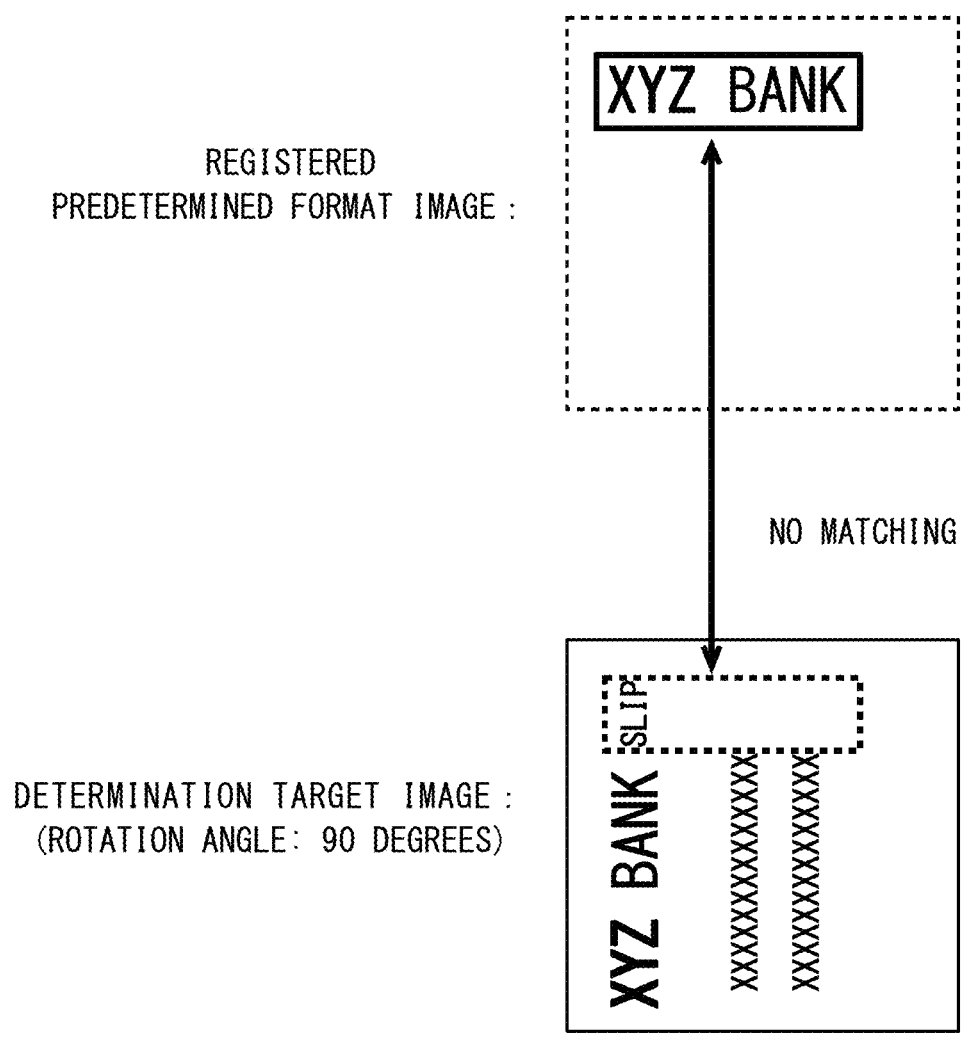
FIG. 6 is a diagram showing an example of the erectness determination processing (with matching processing) of the determination target image (rotation angle: 90 degrees) according to the embodiment.

FIG. 6 is a diagram showing an example of the erectness determination processing (with matching processing) of the determination target image (rotation angle: 90 degrees) according to the present embodiment. As shown in FIG. 6, in the case where the determination target image is rotated counterclockwise by 90 degrees, as the result of the matching processing between the determination area (determination target image) and the feature area (registered image), it is determined that no feature points match. In this case, the erectness determination unit 27 determines the number of votes at the rotation angle of 90 degrees to be "0".

Figure 7:
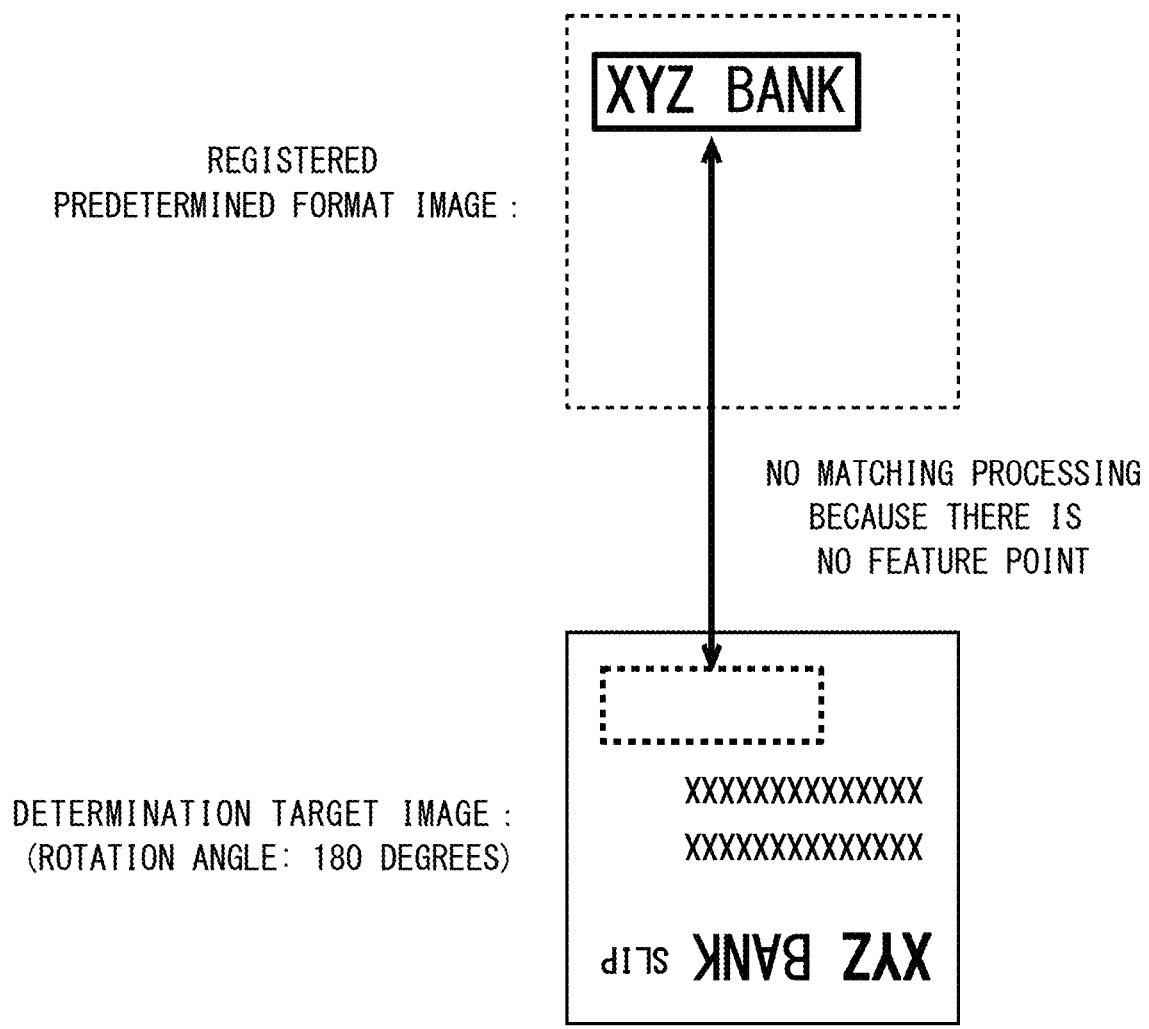
FIG. 7 is a diagram showing an example of the erectness determination processing (without matching processing) of the determination target image (rotation angle: 180 degrees) according to the embodiment.

FIG. 7 is a diagram showing an example of the erectness determination processing (without matching processing) of the determination target image (rotation angle: 180 degrees) according to the present embodiment. As shown in FIG. 7, in the case where the determination target image is rotated by 180 degrees, an image is not formed in the determination area of the determination target image, and the feature point is not detected from the determination area. For example, in the case where the determination area is included in a white area or the like, there are cases where the feature point is not detected. In such cases, in the present embodiment, the matching processing is not performed for the rotation angle of 180 degrees, and the rotation angle of 180 degrees is excluded from the target for comparison of the number of votes (the number of votes is not determined).

Figure 8:
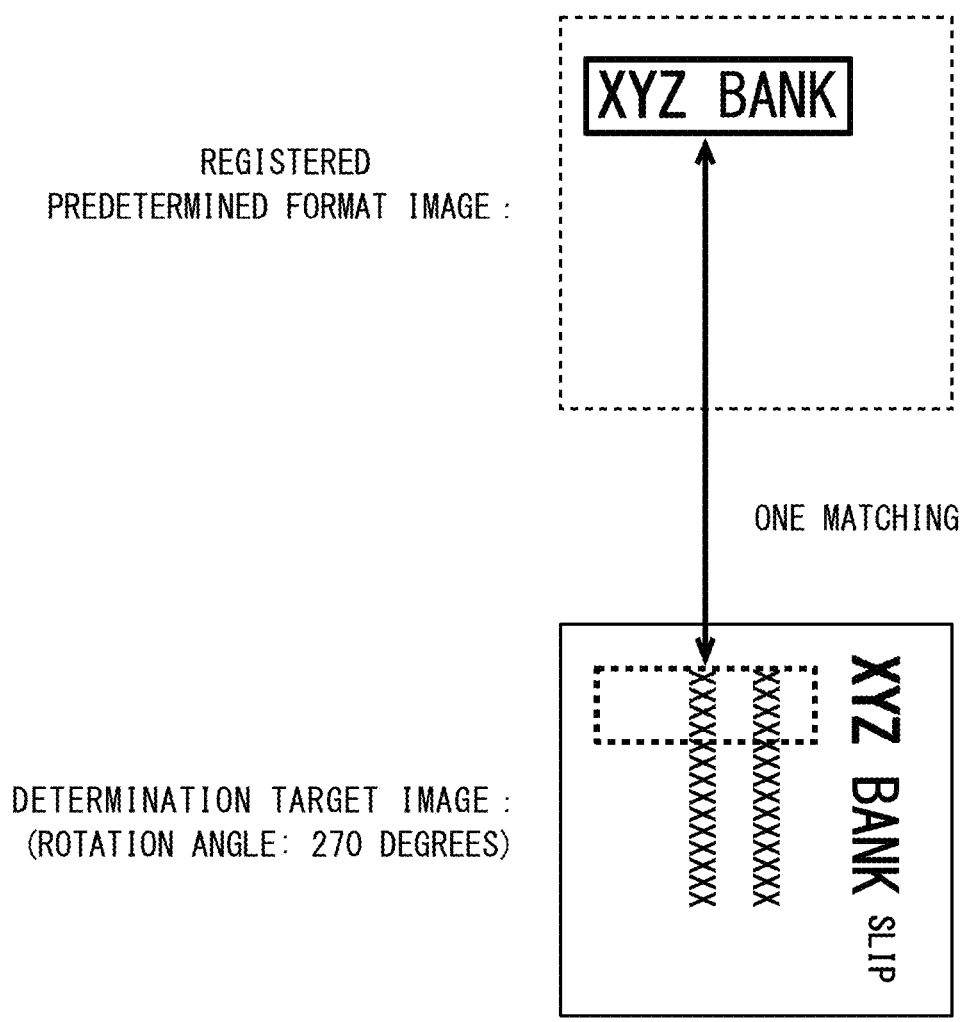
FIG. 8 is a diagram showing an example of the erectness determination processing (with matching processing) of the determination target image (rotation angle: 270 degrees) according to the embodiment.

FIG. 8 is a diagram showing an example of the erectness determination processing (with matching processing) of the determination target image (rotation angle: 270 degrees) according to the present embodiment. As shown in FIG. 8, in the case where the determination target image is rotated counterclockwise by 270 degrees, as the result of the matching processing between the determination area (determination target image) and the feature area (registered image), it is determined that one feature point matches. In this case, the erectness determination unit 27 determines the number of votes at the rotation angle of 270 degrees to be "1" which is the number of matching feature points.

The erectness determination unit 27 compares the numbers of votes shown in FIGS. 5, 6, and 8, and determines (uses) the rotation angle of 0 degrees having the highest number of votes to be the rotation angle of the determination target image with respect to the registered image. With this, it becomes possible for the erectness determination unit 27 to determine that the determination target image is erect.

Note that the number of matching feature points and the degree of similarity of the feature amount are compared with the threshold values in the present embodiment, but the comparison is not limited thereto, and the erectness determination may also be performed by comparing only one of the number of matching feature points and the degree of similarity of the feature amount with the predetermined threshold value. In addition, the number of votes may be corrected by using the result of the erectness determination using another method.

In addition, the erectness determination unit 27 may determine whether the feature corresponding to the determination feature is present according to the resolution adjusted in accordance with the size of the feature area. Specifically, the erectness determination unit 27 may determine whether the feature corresponding to the determination feature which is stored at the adjusted resolution is present in the determination area of which the resolution is adjusted to the resolution which is adjusted in accordance with the size of the feature area in the registered image. With this, as described above, even in the case where the area size of the feature area to be registered is large, it becomes possible to quickly complete the scan processing.

Further, the erectness determination unit 27 may perform the determination on, among input determination target images, a determination target image of which the size is equal or close to the size of the predetermined format image stored in the determination information storage unit 21. With this, as described above, it becomes possible to quickly complete the scan processing without performing the erectness determination on an image of which the determination information is not registered.

In addition, the erectness determination unit 27 may detect an erroneous determination. Feature point matching by the erectness determination unit 27 is performed on a per point basis, and hence there is a possibility that points which are not related to the same determination feature match each other. Accordingly, there are cases where it is erroneously determined that the determination target image having a format different from that of the registered image has the feature corresponding to the determination feature in the registered image, and it is erroneously determined that the determination target image having the same format as that of the registered image does not have the feature corresponding to the determination feature in the registered image.

Figure 9:
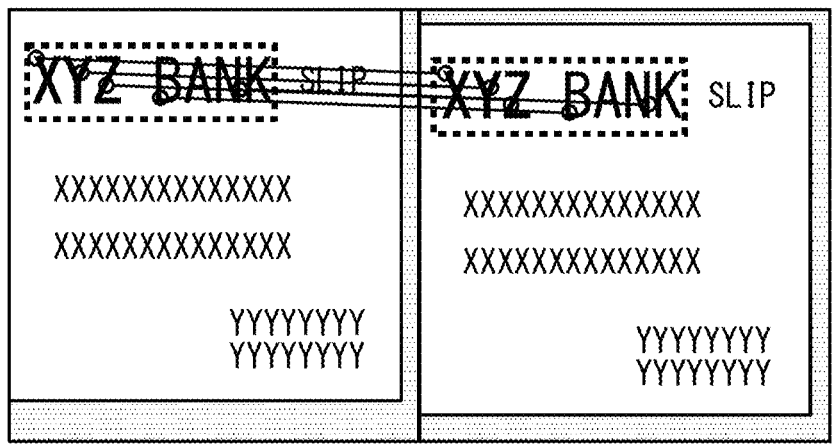
FIG. 9 is a diagram showing an example of relative positions between matching points in a correct determination according to the embodiment.
Figure 10:
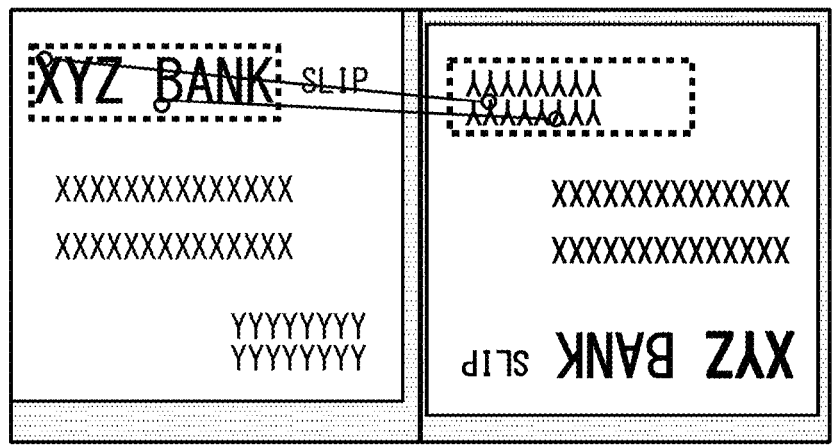
FIG. 10 is a diagram showing an example of relative positions between matching points in an erroneous determination according to the embodiment.

FIG. 9 is a diagram showing an example of relative positions between matching points in a correct determination according to the present embodiment. As shown in FIG. 9, the determination target image is erect, and hence it is determined that the registered image and the determination target image match each other at many feature points as the result of the matching processing. Thus, in the case where the matching processing is performed correctly (in the case where the determination is not the erroneous determination), it can be seen that, the relative positions, each of which is a relative position between matching feature points (the position of the feature point in the determination target image with respect to the feature point in the registered image), regarding all feature points, are almost the same each other. The relative position is the position of the feature point in the determination target image with respect to the position (coordinates of the X axis and the Y axis, for example) of the feature point in the registered image in a state in which, e.g., the determination target image and the registered image are arranged laterally, as shown in FIGS. 9 and 10. For example, as shown in FIGS. 9 and 10, the relative position is represented by the distance and the slope (a vector may also be used) of a line segment joining the matching feature points between the registered image and the determination target image. In the example in FIG. 9, it can be seen that the distances and the slopes of the line segments joining the matching feature points between the registered image and the determination target image in all combinations of the matching feature points (five combinations in the example in FIG. 9) are substantially identical to each other.

FIG. 10 is a diagram showing an example of the relative positions between matching points in the erroneous determination according to the present embodiment. As shown in FIG. 10, irrespective of the fact that the determination target image is not erect, there are cases where the feature points match those in the registered image due to the erroneous determination. However, in the case of the erroneous determination, as shown in FIG. 10, it can be seen that the relative positions, each of which is a relative position between matching feature points, regarding all feature points, are not the same. That is, in the example in FIG. 10, the distances and the slopes of the line segments joining the matching feature points between the registered image and the determination target image in all combinations of the matching feature points (two combinations in the example in FIG. 10) are not identical to each other.

Consequently, the erectness determination unit 27 detects the erroneous determination based on the relative positions, each of which is a relative position between the points (the feature point in the registered image and the feature point in the determination target image) which match each other as the result of the matching processing (feature point matching). For example, the erectness determination unit 27 removes outlier points (noise) in advance from matching feature points, and calculates a distance (difference) between matching points and a gradient of a line with which matching points are connected for each feature point. Subsequently, the erectness determination unit 27 calculates variance values of the distance and the gradient based on the distance and the gradient for each feature point and determines reliability of the determination from the variance values, and the erectness determination unit 27 determines that the determination is the erroneous determination when the reliability is not more than a threshold value.

For example, the erectness determination unit 27 removes, as the outlier point (noise), a feature point having the number of adjacent feature points which is less than a predetermined number or a feature point having the distance between matching points which exceeds a predetermined value. In addition, as the determination is not erroneous, the relative positions for the feature points become the same each other, and the variance value of each of the distance and the gradient approaches 0, and hence the erectness determination unit 27, e.g., calculates the reliability by performing conversion processing in which the reliability increases as the variance value of each of the distance and the gradient approaches 0. The reliability is calculated by performing, e.g., a method in which the complement of a normalized variance value is determined, or a method in which a rank is associated with each range of the variance value. Note that it may also be determined whether the determination is the erroneous determination by comparing at least one of the variance values of the distance and the gradient with a threshold value instead of using the reliability.

In addition, the erectness determination unit 27 may dynamically change the order of the feature area (registered image) used in the erectness determination. In the case where the determination information storage unit 21 stores the determination features in a plurality of the predetermined format images (feature areas), the erectness determination processing is performed by using the individual feature areas sequentially, and hence there are cases where the scan processing including the erectness determination is not completed quickly. Therefore, by dynamically changing the order of the feature area (registered image) used in the erectness determination, it becomes possible to quickly complete the scan processing including the erectness determination. Specifically, the erectness determination unit 27 determines the order of the predetermined format images used when the erectness determination of the determination target image is performed, based on the erectness determination result of the preceding determination target image on which the erectness determination has been performed before the determination target image.

For example, at a worksite where scanning is performed, a large number of documents having the same format (e.g., the same forms) are often scanned and, in this case, by performing the erectness determination processing which uses the registered image (feature area) of the document first, the erectness determination processing which uses the other registered images (feature areas) becomes unnecessary. Therefore, in the case where the registered image (feature area) which matches the determination target image (determined to be the image having the same format) is present, the erectness determination unit 27 performs the erectness determination processing which uses the registered image having matched the determination target image first on the next determination target image.

FIG. 11 is a diagram showing an example in which the order of the feature area used for the erectness determination processing is changed according to the present embodiment. As shown in FIG. 11, while the erectness determination unit 27 performs the erectness determination processing on the determination target images by using the feature areas (registered images) in the order of A, B, C, and D, when the second determination target image matches the feature area C, the feature area used when the erectness determination processing is performed on the third determination target image first is determined to be the feature area C. Similarly, when the third determination target image matches the feature area B, the feature area used when the erectness determination processing is performed on the fourth determination target image first is determined to be the feature area B. Similarly, also in the fifth and sixth determination target images, when each of the fourth and the fifth determination target images matches the feature area B, the feature area used when the erectness determination processing is performed on each of the fifth and the sixth determination target images first is determined to be the feature area B.

In the example in FIG. 11, the third to sixth determination target images are images having the same format (e.g., images of the same form) and, by dynamically changing the order of the feature area, it is possible to determine whether the fourth to sixth determination target images are erect by performing the erectness determination processing using only the feature area B, and hence it becomes possible to quickly complete the scan processing.

The orientation correction unit 28 corrects the orientation of the determination target image based on the determination result by the erectness determination unit 27. For example, when it is determined that the determination target image is an image which is rotated clockwise by R degrees (e.g., 90 degrees) with respect to the registered image, the orientation correction unit 28 corrects the orientation by rotating the determination target image by R degrees (e.g., 90 degrees) in a direction (counterclockwise) opposite to the rotation direction of the determination target image with respect to the registered image such that the determination target image is erect.

The display unit 29 executes various display processing via the output device 17 in the information processing apparatus 1. For example, the display unit 29 generates a registration screen or the like in which the user registers the determination information of the predetermined format image (learning image), and displays (outputs) the generated screen via the output device 17 such as a display.

Processing Flow

Next, a description will be given of the flow of processing executed by the information processing apparatus according to the present embodiment by using a flowchart. Note that the specific content and processing order of the processing shown in the flowchart described below are examples for implementing the present disclosure. The specific processing content and processing order may be appropriately selected according to the mode of implementation of the present disclosure.

Figure 12:
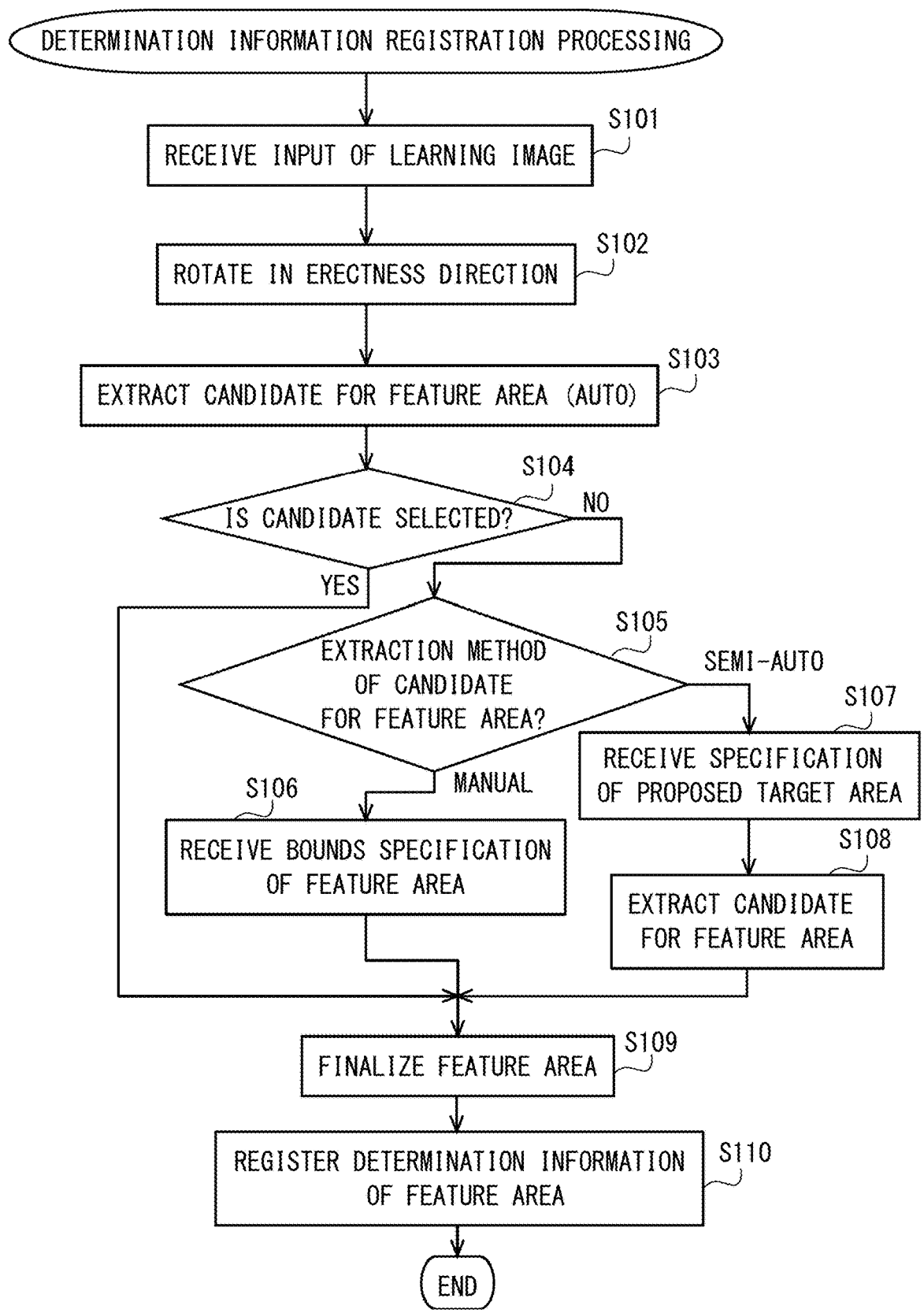
FIG. 12 is a flowchart showing the outline of the flow of determination information registration processing according to the first embodiment.

FIG. 12 is a flowchart showing the outline of the flow of determination information registration processing according to the present embodiment. The determination information registration processing according to the present embodiment is executed at a timing when, in the information processing apparatus 1, a new registration button or the like is pressed on the registration screen by the user and an instruction to scan a form of which the determination information is to be newly registered is performed, or the like. Note that, in the present embodiment, the image of the form is acquired by scanning the form, but the image is not limited to the form as long as the image is a captured image, and images or photographs of other documents may be used.

In Step S101, input of the predetermined format image (learning image) is received. When the scan processing of the form of which the determination information is to be registered is performed in the image acquisition apparatus 9, the image reception unit 22 acquires the image (learning image) of the scanned form from the image acquisition apparatus 9. Note that the image reception unit 22 may acquire a pre-stored learning image from the storage device 14 in response to an instruction to acquire the learning image from the user. Thereafter, the processing proceeds to Step S102.

In Step S102, with an instruction of the user, the learning image is rotated in the erectness direction. When an instruction to rotate the learning image in the erectness direction is received from the user, the rotation unit 26 rotates the learning image of which the input is received in Step S101 in the erectness direction. The instruction to rotate the image from the user may also be received by an instruction input reception unit (not shown).

Figure 13:
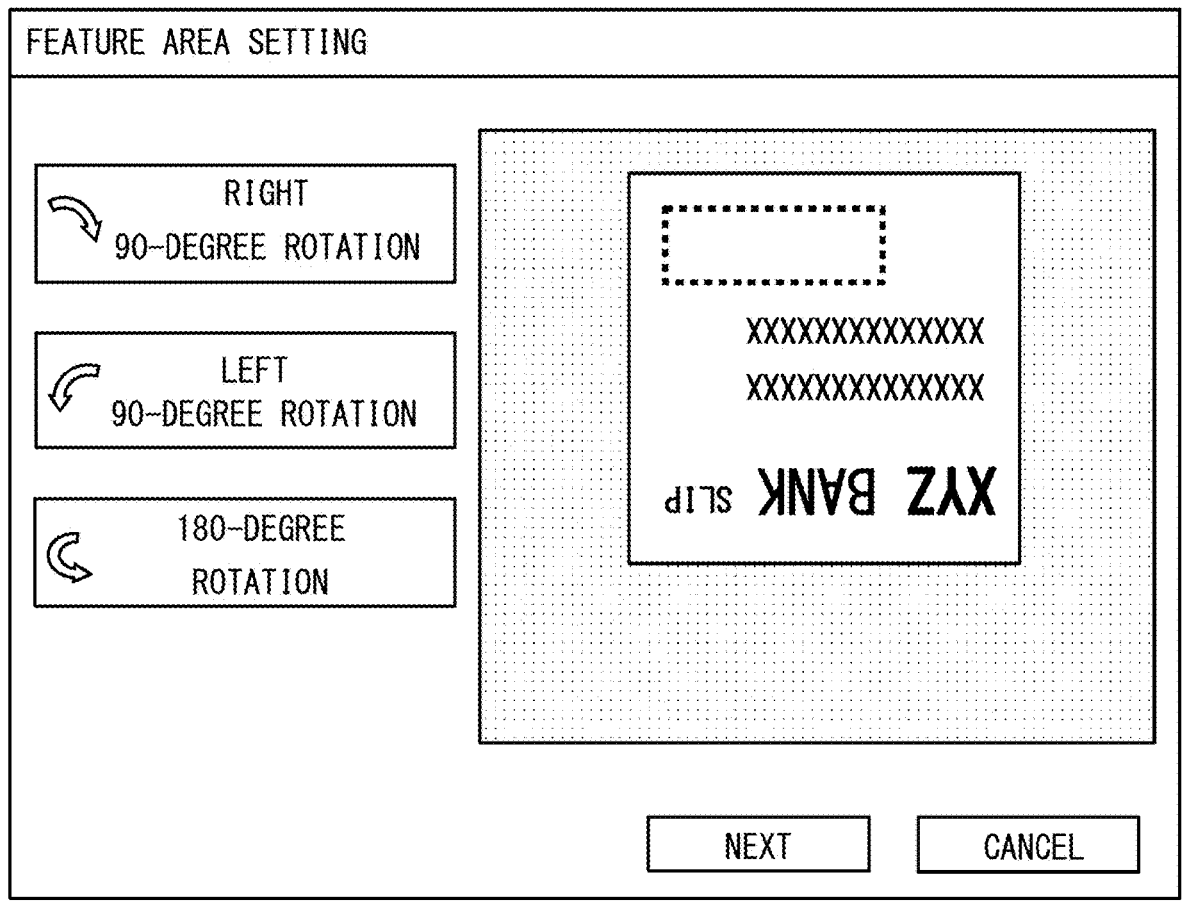
FIG. 13 is a schematic diagram showing an example of a registration screen for rotating a learning image according to the embodiment.

FIG. 13 is a schematic diagram showing an example of the registration screen for rotating the learning image according to the present embodiment. As shown in FIG. 13, for example, when the user visually determines that the acquired learning image becomes erect by being rotated by 180 degrees and presses a "180-degree rotation" button, the rotation unit 26 rotates the learning image by 180 degrees. Similarly, when the user presses a "left 90-degree rotation" button or a "right 90-degree rotation" button, the rotation unit 26 rotates the learning image by 90 degrees counterclockwise (leftward) or 90 degrees clockwise (rightward). Thereafter, the processing proceeds to Step S103.

In Step S103, the candidate for the feature area is extracted. The candidate extraction unit 25 extracts, from the learning image in the erect state, the area which images each having the predetermined format are highly likely to include in common as the candidate for the feature area (Auto processing). Note that the candidate extraction unit 25 extracts one or a plurality of candidates for the feature area. Thereafter, the processing proceeds to Step S104.

In Step S104, it is determined whether the extracted candidate for the feature area is selected by the user. The specification reception unit 23 determines whether the candidate for the feature area extracted in Step S103 is selected by the user on the registration screen or the like.

Figure 14:
FIG. 14 is a schematic diagram showing an example of a registration screen for determining the feature area according to the embodiment.

FIG. 14 is a schematic diagram showing an example of the registration screen for determining the feature area according to the present embodiment. As shown in FIG. 14, for example, one of buttons of "candidate 1" to "candidate 3" is pressed by the user, and the specification reception unit 23 thereby determines that the candidate for the feature area extracted in Step S103 is selected. In the case where the candidate for the feature area is selected, the processing proceeds to Step S109. On the other hand, in the case where the candidate for the feature area is not selected, the processing proceeds to Step S105. Note that, in the case where the candidate for the feature area is selected by the user, for example, as shown in FIG. 14, the candidate for the feature area may be displayed in "feature area image" on the registration screen by the display unit 29.

In Step S105, as the extraction method of the candidate for the feature area, specification of Manual or Semi-auto is received. For example, as shown in FIG. 14, a "customize" button is pressed by the user, and the specification reception unit 23 thereby receives the specification for setting the candidate extraction method to Manual. In this case, the processing proceeds to Step S106. In addition, a "candidate (bounds specification)" button is pressed by the user, and the specification reception unit 23 thereby receives the specification for setting the candidate extraction method to Semi-auto. In this case, the processing proceeds to Step S107.

In Step S106, the bounds specification of the feature area by the user is received. For example, the specification reception unit 23 receives the bounds specification of the feature area in response to a manual operation by the user such as a mouse drag operation. Similarly to Step S104, the specified bounds (area) may be displayed in "feature area image" on the registration screen shown in FIG. 14. Thereafter, the processing proceeds to Step S109.

In Step S107, the specification of the proposed target area by the user is received. For example, the specification reception unit 23 receives the bounds specification of the proposed target area (the area in which the candidate for the feature area is to be extracted) in response to the manual operation by the user such as the mouse drag operation. Thereafter, the processing proceeds to Step S108.

In Step S108, the candidate for the feature area is extracted in the proposed target area. In the proposed target area specified in Step S107, the candidate extraction unit 25 extracts the area which the images each having the predetermined format are highly likely to include in common as the candidate for the feature area, similarly to Step S103. Note that, with regard to the candidate for the feature area in the proposed target area, similarly to the case of the Auto processing, a plurality of the candidates may be extracted or only one candidate may be extracted. In addition, similarly to Step S104, as shown in, e.g., FIG. 14, the extracted candidate for the feature area is displayed in "feature area image" on the registration screen. Thereafter, the processing proceeds to Step S109.

In Step S109, from the area extracted by one of Auto, Manual, and Semi-auto, the feature area used in orientation correction is finalized. For example, one of "candidate 1" to "candidate 3", "candidate (bounds specification)", and "customize" on the registration screen shown in FIG. 14 is selected and a "registration" button is then pressed, and the specification reception unit 23 thereby receives input of finalization of the feature area. Note that, before the finalization of the feature area, by pressing a "test scan" button or the like by the user, it may be determined whether another manuscript having the same format is rotated (corrected) correctly in the erectness direction by using the selected candidate for the feature area ("candidate 1" to "candidate 3", "candidate (bounds specification)", and "customize"). Thereafter, the processing proceeds to Step S110.

In Step S110, the determination information of the finalized feature area is registered (stored). The feature extraction unit 24 extracts the determination feature (the feature point, the feature amount and the like) in the feature area finalized in Step S109 and the position of the feature area in the state in which the learning image is erect. For example, the feature extraction unit 24 extracts (calculates) the feature point and the feature amount in the feature area by a method such as SIFT, SURF, or A-KAZE. Subsequently, the determination information storage unit 21 associates the determination feature including the feature point, the feature amount, the image data and the like in the feature area with the position of the feature area in the state in which the learning image is erect, and stores them.

Note that, at this point, the determination information storage unit 21 may store the determination feature at the resolution adjusted in accordance with the size of the feature area. In addition, the determination information storage unit 21 may use the area (extended area) obtained by adding the surrounding area to the area finalized (specified) by the user in Step S109 as the feature area, and store the determination feature. Further, the determination information storage unit 21 may associate the size of the learning image with the determination feature and the position of the feature area and store them. Thereafter, the processing shown in the present flowchart is ended.

Note that the candidate for the feature area is extracted (selected) by branch processing shown in Steps S103 to S108 described above, but the extraction of the candidate therefor is not limited thereto and, as long as the candidates for the feature area are extracted by, among Auto, Manual, and Semi-auto, one or a plurality of methods and the feature area is selected from among the candidates for the feature area, any branch processing can be executed. Therefore, the processing of automatically extracting the candidate for the feature area (Step S103) may be performed only in the case where an instruction to automatically extract the feature area (Auto processing) by the user is received. For example, in the case where an instruction to select the feature area with Manual by the user is received after Step S102, the processing in Step S103 does not need to be performed.

Figure 15:
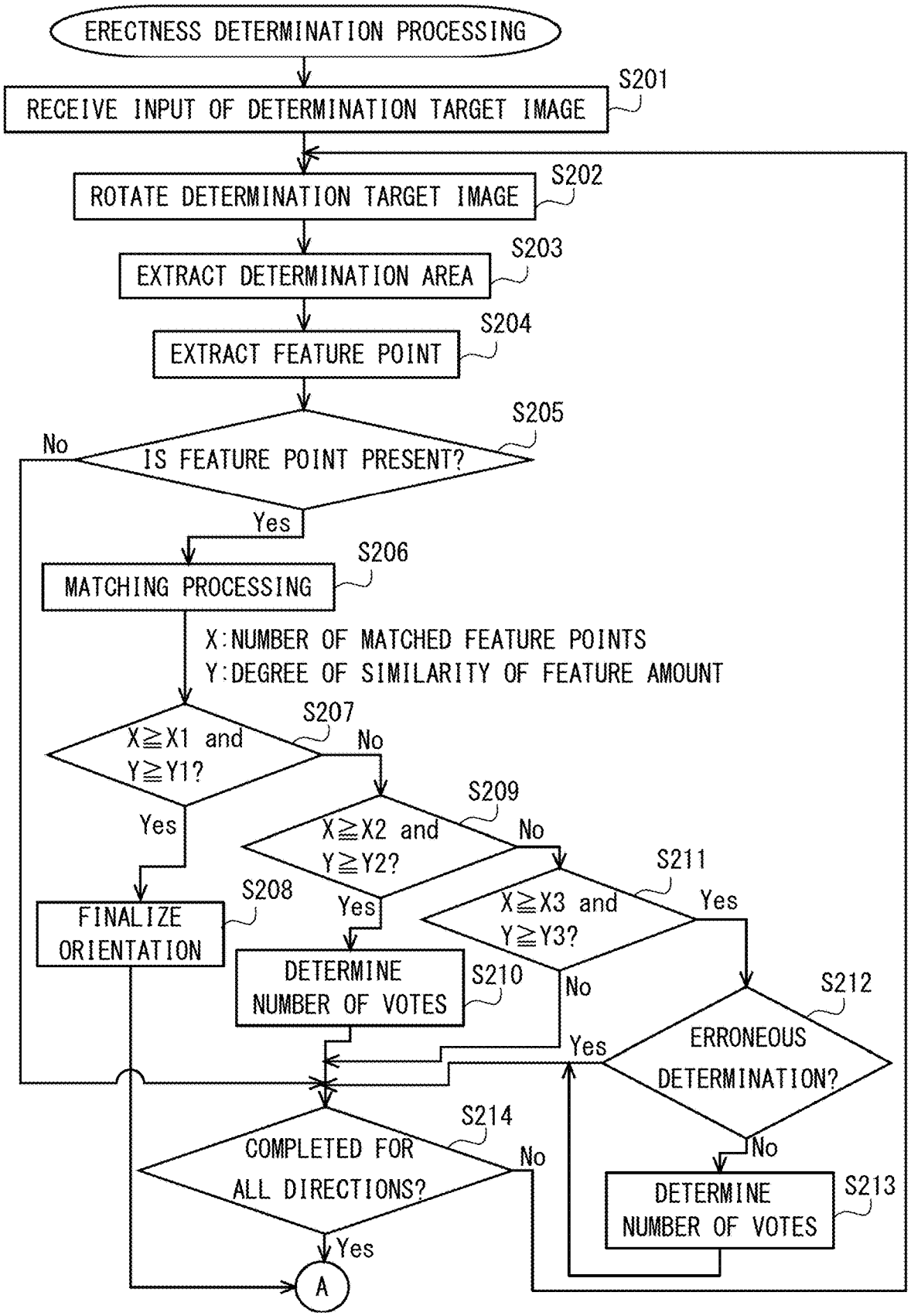
FIG. 15 is a flowchart (1) showing the outline of the flow of the erectness determination processing according to the embodiment.
Figure 16:
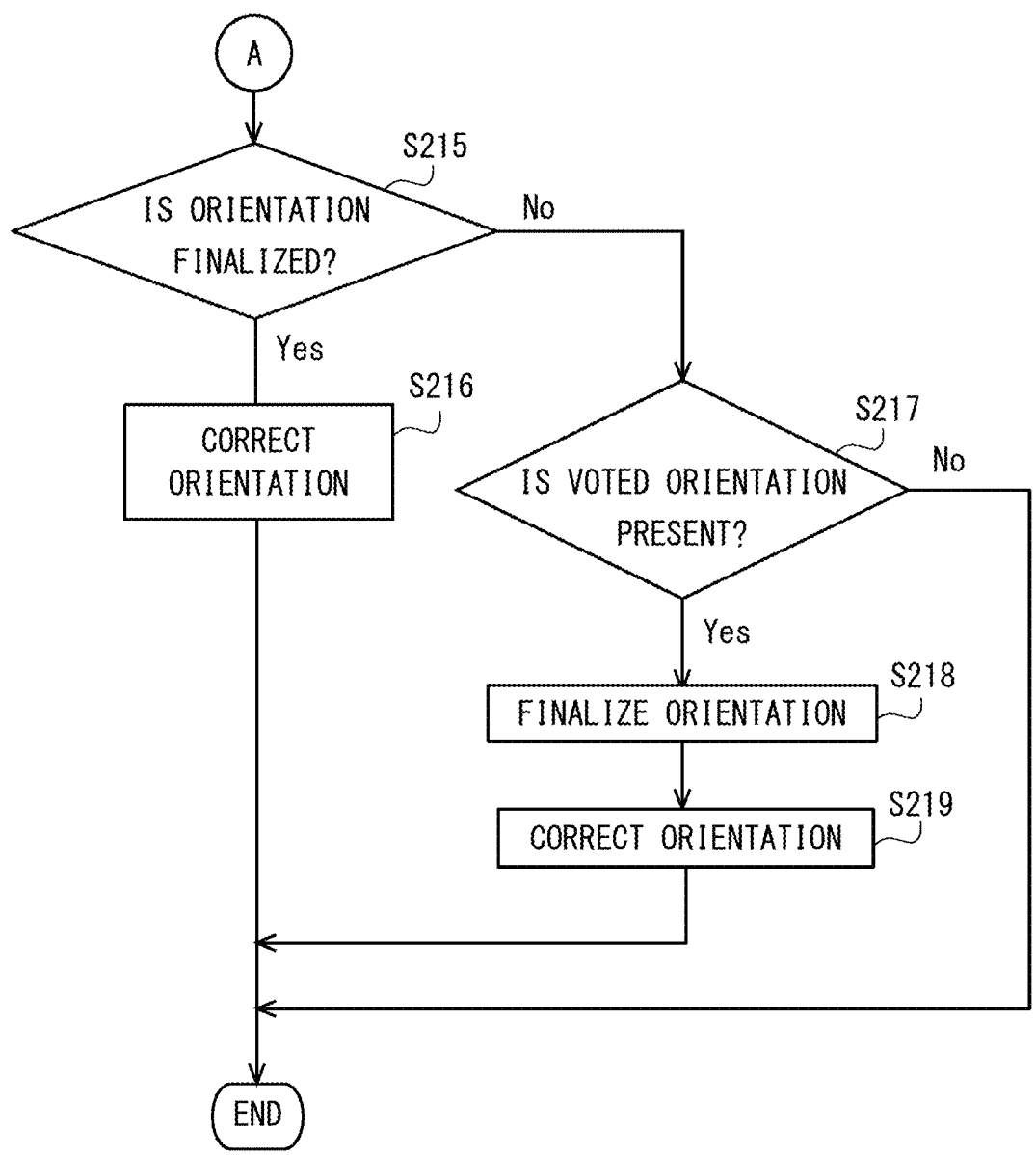
FIG. 16 is a flowchart (2) showing the outline of the flow of the erectness determination processing according to the embodiment.

Each of FIG. 15 and FIG. 16 is a flowchart showing the outline of the flow of the erectness determination processing according to the present embodiment. The erectness determination processing according to the present embodiment is executed at a timing when an instruction to scan the form on which the erectness determination is to be performed is performed by the user in the information processing apparatus 1. Note that the image of the form is acquired by scanning the form in the present embodiment, but the image is not limited thereto as long as the image is a captured image, and images and photographs of other documents may be used.

In Step S201, input of the determination target image is received. When the scan processing of the form serving as the target of the erectness determination is performed in the image acquisition apparatus 9, the image reception unit 22 acquires the image (determination target image) of the scanned form from the image acquisition apparatus 9. Note that the image reception unit 22 may receive a pre-stored determination target image from the storage device 14 in response to an instruction to acquire the determination target image from the user. Thereafter, the processing proceeds to Step S202. Note that, in the case where the size of the acquired determination target image is not equal or close to the size of the predetermined format image stored in the determination information storage unit 21 in Step S201, the execution of subsequent processing (Steps S202 to S219) by the erectness determination unit 27 may be canceled.

In Step S202, the determination target image is rotated. The rotation unit 26 rotates the determination target image by any one of angles such that the outer edge shape of the determination target image agrees with the outer edge shape of the predetermined format image in the erect state. Every time the determination target image is rotated by any one of the angles in Step S202, processing from Step S203 to Step S213 (iterative processing) is executed, and the iterative processing is executed until it is determined that the determination target image has been rotated by all of the angles such that the outer edge shapes agrees with each other in Step S214. For example, as shown in FIGS. 5 to 8, in the case where the registered image and the determination target image are square and the outer edge shapes thereof agree with each other, every time the determination target image is rotated by any one of the angles (0 degrees, 90 degrees, 180 degrees, 270 degrees) which allow the outer edge shapes to agree with each other in Step S202, the extraction of the determination area and the matching processing are executed in Steps S203 to S213. Thereafter, the processing proceeds to Step S203. Note that, in the present embodiment, in the case where the orientation of the determination target image is finalized in Step S208, the iterative processing is suspended.

In Step S203, the area used in the erectness determination is extracted. The feature extraction unit 24 extracts the area (determination area) corresponding to the feature area at the position corresponding to the position of the feature area in the determination target image for the determination target image at each rotation angle. For example, as shown in FIG. 5, in the determination target image, at the position corresponding to (associated with) the position of the feature area, the determination area (a frame in a dotted line) having the same size as that of the feature area is extracted.

Note that, in Step S203, the feature extraction unit 24 may adjust (set) the resolution of the image of the extracted determination area to the resolution adjusted in accordance with the size of the feature area in the registered image. For example, in the case where the size of the feature area is large and the determination feature is stored at a resolution (100 dpi or the like) less than a predetermined value (300 dpi or the like), the resolution of the image of the extracted determination area is also changed to 100 dpi. In addition, the feature extraction unit 24 may use the extended area (e.g., the area of which the upper, lower, left, and right sides are extended by 0.5 inches) obtained by adding the peripheral area to the area corresponding to the feature area as the determination area. Thereafter, the processing proceeds to Step S204.

In Step S204, the feature point(s) in the determination area is extracted. The feature extraction unit 24 extracts the feature point(s) in the determination area extracted in Step S203. For example, the feature extraction unit 24 extracts the feature point(s) in the determination area by the method such as SIFT, SURF, or A-KAZE. Thereafter, the processing proceeds to Step S205.

In Step S205, it is determined whether the feature point is extracted in the determination area. In Step S204, the erectness determination unit 27 determines whether the feature point in the determination area is extracted by the feature extraction unit 24. In the case where it is determined that the feature point is not extracted, the erectness determination unit 27 does not perform the matching processing described later, and the processing proceeds to Step S214. On the other hand, in the case where it is determined that the feature point is extracted, the processing proceeds to Step S206.

In Step S206, the matching processing between the registered image and the determination target image is performed based on the extracted feature point and feature amount. The erectness determination unit 27 calculates the number of matching feature points between the two images based on the feature points and feature amounts in the registered image and the determination target image. In addition, the erectness determination unit 27 calculates (determines) the degree of similarity of the feature amount between the two images by comparing the feature amount of the feature point in the registered image (feature area) with the feature amount of the feature point in the determination target image (determination area). Note that the erectness determination unit 27 performs these matching processing by using brute-force or FLANN or the like. Thereafter, the processing proceeds to Step S207.

Note that, in Steps S207 to S219 described below, by dividing the degree of matching (the degree of similarity) between the registered image and the determination target image into a plurality of levels (four levels from Level 1 to Level 4) according to the number of matching feature points and the degree of similarity of the feature amount, it is determined whether the determination target image is erect, and the orientation of the determination target image is corrected. Note that the division of the degree of matching into levels is not limited to four levels, and the degree of matching may also be divided into a plurality of levels other than four levels.

In Step S207, it is determined whether the number of matching feature points X and the degree of similarity of the feature amount Y are not less than a predetermined threshold value X1 and a predetermined threshold value Y1, respectively. The erectness determination unit 27 determines whether, as the result of the matching processing in Step S206, the number of matching feature points X is not less than the predetermined threshold value X1 and the degree of similarity of the feature amount Y is not less than the predetermined threshold value Y1. In the case where X is not less than the predetermined threshold value X1 and Y is not less than the predetermined threshold value Y1 (Level 1), the processing proceeds to Step S208. On the other hand, in the case where the condition that X is not less than the predetermined threshold value X1 and Y is not less than the predetermined threshold value Y1 is not satisfied, the processing proceeds to Step S209.

In Step S208, the orientation of the determination target image is finalized. The erectness determination unit 27 finally determines the orientation (rotation angle) of the determination target image when it is determined that the number of matching feature points is particularly large and the degree of similarity of the feature amount is particularly high to be the orientation (rotation angle) of the determination target image with respect to the registered image. For example, in the case where, as the result of the matching processing between the determination target image having a rotation angle of 0 degrees and the registered image, the number of matching feature points and the degree of similarity of the feature amount exceed the predetermined threshold values (X1, Y1), it is determined that the determination target image is erect (a difference in angle between the determination target image and the registered image is 0 degrees). Thereafter, the processing proceeds to Step S215.

In Step S209, it is determined whether the number of matching feature points X and the degree of similarity of the feature amount Y are not less than a predetermined threshold value X2 and a predetermined threshold value Y2, respectively. The erectness determination unit 27 determines whether, as the result of the matching processing in Step S206, the number of matching feature points X is not less than the predetermined threshold value X2, and the degree of similarity of the feature amount Y is not less than the predetermined threshold value Y2. In the case where X is not less than the predetermined threshold value X2 and Y is not less than the predetermined threshold value Y2 (Level 2), the processing proceeds to Step S210. On the other hand, in the case where the condition that X is not less than the predetermined threshold value X2 and Y is not less than the predetermined threshold value Y2 is not satisfied, the processing proceeds to Step S211.

In Step S210, the number of votes based on the feature point and/or the feature amount is determined for the image orientation (rotation angle). For example, the erectness determination unit 27 determines the number of matching feature points to be the number of votes for the rotation angle in Step S202. For example, as shown in FIG. 5, in the case where the number of matching feature points between the determination target image having a rotation angle of 0 degrees and the registered image is six, the erectness determination unit 27 determines the number of votes for the rotation angle of 0 degrees to be 6. Thereafter, the processing proceeds to Step S214.

In Step S211, it is determined whether the number of matching feature points X and the degree of similarity of the feature amount Y are not less than a predetermined threshold value X3 and a predetermined threshold value Y3, respectively. The erectness determination unit 27 determines whether, as the result of the matching processing in Step S206, the number of matching feature points X is not less than the predetermined threshold value X3 and the degree of similarity of the feature amount Y is not less than the predetermined threshold value Y3. In the case where X is not less than the predetermined threshold value X3 and Y is not less than the predetermined threshold value Y3 (Level 3), the processing proceeds to Step S212. On the other hand, in the case where the condition that X is not less than the predetermined threshold value X3 and Y is not less than the predetermined threshold value Y3 is not satisfied (Level 4), the processing proceeds to Step S214. Note that, in the case of Level 4, it is determined that the feature corresponding to the determination feature in the registered image is not present in the determination target image, and the number of votes is not determined for the image orientation (rotation angle) in this case.

In Step S212, it is determined whether the determination is correct (whether the determination is the erroneous determination). The erectness determination unit 27 detects the erroneous determination based on the relative positions, each of which is a relative position between the feature points (the feature point in the registered image and the feature point in the determination target image) which match each other as the result of the matching processing in Step S206. For example, the erectness determination unit 27 calculates the reliability based on the variance value of the distance between the matching feature points and the variance value of the gradient of the line with which the matching points are connected, and determines whether the determination is the erroneous determination by comparing the reliability with the predetermined threshold value. In the case where it is determined that the determination is not the erroneous determination, the processing proceeds to Step S213. On the other hand, in the case where it is determined that the determination is the erroneous determination, the processing proceeds to Step S214. Note that, in the case where it is determined that the determination is the erroneous determination, the number of votes is not determined for the image orientation (rotation angle) in this case such that the orientation of the determination target image is not corrected to a wrong orientation by the erroneous determination.

In Step S213, the number of votes based on the feature point and/or the feature amount is determined for the image orientation (rotation angle). Note that processing in Step S213 is the same as the processing in Step S210, and hence the description thereof will be omitted. Thereafter, the processing proceeds to Step S214.

In Step S214, it is determined whether the rotation processing is completed for every angle of the determination target image which allows the outer edge shape of the determination target image to agree with the outer edge shape of the predetermined format image in the erect state. The erectness determination unit 27 determines whether the rotation processing is completed for every angle which allows the outer edge shapes to agree with each other and, in the case where the rotation processing is not completed for every angle, the processing returns to Step S202 and, after the determination target image is rotated, the processing in Steps S203 to S213 is executed again. On the other hand, in the case where it is determined that the rotation processing is completed for every angle, the processing proceeds to Step S215.

In Step S215, it is determined whether the orientation of the determination target image is finalized. The erectness determination unit 27 determines whether the orientation of the determination target image is finalized by Step S208. In the case where the orientation is finalized, the processing proceeds to Step S216. On the other hand, in the case where the orientation is not finalized, the processing proceeds to Step S217.

In Step S216, the orientation of the determination target image is corrected. For example, when the erectness determination unit 27 determines that the determination target image is an image which is rotated clockwise by 90 degrees with respect to the registered image, the orientation correction unit 28 corrects the orientation to the erect orientation by rotating the determination target image counterclockwise by 90 degrees. Note that, in the case where it is determined that the orientation of the determination target image is erect (a difference in angle between the determination target image and the registered image is 0 degrees) in Step S208, the correction processing in Step S216 is not necessary. Thereafter, the processing shown in the present flowchart is ended.

In Step S217, it is determined whether the orientation for which the number of votes is determined is present. The erectness determination unit 27 determines whether the orientation for which the number of votes is determined by Step S210 or S213 is present. For example, in the examples in FIGS. 5 to 8, the number of votes is determined to be 6 in the case of the rotation angle of 0 degrees, the number of votes is determined to be 0 in the case of the rotation angle of 90 degrees, and the number of votes is determined to be 1 in the case of the rotation angle of 270 degrees and, accordingly, the erectness determination unit 27 determines that the orientation for which the number of votes is determined is present. In the case where the orientation for which the number of votes is determined is present, the processing proceeds to Step S218. On the other hand, in the case where the orientation for which the number of votes is determined is not present, the processing shown in the present flowchart is ended. Note that, in the case where the orientation for which the number of votes is determined is not present, i.e., in the case where the determination target image does not have the feature corresponding to the determination feature in the registered image and the erect orientation is not finalized, conventional erectness correction processing such as erectness correction using OCR may be performed.

In Step S218, the orientation of the determination target image is finalized based on the number of votes. The erectness determination unit 27 finally determines the orientation (rotation angle) having the highest number of votes to be the orientation of the determination target image. For example, in the examples in FIGS. 5 to 8, the number of votes in the case of the rotation angle of 0 degrees is highest, and hence the erectness determination unit 27 determines that the rotation angle of the determination target image with respect to the registered image is 0 degrees, i.e., the determination target image is erect. Thereafter, the processing proceeds to Step S219.

In Step S219, the orientation of the determination target image is corrected. Note that processing in Step S219 is the same as the processing in Step S216, and hence the description thereof will be omitted. Thereafter, the processing shown in the present flowchart is ended. Note that, in the case where the feature areas in a plurality of the predetermined format images are stored in the determination information storage unit 21, the erectness determination processing shown in FIGS. 15 and 16 is executed by using the individual feature areas sequentially until the image orientation of the determination target image is finalized (until the determination target image matches any one of the feature areas).

According to the system described in the present embodiment, it becomes possible to execute the image orientation determination by using the information on the feature area in the image having the predetermined format, and hence, even in the case where it becomes difficult to perform the orientation determination (accuracy is reduced) in the erectness determination using the conventional known recognition method, it becomes possible to increase the accuracy in the image orientation determination.

For example, in a known recognition method for characters (OCR or the like), in the case of a manuscript having a feature which reduces accuracy (with overlapping text and background, a large character, a bold character, a dot character, a handwritten character or the like), or a manuscript having a feature which is difficult to recognize (the number of characters is small, vertical writing and horizontal writing are mixed, only other features such as the face of a person are present), it becomes difficult to perform the orientation determination. However, according to the system described in the present embodiment, it is possible to perform the orientation determination by using the information on the feature area in the image having the predetermined format, and hence, even in such a case, it becomes possible to increase the accuracy in the orientation determination. In addition, because of the same reason, it becomes possible to perform the orientation determination with high accuracy on the image which does not include an object for which the recognition method is established.

In addition, determination processing is often versatile in the known recognition method for characters (OCR or the like), and hence, in the case where extremely high accuracy (e.g., 100%) is intended such as the case of an operation worksite in which it is desired to reduce quality control (QC) steps, it is difficult to perform the determination with extremely high accuracy due to the presence of similar characters (e.g., the presence of characters which look alike when they are inverted) or the like. However, according to the system described in the present embodiment, it is possible to perform the erectness determination by using the information on the predetermined feature area in the image having the predetermined format, and hence it becomes possible for the user to easily customize the erectness determination processing at each scanning worksite. Consequently, according to the system described in the present embodiment, even in the case where extremely high accuracy is intended, it is possible to implement the orientation determination having extremely high accuracy by customizing the erectness determination processing.

In addition, on the manuscript having the same format as that of the registered image which is registered once in the determination information storage unit 21, the erectness determination and the orientation correction are automatically performed thereafter, and hence it is possible to maintain a state in which a visual erectness determination and manual orientation correction in QC steps are not necessary, and it becomes possible to achieve an increase in the efficiency of a scanning operation and an improvement in the productivity of an operator.

For example, when a large number of documents such as forms are converted into electronic form, by collectively placing manuscripts on a manuscript placement section of an auto document feeder (ADF) scanner, scanning is collectively performed. However, for lack of manpower or the like, it is difficult to perform adequate preprocessing (assortment of manuscripts and adjustment of orientations of manuscripts) at all worksites, and hence there are cases where scanning is performed in a state in which the orientations of the manuscripts placed on the manuscript placement section do not agree with each other. In these cases, document images having different orientations are output, and hence the operator needs to check the image orientation of each manuscript and perform a manual rotation operation of images having different orientations in QC steps. When the above situation frequently occurs, the frequent occurrence of the situation leads to a reduction in the productivity of the operator. Even in such a case, according to the system described in the present embodiment, it is possible to automatically perform the erectness determination by using the information on the feature area in the image having the predetermined format, and hence it becomes possible to achieve an increase in the efficiency of the scanning operation and an improvement in the productivity of the operator.

Second Embodiment

Next, a second embodiment will be described. In the second embodiment, components which are the same as those described in the above first embodiment are designated by the same reference numerals, and the description thereof will be omitted.

In the first embodiment described above, the candidates for the feature area are extracted by, among Auto, Manual, and Semi-auto, one or a plurality of the methods from one learning image having the predetermined format, and the feature area is selected from among the extracted candidates for the feature area by the user. Note that the number of learning images used for determining the feature area is not limited to one, and setting of the feature area is not limited to the manual setting by the user which is described in the first embodiment. In the present embodiment, a description will be given of the mode of implementation in which, by using a plurality of the learning images having the predetermined format, the feature area used in the erectness determination (the determination of whether an erectness (the orientation of the image is an orientation desired by the user) state is established) of the image having the predetermined format is automatically extracted, and the feature area is automatically registered (set).

In the present embodiment, similarly to the first embodiment, after the feature area is registered, the erectness determination processing of the determination target image is performed based on the determination information of the feature area. The flow of the erectness determination processing in the present embodiment is substantially the same as that described in the first embodiment with reference to FIGS. 15 and 16, and hence the description thereof will be omitted.

The configuration of an information processing system 2 according to the present embodiment is substantially the same as that described in the first embodiment with reference to FIG. 1, and hence the description thereof will be omitted. Note that the information processing system 2 according to the present embodiment may further include a server (not shown) which can be connected to the information processing apparatus 1 via a network.

Figure 17:
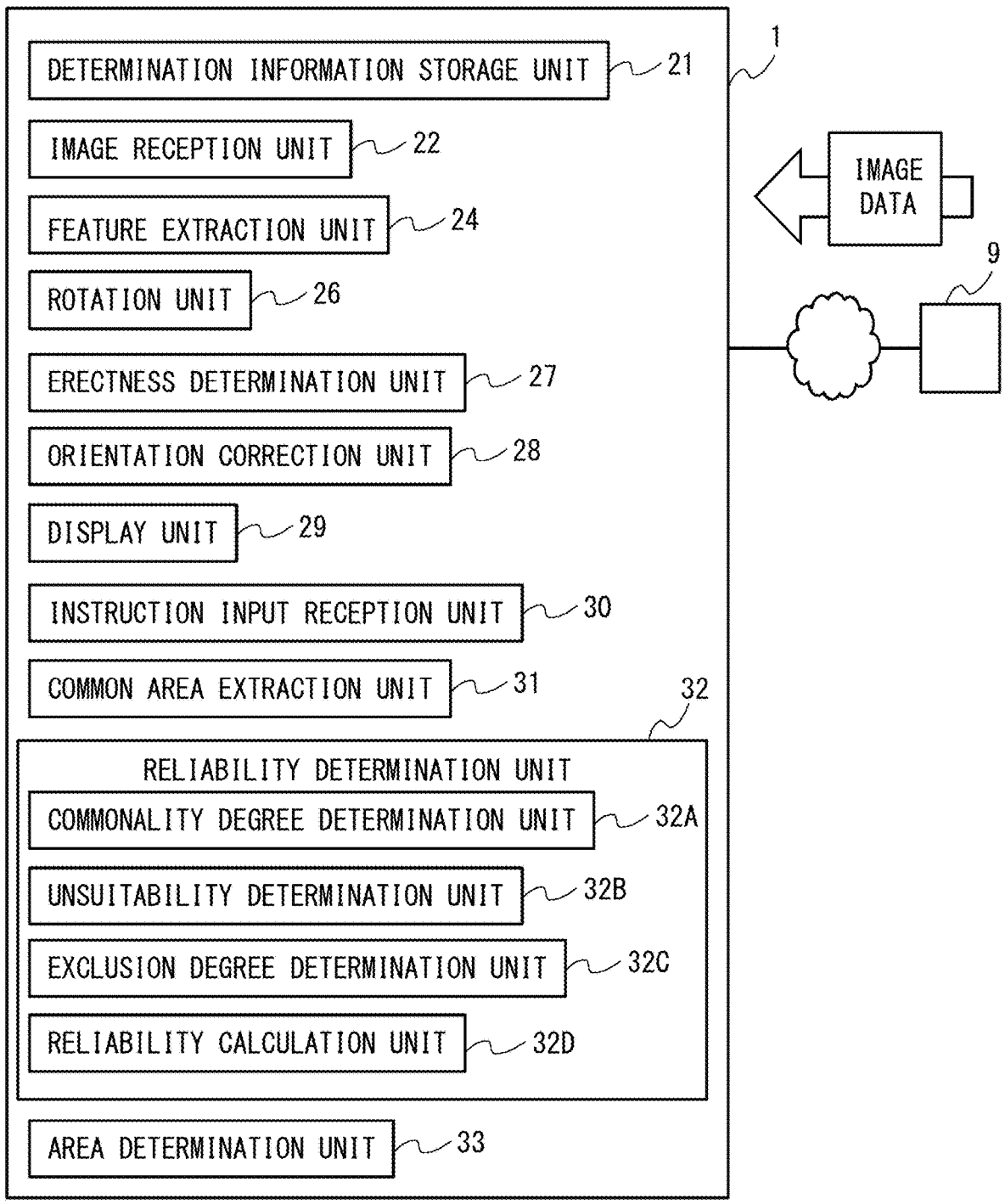
FIG. 17 is a diagram showing the outline of the functional configuration of the information processing apparatus according to the second embodiment.

FIG. 17 is a diagram showing the outline of the functional configuration of the information processing apparatus according to the present embodiment. A program recorded in the storage device 14 is read into the RAM 13 and executed by the CPU 11 and each hardware provided in the information processing apparatus 1 is controlled, and the information processing apparatus 1 thereby functions as the information processing apparatus which includes, for example, the determination information storage unit (determination information database) 21, the image reception unit 22, the feature extraction unit 24, the rotation unit 26, the erectness determination unit 27, the orientation correction unit 28, the display unit 29, an instruction input reception unit 30, a common area extraction unit 31, a reliability determination unit 32, and an area determination unit 33.

Note that, in the present embodiment and other embodiments described later, the individual functions of the information processing apparatus 1 are executed by the CPU 11 serving as a multi-purpose processor, and part or all of the functions may also be executed by one or a plurality of dedicated processors. In addition, the individual functional units of the information processing apparatus 1 are not limited to those implemented in an apparatus (one apparatus) having a single cabinet, and may also be implemented remotely and/or in a distributed manner (e.g., on a cloud).

In addition, the determination information storage unit (determination information database) 21, the image reception unit 22, the feature extraction unit 24, the rotation unit 26, the erectness determination unit 27, the orientation correction unit 28, and the display unit 29 according to the present embodiment are substantially the same as those described in the first embodiment with reference to FIG. 2, and hence the description thereof will be omitted. However, the image reception unit 22 and the feature extraction unit 24 are partially different from those described in the first embodiment, and hence points different from the first embodiment will be described below.

The image reception unit 22 receives input of a plurality of (two or more) learning images having a predetermined format (acquires a plurality of learning images) in order to learn (acquire) information for determining the orientation of an image (erectness determination). For example, when a plurality of (e.g., two to five) manuscripts related to a form (format) of the same type are scanned by the image acquisition apparatus 9, the image reception unit 22 acquires scanned images of a plurality of the manuscripts which are scanned as the learning images.

The feature extraction unit 24 extracts features (the feature point(s) and the feature amount(s)) of each acquired learning image. The feature extraction unit 24 extracts features having robustness to errors (lighting, enlargement and reduction, or rotation) for each apparatus and each scanning from the entire area of the learning image (scanned image). In the present embodiment, extraction of features is performed on the learning image in the erect state. Known methods can be used in the extraction of the feature point and the feature area, and the extraction thereof is performed by using a feature amount extraction method such as, e.g., A-KAZE, SIFT, SURF, or Oriented FAST and Rotated BRIEF (ORB). Note that, in the present embodiment, features in the learning image which is a gray-scale image (including a color image converted into a gray scale) are extracted, but the extraction is not limited thereto.

The instruction input reception unit 30 receives an instruction to rotate, among all of the learning images of which the input is received by the image reception unit 22, the learning image which is not erect in the erectness direction from the user. As will be described later, feature extraction processing and feature point matching are performed on the learning image in the erect state, and hence the user issues the instruction to rotate the learning image which is not erect to bring the learning image into the erect state.

The common area extraction unit 31 extracts (generates) one or more areas (common areas) which are common to a plurality of the learning images in the erect state as the candidates for the feature area (partial area) used in the erectness determination. The common area extraction unit 31 performs the matching processing between the erect learning images based on the features (the feature point(s) and the feature amount(s)) of each learning image to thereby determine (extract) the area common to a plurality of the learning images. More specifically, an area in which matching feature point(s) which matches between the learning images as the result of the matching processing (the matching feature point is the feature point included in a learning image in a plurality of learning images and matches the feature point included in another learning image in a plurality of learning images) is positioned (an area including the matching point) is determined to be an area common to the learning images (the candidate for the feature area (the candidate for the partial area)). In the present embodiment, the candidate for the feature area is determined based on the common area in each combination of two learning images (hereinafter referred to as a "per-combination candidate for the feature area").

The common area extraction unit 31 determines one or more combinations (pairs) of two learning images from the acquired learning images, and performs the feature point matching for each combination of the learning images. For example, the common area extraction unit 31 determines (generates) the combinations of the learning images by dividing the acquired learning images into combinations of two images. Note that, in the case where the number of learning images is an odd number, for example, by using any single image in two combinations, all of the learning images may be used in the matching processing. For example, in the case where the number of learning images is five, combinations of learning images such as the combination of the first learning image and the second learning image, the combination of the third learning image and the fourth learning image, and the combination of the fifth learning image and the first learning image are generated, and in each combination thereof, the feature point matching between two images is performed. Note that a method for generating the combination of the learning images is not limited to that shown as an example in the present embodiment, and the combination of the learning images, the number of generated combinations and the like are determined optionally.

FIG. 18 is a diagram showing an example of a matching result according to the present embodiment. FIG. 18 shows the result of the feature point matching performed between the first learning image (learning image 1) and the second learning image (learning image 2) (the combination (pair) of the learning image 1 and the learning image 2). In FIG. 18, the learning image 1 and the learning image 2 are disposed to be arranged laterally, and two feature points (a feature point in the learning image 1 and a feature point in the learning image 2 (indicated by circles)) joined by a line segment (broken line) are shown as feature points which match each other as the result of the feature point matching. In the example in FIG. 18, as the result of the feature point matching performed between the learning image 1 and the learning image 2, feature points match each other at a plurality of locations.

Note that, as the matching processing between two images, it is possible to use various known methods, and the matching processing therebetween is performed by using a method such as, e.g., k-nearest neighbor (KNN), brute-force method, or fast library for approximate nearest neighbors. Note that, in the present embodiment, in the case where coordinate positions of matching feature points are significantly different between two images, it is determined that the matching is not performed correctly (feature points are not feature points related to the same shape), and generation processing of the candidate for the feature area (the per-combination candidate for the feature area) is performed after the feature points are excluded from the matching feature points. However, it is presumed that the position of the scanned image (learning image) is displaced and differs from one manuscript to another, and hence, when the displacement of the coordinate position falls within a permissible range (e.g., within a predetermined range such as 0.5 inches), the coordinates are regarded as the same coordinates.

The common area extraction unit 31 generates (extracts), based on the result of the matching processing between the learning images, one or more areas including (surrounding) the feature points common to the learning images as the candidates for the feature area used in the erectness determination. In the present embodiment, first, the common area extraction unit 31 detects an area in which the matching feature points (common feature points) are densely positioned by clustering for each combination, and classifies the matching feature points into a plurality of clusters (groups). Subsequently, for each cluster obtained by the classification, the common area extraction unit 31 generates an area which surrounds the feature points (matching feature points) belonging to the cluster as the per-combination candidate for the feature area (a per-combination candidate for the partial area).

FIG. 19 is a diagram showing an example of a method for generating the per-combination candidate for the feature area according to the present embodiment. FIG. 19 shows an example in which the matching feature points in the combination (pair) of the learning image 1 and the learning image 2 are classified into a plurality of the clusters by the clustering, and a plurality of the per-combination candidates for the feature area in the combination of the learning image 1 and the learning image 2 are thereby generated. As shown in FIG. 19, the matching feature points between the two images are classified into a plurality of the clusters and, for each cluster, a circumscribed rectangle (thick-line frame in the drawing) of all of the feature points belonging to the cluster is generated as the per-combination candidate for the feature area. Note that, in the present embodiment, the per-combination candidate for the feature area is an area surrounded by the circumscribed rectangle of the feature points belonging to the cluster, but the per-combination candidate for the feature area is not limited thereto, and may also be an area in a shape other than the rectangle as long as the area surrounds the feature points belonging to the cluster. In addition, an area obtained by enlarging or reducing the circumscribed rectangle of the feature points belonging to the cluster may also be the per-combination candidate for the feature area.

Note that, as the clustering processing performed on the matching feature points, it is possible to use various known methods, and the clustering processing is performed by using a method such as a non-hierarchical cluster analysis such as, e.g., the K-means method. For example, by using the K-means method, the feature points which are present in a predetermined area (e.g., in an area positioned ±1 inch away from the center) with the feature point (best point) having the highest matching degree (0 to 100%) in the feature point matching used as the center are divided into two clusters, a cluster which includes the best point and a cluster which does not include the best point. Subsequently, the circumscribed rectangle of the feature points in the cluster including the best point is used as the per-combination candidate for the feature area, the feature points in the cluster including the best point are excluded, the best point is determined from the matching feature points again, and the clustering is performed. By repeating this processing, it becomes possible to divide the matching feature points into many (a plurality of) clusters, and generate a plurality of the per-combination candidates for the feature area.

Note that the clustering is performed based on the degree of similarity of the position (a coordinate position or the like) of the matching feature point. In addition, the number of clusters can be set to any number. Further, FIG. 19 shows the example in which the per-combination candidate for the feature area of the combination of the learning image 1 and the learning image 2 is generated by using the matching feature points in the learning image 2, but the generation of the per-combination candidate for the feature area is not limited thereto, and the per-combination candidate for the feature area may also be generated by using the matching feature points in the learning image 1. In addition, the method is not limited to the clustering as long as the method is capable of grouping the matching feature points based on the degree of similarity, and various known methods may be used.

The common area extraction unit 31 determines the candidate for the feature area based on the per-combination candidate for the feature area generated in each combination. Specifically, the common area extraction unit 31 detects the per-combination candidate for the feature area having a position (coordinates) and a size which are common to (match those of) all of the combinations of the learning images, and determines the candidate for the feature area based on the per-combination candidate for the feature area common to all of the combinations. Note that, in consideration of a difference in the type of an apparatus, an individual difference of the apparatus, and an error in each scanning, in the case where the positions and the sizes of the per-combination candidates for the feature area are substantially identical to each other (a difference therebetween is not more than a predetermined value) as well, it may be determined that the positions and the sizes thereof are identical to each other.

FIG. 20 is a diagram showing an example of a method for generating the candidate for the feature area according to the present embodiment. FIG. 20 shows the per-combination candidates for the feature area (thick-line frames in the drawing (including broken-line frames)) generated in the combination of the first and second learning images and the combination of the third and fourth learning images in the case where the number of learning images is four. As shown in FIG. 20, the per-combination candidate for the feature area of the broken-line frame is not an area having the position and the size common to all of the combinations (two combinations in the case of FIG. 20). It is unlikely that such an area is an area common to images having a predetermined format, and the area is not suitable as the feature area used in the erectness determination, and hence the area is excluded from the target of the candidate for feature area. On the other hand, as shown in FIG. 20, the per-combination candidate for the feature area of the thick-line frame in a solid line is an area having the position and the size substantially common to two combinations, and it is presumably likely that the area is an area common to the images having the predetermined format. Thus, the common area extraction unit 31 determines the candidate for the feature area based on the per-combination candidate for the feature area having the position and the size common to all of the combinations of the learning images.

The common area extraction unit 31 determines the candidate for the feature area by detecting an overlap of areas (rectangles) of the per-combination candidates for the feature area which are determined to be identical in position and size in all of the combinations of the learning images. As examples, the per-combination candidate for the feature area based on the first and second learning images indicated by a rectangle of coordinates (0, 0) to (2, 2), and the per-combination candidate for the feature area based on the third and fourth learning images indicated by a rectangle of coordinates (1, 1) to (3, 3), which are determined to be identical in position and size, are shown. In this case, an overlap of the rectangles of the per-combination candidates for the feature area is a rectangle of (1, 1) to (2, 2), and the overlap rectangle of (1, 1) to (2, 2) is determined (generated as) to be the candidate for the feature area by the common area extraction unit 31. Note that, in the case where the size of the overlap area (rectangle) is small such as the case where the size of the overlap area (rectangle) is smaller than a predetermined size, an area including the overlap area positioned at the center is enlarged, and the enlarged area may be determined to be the candidate for the feature area. In addition, when the area is enlarged, in the case where the enlarged area overlaps an overlap area of other per-combination candidates for the feature area, an area in which both areas are combined may be determined to be the candidate for the feature area.

FIG. 21 is a diagram showing an example of the candidate for the feature area according to the present embodiment. FIG. 21 shows the example in which the candidate for the feature area is generated (determined) as the result of detection of the overlap (overlap area) of the per-combination candidate for the feature area based on the learning images 1 and 2 and the per-combination candidate for the feature area based on the learning images 3 and 4 which are shown in FIG. 20. In FIG. 21, the candidate for the feature area is indicated by the thick-line frame. For example, with regard to a candidate for the feature area 83 shown in FIG. 21, an overlap of a per-combination candidate for the feature area 81 based on the learning images 1 and 2 and a per-combination candidate for the feature area 82 based on the learning images 3 and 4 in FIG. 20 is detected, and the candidate for the feature area 83 is an area which is determined based on the overlap area. For example, the common area extraction unit 31 detects the overlap of the per-combination candidates for the feature area generated in the individual combinations by causing the two images shown in FIG. 20 (an image 1 of the per-combination candidates for the feature area based on the learning images 1 and 2 and an image 2 of the per-combination candidates for the feature area based on the learning images 3 and 4) to overlap one another.

The candidate for the feature area 83 may be the overlap area of the per-combination candidate for the feature area 81 and the per-combination candidate for the feature area 82, and may also be an area obtained by enlarging or reducing the overlap area. Thus, in the case where N combinations (two combinations in the above example) of the learning images for performing the matching processing are determined, the candidate for the feature area is determined based on (the overlap area of) N (two in the above example) per-combination candidates for the feature area which are determined to be identical in position and size.

Note that, in the case where the number of learning images is two, only one combination (pair) of the learning images is determined, and hence the per-combination candidate for the feature area generated by using the two learning images is determined to be the candidate for the feature area (the candidate for the feature area=the per-combination candidate for the feature area).

The reliability determination unit 32 determines, for each of one or more candidates for the feature area, common area reliability indicative of the degree to which the candidate for the partial area is suitable as the feature area used in the erectness determination (the degree of suitability for the orientation determination). The reliability determination unit 32 includes a commonality degree determination unit 32A, an unsuitability determination unit 32B, an exclusion degree determination unit 32C, and a reliability calculation unit 32D.

The commonality degree determination unit 32A determines a commonality degree indicative of the degree of a possibility that the candidate for the feature area is an area which a plurality of images that have a predetermined format and are different from each other have in common at substantially the same position. The commonality degree determination unit 32A determines (calculates) the commonality degree of the candidate for the feature area based on one or more attributes (evaluation indexes) of the candidate for the feature area. More specifically, the commonality degree determination unit 32A calculates scores c1 to cm of the individual evaluation indexes (an evaluation index 1 to an evaluation index m, m is the number of evaluation indexes) of the commonality degree, and calculates a commonality degree C. based on each score. In the present embodiment, a result obtained by multiplying calculated scores together is determined to be the commonality degree (C=c1× . . . ×cm).

Examples of the attribute (evaluation index) of the candidate for the feature area include the degree of matching (the number (density) of matching feature points, a matching degree and/or the like) of the learning images in an area related to the candidate for the feature area (an area of the candidate for the feature area or the area of the per-combination candidate for the feature area having served as the base for the candidate for the feature area), the size (area size) of the area related to the candidate for the feature area, the position thereof, and a possibility of change of a character string in the area related to the candidate for the feature area. The commonality degree determination unit 32A determines the commonality degree based on, among these attributes (evaluation indexes), at least one attribute (the score of the evaluation index).

Evaluation Index 1 of Commonality Degree: Matching Degree of Matching Feature Point The commonality degree determination unit 32A determines the score c1 of the evaluation index 1 by using the matching degree of the matching feature point related to the candidate for the feature area (the matching feature point in the area related to the candidate for the feature area) as the evaluation index 1 of the commonality degree. In the present embodiment, the score c1 of the evaluation index 1 is determined by using the matching degree of the matching feature point (see circles in FIG. 19) in the area of the per-combination candidate for the feature area (hereinafter referred to as "the per-combination candidate for the feature area corresponding to the candidate for the feature area") used (having served as the base for the candidate for the feature area) when the candidate for the feature area is determined as the matching degree of the matching feature point related to the candidate for the feature area. The matching feature points in the area of the per-combination candidate for the feature area denote the feature points (the feature points used for determining the circumscribed rectangle) which match as the result of the feature point matching performed by the common area extraction unit 31 when the per-combination candidate for the feature area is generated (the matching feature points are the feature points included in a learning image in the plurality of learning images and match the feature points included in another learning image in the plurality of learning images).

It is presumed that, in an area including feature points having high matching degrees in the feature point matching between the learning images, it is highly likely that shapes of an object in the area are identical to each other between the learning images. Accordingly, the score c1 of the evaluation index 1 is determined such that the commonality degree of the candidate for the feature area increases as the matching degree (0 to 100%) of each matching feature point related to the candidate for the feature area increases.

First, the commonality degree determination unit 32A calculates the score c1 (n) (n=1 to N, N is the number of combinations) of the matching degree of the matching feature point positioned in the area of the per-combination candidate for the feature area for each of the per-combination candidates for the feature area corresponding to the candidate for the feature area. In examples in FIGS. 20 and 21, the per-combination candidates for the feature area corresponding to the candidate for the feature area 83 are the per-combination candidates for the feature area 81 and 82 and, in order to determine the score c1 of the candidate for the feature area 83, the score c1 (1) of the matching degree of the matching feature point in the per-combination candidate for the feature area 81 and the score c1 (2) of the matching degree of the matching feature point in the per-combination candidate for the feature area 82 are calculated.

For example, in each per-combination candidate for the feature area, the score c1 (n) of the matching degree of the matching feature point is calculated by c1 (n)=a value obtained by adding up the matching degrees of all of the matching feature points positioned in the area of the per-combination candidate for the feature area the number of the matching feature points positioned in the area. Thus, c1 (n) may be a representative value (e.g., an average) of the matching degrees of all of the matching feature points positioned in the area of the per-combination candidate for the feature area. Subsequently, the commonality degree determination unit 32A calculates a representative value (e.g., an average) of the scores (c1 (1) to c1 (N)) of the matching degrees of all of the per-combination candidates for the feature area corresponding to the candidate for feature area as the score c1 of the candidate for the feature area.

Evaluation Index 2 of Commonality Degree: Size (Area Size) of Area Related to Candidate for Feature Area The commonality degree determination unit 32A determines the score c2 of the evaluation index 2 by using the size (area size) of the area related to the candidate for the feature area as the evaluation index 2 of the commonality degree. More specifically, the score c2 of the evaluation index 2 is determined by using the area size of the area of the per-combination candidate for the feature area corresponding to the candidate for the feature area as the area size of the area related to the candidate for the feature area. As the feature area used in the erectness determination, it is preferable to select an area of an object common to a predetermined format such as a title or a logo. The title, the logo or the like is a relatively large (having an area of not less than a specific area size) object in many cases. Accordingly, the score c2 of the evaluation index 2 is determined such that the commonality degree of the candidate for the feature area increases as the area size of the area related to the candidate for the feature area increases. By using the method for determining the score, it becomes possible to decrease the commonality degree of the candidate for the feature area related to an area having a small area size (part of a character portion or the like) having a high possibility (possibility of an erroneous match) that the feature points accidentally match each other between images as the result of the feature point matching.

First, the commonality degree determination unit 32A calculates the score c2 (n) (n=1 to N, N is the number of combinations) of the area size for each of the per-combination candidates for the feature area corresponding to the candidate for the feature area. In the examples in FIGS. 20 and 21, in order to determine the score c2 of the candidate for feature area 83, the score c2 (1) of the area size of the area of the per-combination candidate for the feature area 81 and the score c2 (2) of the area size of the area of the per-combination candidate for the feature area 82 are calculated.

For example, in each per-combination candidate for the feature area, the score c2 (n) of the area size of the per-combination candidate for the feature area is calculated by c2 (n)=the area size of the per-combination candidate for the feature area x an offset factor. For example, the offset factor is set to 0.0001 such that the score c2 (n)=1 (100%) is satisfied in the case where the area size of the per-combination candidate for the feature area is an area size of 100 pixels×100 pixels. Subsequently, the commonality degree determination unit 32A calculates a representative value (e.g., an average) of the scores (c2 (1) to c2 (N)) of all of the per-combination candidates for the feature area corresponding to the candidate for the feature area as the score c2 of the candidate for the feature area.

Evaluation Index 3 of Commonality Degree: Density of Matching Feature Point

The commonality degree determination unit 32A determines the score c3 of the evaluation index 3 by using the density (number) of matching feature points related to the candidate for the feature area as the evaluation index 3 of the commonality degree. In the present embodiment, the score c3 of the evaluation index 3 is determined by using the density of the matching feature points (see circles in FIG. 19) in the area of the per-combination candidate for the feature area corresponding to the candidate for the feature area as the density of the matching feature points related to the candidate for the feature area. Note that, similarly to the evaluation index 1, the matching feature points in the area of the per-combination candidate for the feature area denote the feature points which match as the result of the feature point matching performed by the common area extraction unit 31 when the per-combination candidate for the feature area is generated.

It is presumed that, in an area including many matching feature points between the learning images, it is highly likely that shapes of an object in the area are identical to each other between the learning images. Accordingly, the score c3 of the evaluation index 3 is determined such that the commonality degree of the candidate for the feature area increases as the density of the matching feature points (the number of feature points per unit area size) related to the candidate for the feature area increases.

First, the commonality degree determination unit 32A calculates the score c3 (n) (n=1 to N, N is the number of combinations) of the density of the matching feature points positioned in the area of the per-combination candidate for the feature area for each of the per-combination candidates for the feature area corresponding to the candidate for the feature area. In the examples in FIGS. 20 and 21, in order to determine the score c3 of the candidate for the feature area 83, the score c3 (1) of the density of the matching feature points in the per-combination candidate for the feature area 81 and the score c3 (2) of the density of the matching feature points in the per-combination candidate for the feature area 82 are calculated.

For example, in each per-combination candidate for the feature area, the score c3 (n) of the density of the feature points is calculated by c3 (n)=the number of the matching feature points positioned in the area of the per-combination candidate for the feature area the area size of the area×the offset factor. For example, the offset factor is set to 1000 such that c3 (n)=1 (100%) is satisfied in the case where ten matching feature points are included in an area size of 100 pixels×100 pixels. Subsequently, the commonality degree determination unit 32A calculates a representative value (e.g., an average) of the scores (c3 (1) to c3(N)) of all of the per-combination candidates for the feature area corresponding to the candidate for the feature area as the score c3 of the candidate for the feature area.

Evaluation Index 4 of Commonality Degree: Position of Area Related to Candidate for Feature Area The commonality degree determination unit 32A determines the score c4 of the evaluation index 4 by using the position of the area related to the candidate for the feature area as the evaluation index 4 of the commonality degree. More specifically, the score c4 of the evaluation index 4 is determined by using the position of the per-combination candidate for the feature area corresponding to the candidate for the feature area in the image as the position of the area related to the candidate for the feature area. As described above, as the feature area used in the erectness determination, it is preferable to select the area of the title or the logo, and the title or the log is relatively positioned at an upper edge or a lower edge of a manuscript in many cases. Accordingly, the score c4 of the evaluation index 4 is determined such that the commonality degree of the candidate for the feature area increases as the position of the area related to the candidate for the feature area approaches the upper edge or the lower edge of the manuscript (the learning image (predetermined format)).

First, the commonality degree determination unit 32A calculates the score c4 (n) (n=1 to N, N is the number of combinations) of the position for each of the per-combination candidates for the feature area corresponding to the candidate for the feature area. In the examples in FIGS. 20 and 21, in order to determine the score c4 of the candidate for the feature area 83, the score c4 (1) of the position (the position in the image) of the area of the per-combination candidate for the feature area 81 and the score c4 (2) of the position of the area of the per-combination candidate for the feature area 82 are calculated.

For example, in each per-combination candidate for the feature area, the score c4 (n) of the position of the per-combination candidate for the feature area is calculated by c4 (n)=abs (the center (the center of gravity) coordinate position (height direction) of the per-combination candidate for the feature area (area) the height of the manuscript−0.5)× the offset factor. Note that the center coordinate position (height direction) of the per-combination candidate for the feature area is the coordinate position in the height direction (vertical direction) when the lower edge of the manuscript (learning image) is 0. For example, the offset factor is set to 2.0 such that the score c4 (n)=1 (100%) is satisfied in the case where the center of the area of the per-combination candidate for the feature area is at the upper edge or the lower edge of the manuscript. Subsequently, the commonality degree determination unit 32A calculates a representative value (e.g., an average) of the scores (c4 (1) to c4 (N)) of all of the per-combination candidates for the feature area corresponding to the candidate for the feature area as the score c4 of the candidate for the feature area. Note that the center coordinate position (a position in the learning image) of the per-combination candidate for the feature area may be a position in any learning image selected from a plurality of acquired learning images.

Evaluation Index 5 of Commonality Degree: Possibility of Change of Character String in Area Related to Candidate for Feature Area The commonality degree determination unit 32A determines the score c5 of the evaluation index 5 by using a possibility of change of a character string in the area related to the candidate for the feature area as the evaluation index 5 of the commonality degree. It is presumed that there are cases where the learning image is unbalanced such as the case where all of the learning images are images related to a form in which the same date or the same client is described. In this case, there is a possibility that, in an area of a character string of which contents can be changed such as the date, it is determined that a plurality of the learning images locally match each other and the area is extracted as the candidate for the feature area. However, it is presumed that it is unlikely that the candidate for the feature area of the character string of which the contents (numbers or characters) can be changed is an area common to images having a predetermined format.

Accordingly, the score c5 of the evaluation index 5 is determined such that the commonality degree of the candidate for the feature area decreases as the ratio of character strings of which the contents are highly likely to be changed and which are included in the area related to the candidate for the feature area increases. Note that examples of the character string of which the contents are highly likely to be changed include dates, names, place-names, and numbers. In addition, in the present embodiment, the character string means a combination (arrangement) of one or more characters, numbers, or signs.

The commonality degree determination unit 32A extracts (recognizes) the character string in the area of the candidate for the feature area by performing, e.g., optical character recognition (OCR) on the area of the candidate for the feature area. Subsequently, the commonality degree determination unit 32A determines whether the extracted (recognized) character string includes the character string of which the contents are highly likely to be changed. In the case where the extracted (recognized) character string includes the character string of which the contents are highly likely to be changed, the area size of the area of the character string (the area size of a circumscribed rectangle of the character string which is highly likely to be changed) is calculated. Subsequently, the score c5 of the possibility of change of the character string in the area related to the candidate for the feature area is calculated by, e.g., c5=(the area size of the candidate for the feature area−the area size of the area related to the character string which is highly likely to be changed)÷the area size of the candidate for the feature area.

As described above, with regard to the evaluation indexes 1 to 4, the example in which the scores c1 to c4 of the candidate for the feature area are determined by calculating the scores of the per-combination candidates for the feature area first and then calculating the representative value of the scores is described. However, instead of calculating the scores c1 to c4 based on the score of the per-combination candidate for the feature area, the scores c1 (n) to c4 (n) may be multiplied together for each per-combination candidate for the feature area and the commonality degree may be calculated based on a representative value of the result of the multiplication (c1 (n)× . . . ×c4 (n)).

In addition, with regard to the evaluation indexes 2 and 4, similarly to the evaluation index 5, instead of using the area size or the position of the area of the per-combination candidate for the feature area, the scores c2 and c4 may be calculated by using the area size or the position of the area of the candidate for the feature area. Conversely, with regard to the evaluation index 5, instead of using the ratio of the character string which is highly likely to be changed and is included in the area of the candidate for the feature area, similarly to the evaluation indexes 1 to 4, the score c5 may be calculated by using the ratio of the character string which is highly likely to be changed and is included in the area of the per-combination candidate for the feature area corresponding to the candidate for the feature area. In this case, as described above, the scores c1 (n) to c5 (n) are multiplied together for each per-combination candidate for the feature area, and the commonality degree may be calculated based on a representative value of the result of the multiplication (c1 (n)× . . . ×c5 (n)).

Note that, in the case where the number of learning images is two, only one combination (pair) of the learning images is determined, and hence the score (e.g., c1) of the candidate for the feature area is determined to be equal to the score (e.g., c1 (1)) of the per-combination candidate for the feature area generated by using the two learning images (the score of the candidate for the feature area=the score of the per-combination candidate for the feature area).

In addition, with regard to the evaluation indexes 1 and 3, instead of using the number of feature points (matching feature points) in the area of the per-combination candidate for the feature area corresponding to the determined candidate for the feature area or the matching degrees thereof, the number of, among the matching feature points in each combination, the feature points present in the area of the determined candidate for the feature area or the matching degrees thereof may also be used.

The unsuitability determination unit 32B determines whether the candidate for the feature area extracted (generated) by the common area extraction unit 31 corresponds to an unsuitable area which is an area unsuitable for the erectness determination (an area which adversely affects the image orientation determination). The unsuitable area is an area which may not be capable of being detection, an area which may cause erroneous recognition in which the orientation of the image is erroneously recognized as another orientation, and/or an area related to an object having a rotationally symmetrical shape (an area which does not allow the orientation to be determined uniquely). In the present embodiment, it is determined whether the candidate for the feature area corresponds to each of the above-described three unsuitable areas, but the determination is not limited thereto, and it may also be determined whether the candidate for the feature area corresponds to only one or two unsuitable areas out of the three unsuitable areas.

Unsuitable Area 1 (Area which May not be Capable of Being Detection)

The unsuitability determination unit 32B performs a determination of whether the area of the candidate for the feature area extracted by the common area extraction unit 31 and areas at the same (substantially the same) position as that of the candidate for the feature area in all of the learning images in the erect state match each other. More specifically, the unsuitability determination unit 32B performs a determination of whether it is possible to correctly determine the orientations of all of the learning images in the case where the candidate for the feature area is used as the feature area. For example, the area of the candidate for the feature area in the learning image extracted by the common area extraction unit 31 is used as "the feature area of the registered image", all of the learning images in the erect state are used as "the determination target images", and the erectness determination processing shown in FIGS. 15 and 16 is performed by the erectness determination unit 27.

The unsuitability determination unit 32B determines whether, among all of the learning images, at least one or more learning images which are not determined to be in the erect state correctly in the erectness determination processing are present. In the case where the learning image of which the orientation is not determined correctly is present, the candidate for the feature area is presumed to be the area which is not capable of being detection depending on the image (manuscript) (the area which may not be capable of being detection (which is not capable of being detection in some cases)), and hence the unsuitability determination unit 32B determines that the candidate for the feature area is the unsuitable area.

Note that, in the present embodiment, it is determined whether the area of the candidate for the feature area and the area at the position corresponding (substantially identical) to the position of the candidate for the feature area in each learning image in the erect state match each other by the erectness determination processing which uses the candidate for the feature area and the learning image. However, the method for determining whether they match each other is not limited to the method shown as an example in the present embodiment, and the determination may also be performed by a method which uses so-called template matching (pattern matching).

Unsuitable Area 2 (Area which May Cause Erroneous Recognition in which Orientation of Image is Erroneously Recognized as Another Orientation)

The unsuitability determination unit 32B performs a determination of whether the area of the candidate for the feature area extracted by the common area extraction unit 31 and the area at the same position (substantially the same position) as that of the candidate for the feature area in the learning image in a state in which the learning image in the erect state is rotated match each other. More specifically, the unsuitability determination unit 32B performs a determination of whether the orientation is determined erroneously, such as the case where the learning image which is not in the erect state is determined to be the learning image in the erect state, in the case where the candidate for the feature area is used as the feature area. For example, the area of the candidate for the feature area in the learning image extracted by the common area extraction unit 31 is used as "the feature area of the registered image", all of the learning images in a rotated state (e.g., a state in which the learning image in the erect state is rotated by 90 degrees, 180 degrees, or 270 degrees) are used as "the determination target images", and the erectness determination processing shown in FIGS. 15 and 16 is performed by the erectness determination unit 27.

The unsuitability determination unit 32B determines whether, among all of the learning images in the rotated state, at least one or more learning images which are determined to be in the erect state erroneously in the erectness determination processing are present. In the case where the erroneously determined learning image is present, the candidate for the feature area is presumed to be the area which is highly likely to cause the erroneous recognition in which the orientation of the determination target image is erroneously recognized as another orientation, and hence the unsuitability determination unit 32B determines that the candidate for the feature area is the unsuitable area. For example, in the case where point-symmetrical icons (objects) are present at the upper left and the lower right of a manuscript, the icons match each other when the image is rotated by 180 degrees, and hence it is determined that the candidate for the feature area related to the icon is the area which causes the erroneous recognition in which the orientation of the image is erroneously recognized as another orientation.

Note that, in the present embodiment, it is determined whether the area of the candidate for the feature area and the area at the position corresponding (substantially identical) to the position of the candidate for the feature area in each learning image in the rotated state match each other by the erectness determination processing which uses the candidate for the feature area and the learning image. However, the method for determining whether they match each other is not limited to the method shown as an example in the present embodiment, and the determination may also be performed by a method which uses template matching (pattern matching).

Unsuitable Area 3 (Rotationally Symmetrical Area)

The unsuitability determination unit 32B determines whether the candidate for the feature area extracted by the common area extraction unit 31 is a rotationally symmetrical area (an area related to an object having a rotationally symmetrical shape (a character, a sign, a figure or the like)). More specifically, the unsuitability determination unit 32B performs the pattern matching (template matching) between the candidate for the feature area in the erect state and the candidate for the feature area in the rotated state (e.g., a state in which the candidate for the feature area in the erect state is rotated by 90 degrees, 180 degrees, or 270 degrees). In the case where the candidate for the feature area in the rotated state which matches the candidate for the feature area in the erect state is present, i.e., in the case where the candidate for the feature area is the rotationally symmetrical area, the candidate for the feature area is presumed to be the area which causes erroneous detection in which an object having the same shape is present at another place, and hence the unsuitability determination unit 32B determines that the candidate for the feature area is the unsuitable area.

Examples of the rotationally symmetrical area (an area which does not allow the orientation to be determined uniquely) include a point-symmetrical area (shapes thereof match each other when the area is rotated by 180 degrees) (a letter (I, 8, N), a sign (%, a map symbol of a power plant), a figure (the national flag of England) or the like), and a square symmetrical area (shapes thereof match each other when the area is rotated by 0 degrees, 90 degrees, 180 degrees, and 270 degrees) (a letter (O, X), a sign (+, a map symbol of a police station), a figure (the national flag of Japan) or the like). Note that, strictly, a bar code is not a rotationally symmetrical object (area), but it is presumed that, even when the position or the thickness of stripe-patterned lines of the bar code is changed (becomes different), the bar code has a similar feature amount, and hence the bar code may be regarded as the rotationally symmetrical object.

The exclusion degree determination unit 32C determines an exclusion degree indicative of the degree of exclusion of the candidate for the feature area from the target of the feature area used in the erectness determination in accordance with the determination result of the unsuitability determination unit 32B. In the present embodiment, the exclusion degree determination unit 32C determines, as the exclusion degree, an exclusion factor E serving as an index which is set such that the common area reliability of the candidate for the feature area decreases in the case where the candidate for the feature area is the unsuitable area. The exclusion factor is, e.g., a parameter which can be set (determined) in a range of 0 to 1. For example, in the case where it is determined that the candidate for the feature area corresponds to the above-described unsuitable area, the exclusion factor is determined to be 0 (times) and, in the case where it is determined that the candidate for the feature area does not correspond to the unsuitable area, the exclusion factor is determined to be 1 (times). Note that, in the present embodiment, in the case where it is determined that the candidate for the feature area corresponds to the unsuitable area, the exclusion factor is set to 0 (i.e., the common area reliability is 0) in order to exclude the candidate for the feature area from the target of the feature area. However, the value of the exclusion factor is not limited thereto, and a numerical value other than 0 and 1 (e.g., 0.5 or the like) may also be determined according to the degree of correspondence to the unsuitable area. Note that the exclusion degree is not limited to the parameter (exclusion factor) by which the commonality degree is multiplied as long as the exclusion degree is capable of increasing or decreasing the common area reliability, and may also be, e.g., a parameter which is added to or subtracted from the commonality degree.

The reliability calculation unit 32D calculates the common area reliability based on the commonality degree and the determination result of the unsuitability determination unit 32B. For example, the common area reliability is calculated based on the commonality degree and the exclusion degree. In the present embodiment, the reliability calculation unit 32D calculates common area reliability R by the common area reliability R=the commonality degree C.×the exclusion factor E. Note that the method for calculating the common area reliability is not limited to the method shown as an example in the present embodiment, and the common area reliability may also be calculated by a method in which the exclusion degree is not calculated. For example, in the case where the unsuitability determination unit 32B determines that the candidate for the feature area corresponds to the unsuitable area, the common area reliability may be calculated as the common area reliability R=0. On the other hand, in the case where the unsuitability determination unit 32B determines that the candidate for the feature area does not correspond to the unsuitable area, the common area reliability may be calculated as the common area reliability=the commonality degree.

The area determination unit 33 determines one or more feature areas used in the erectness determination from one or more candidates for the feature area based on the common area reliability. For example, one candidate for the feature area having the highest common area reliability is determined to be the feature area by the area determination unit 33. In addition, a plurality of the candidates for the feature area, selected starting with the highest (i.e., in descending order of) common area reliability, may be determined to be the feature areas by the area determination unit 33. Note that, when a plurality of the feature areas are determined, in the case where it is determined that the registered image and the determination target image match each other (are similar to each other) in all of the feature areas in the erectness determination processing, the orientation of the determination target image may be finalized.

Figure 22:
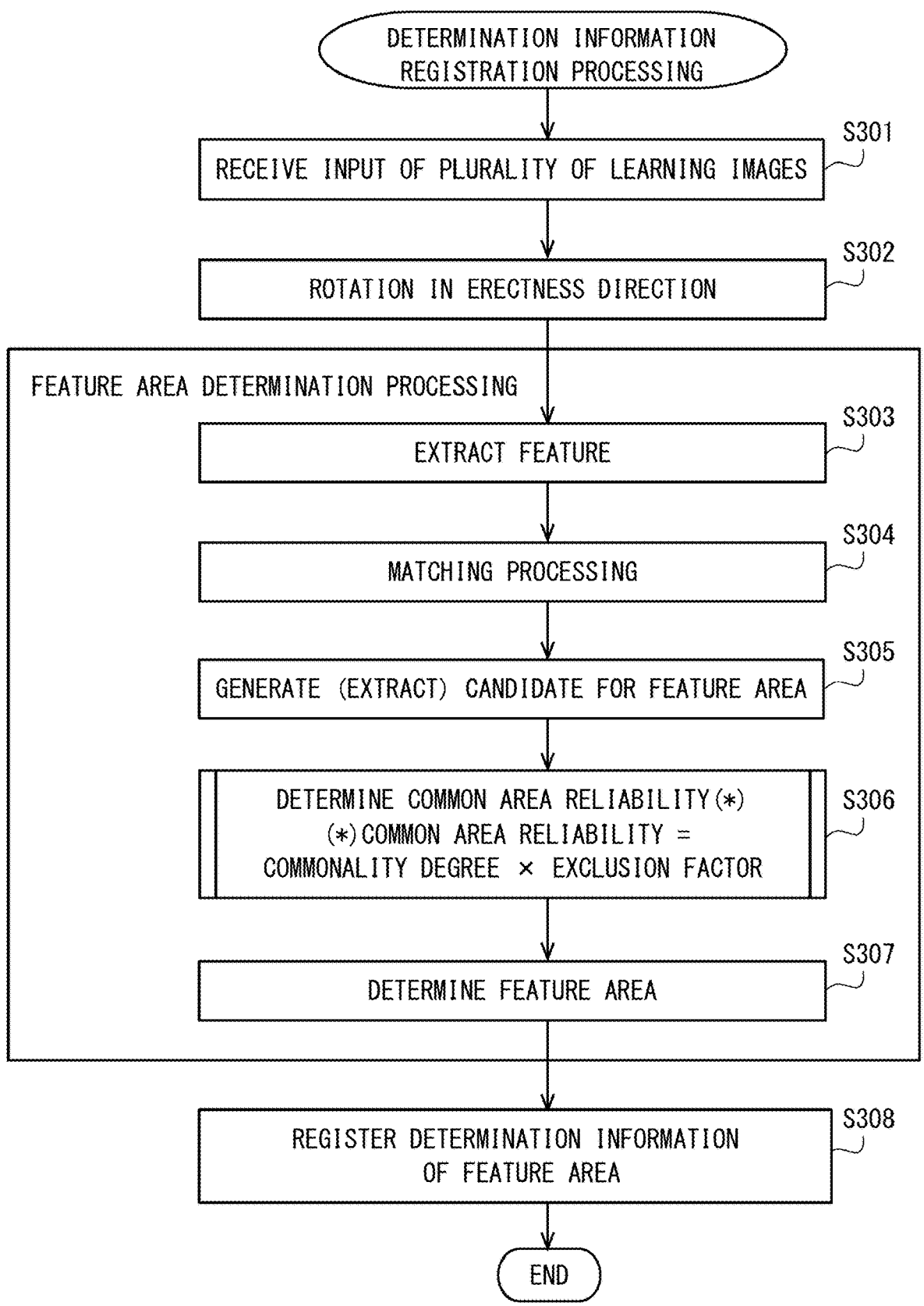
FIG. 22 is a flowchart showing the outline of the flow of the determination information registration processing according to the second embodiment.

FIG. 22 is a flowchart showing the outline of the flow of the determination information registration processing according to the present embodiment. The determination information registration processing according to the present embodiment is executed at a timing when, in the information processing apparatus 1, the new registration button or the like is pressed on the registration screen (not shown) by the user and the instruction to scan a form of which the determination information is to be newly registered is performed. Note that, in the present embodiment, the image of the form is acquired by scanning the form, but the image is not limited to the form as long as the image is a captured image, and images or photographs of other documents may be used.

In Step S301, input of a plurality of learning images having a predetermine format is received. When the scan processing of a plurality of manuscripts of the form (the form on which the erectness correction is to be performed) of which the determination information is to be registered is performed in the image acquisition apparatus 9, the image reception unit 22 acquires images (a plurality of the learning images) of a plurality of the scanned manuscripts from the image acquisition apparatus 9 (receives the input of the learning images). Note that the image reception unit 22 may acquire the learning images which are pre-stored in the storage device 14 instead of acquiring the learning images from the image acquisition apparatus 9.

In addition, in the present embodiment, in Step S301, all of the images scanned by the image acquisition apparatus 9 are acquired as the learning images, and the processing in and after Step S302 is executed, but the processing is not limited thereto. For example, part (a plurality) of all of the scanned images may be selected as the learning images by the user, and the processing in and after Step S302 may be executed on the selected images (learning images). Thereafter, the processing proceeds to Step S302.

In Step S302, with an instruction of the user, the learning image is rotated in the erectness direction. The instruction input reception unit 30 receives an instruction to rotate, among all of the learning images of which the input is received in Step S301, the learning image which is not erect in the erectness direction from the user. Subsequently, the rotation unit 26 rotates the learning image related to the rotation instruction in the erectness direction. Note that, in the case where all of the learning images of which the input is received in Step S301 are in the erect state, the processing in Step S302 does not need to be executed. Thereafter, the processing proceeds to Step S303. In Step S303 to Step S307, processing of automatically determining the feature area is performed.

In Step S303, the features in each learning image are extracted. The feature extraction unit 24 extracts the features in each learning image which is brought into the erect state in Step S302. In the present embodiment, the feature extraction unit 24 extracts the feature point(s) and the feature amount(s) from the entire area of the image for each learning image. Thereafter, the processing proceeds to Step S304.

In Step S304, the matching processing (feature point matching) is performed between the learning images. The common area extraction unit 31 performs the matching processing between the learning images based on the features (the feature point and the feature amount) of each learning image extracted in Step S303. In the present embodiment, the learning images are divided into combinations (pairs) of two images, and the feature point matching is performed on each combination of the learning images. Thereafter, the processing proceeds to Step S305.

In Step S305, one or more candidates for the feature area are generated (extracted). The common area extraction unit 31 generates the candidate for the feature area by extracting one or more areas (common areas) common to the learning images based on the result of the matching processing in Step S304. In the present embodiment, the common area extraction unit 31 performs clustering on the matching feature points which match in the matching processing in Step S304 for each combination (the matching feature points are the feature points included in a learning image in two learning images and match the feature points included in another learning image in two learning images), and classifies the matching feature points into one or more clusters. Subsequently, the common area extraction unit 31 generates an area surrounding the feature points belonging to the cluster (the per-combination candidate for the feature area) for each cluster obtained by the classification, and generates the candidate for the feature area based on the per-combination candidate for the feature area generated in each combination. Specifically, the common area extraction unit 31 determines the candidate for the feature area based on, among the per-combination candidates for the feature area, the per-combination candidate for the feature area having a position and a size common to all of the combinations of the learning images. Thereafter, the processing proceeds to Step S306.

In Step S306, the common area reliability is determined. The reliability determination unit 32 determines the common area reliability R indicative of the degree to which the candidate for the partial area is suitable as the feature area used in the erectness determination for each of one or more candidates for the feature area generated in Step S305. In the present embodiment, the common area reliability R is determined (calculated) by multiplying the commonality degree C. and the exclusion factor E together. Note that determination processing of the common area reliability will be described later in detail by using FIGS. 23 and 24. Thereafter, the processing proceeds to Step S307.

In Step S307, the feature area is automatically determined. The area determination unit 33 determines one or more feature areas used in the erectness determination from one or more candidates for the feature area based on the common area reliability determined in Step S306. For example, one candidate for the feature area having the highest common area reliability may be determined to be the feature area by the area determination unit 33, or a plurality of the candidates for the feature area each having high common area reliability may also be determined to be the feature areas by the area determination unit 33. Thereafter, the processing proceeds to Step S308.

In Step S308, the determination information of the feature area is registered (stored). The feature extraction unit 24 extracts the determination feature (the feature point and the feature amount) in the feature area determined in Step S307 and the position of the feature area in the state in which the learning image is erect. Note that the position of the feature area in the learning image may be the position in any learning image selected from a plurality of the acquired learning images. For example, the feature extraction unit 24 extracts the feature point and the feature amount in the feature area by the method such as SIFT, SURF, or A-KAZE. Subsequently, the determination information storage unit 21 associates the determination feature including the feature point, the feature amount, and the image data related to the feature area with the position of the feature area in the state in which the learning image is erect, and stores them. Thereafter, the processing shown in the present flowchart is ended.

Figure 23:
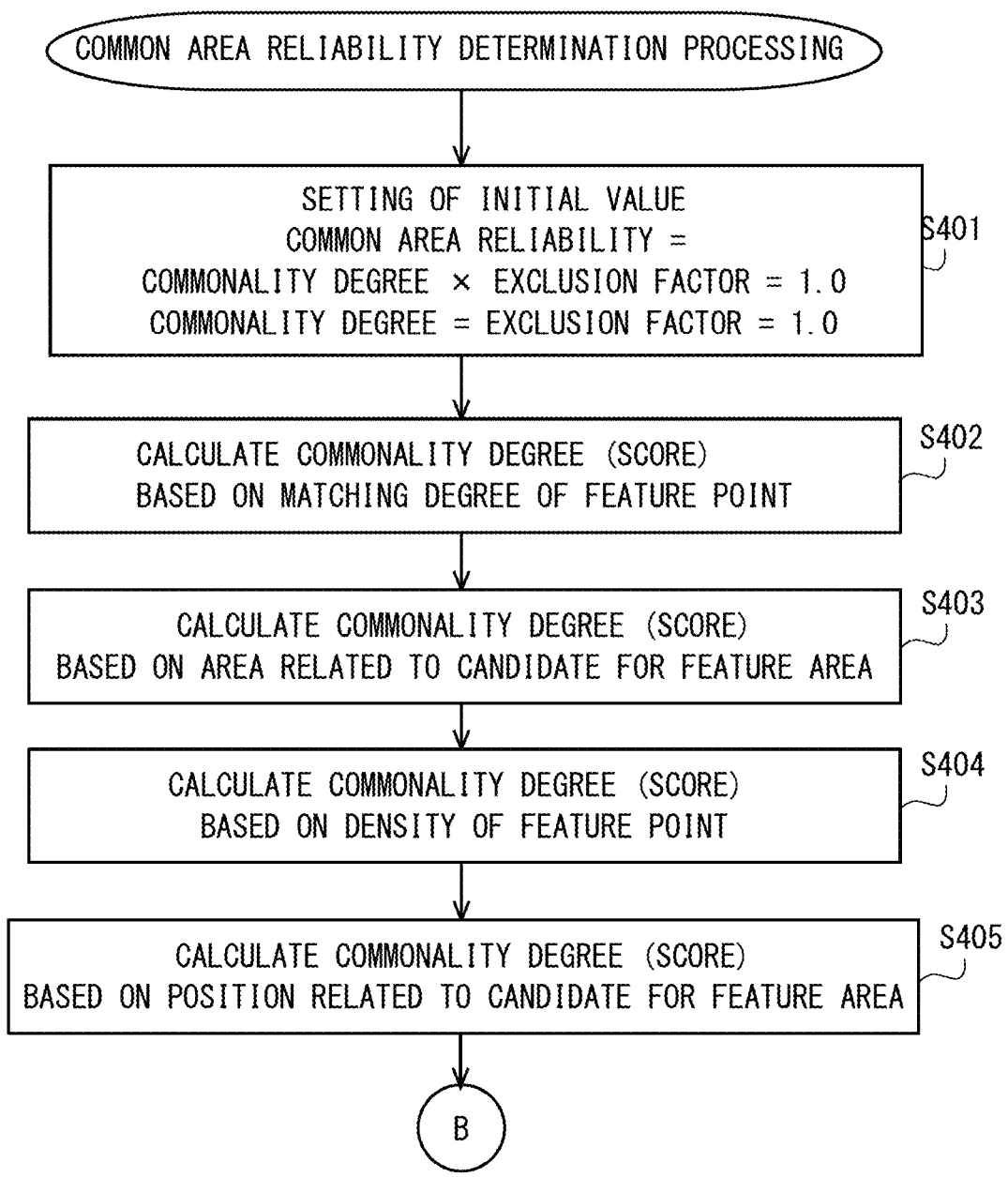
FIG. 23 is a flowchart (1) showing the outline of the flow of common area reliability determination processing according to the embodiment.
Figure 24:
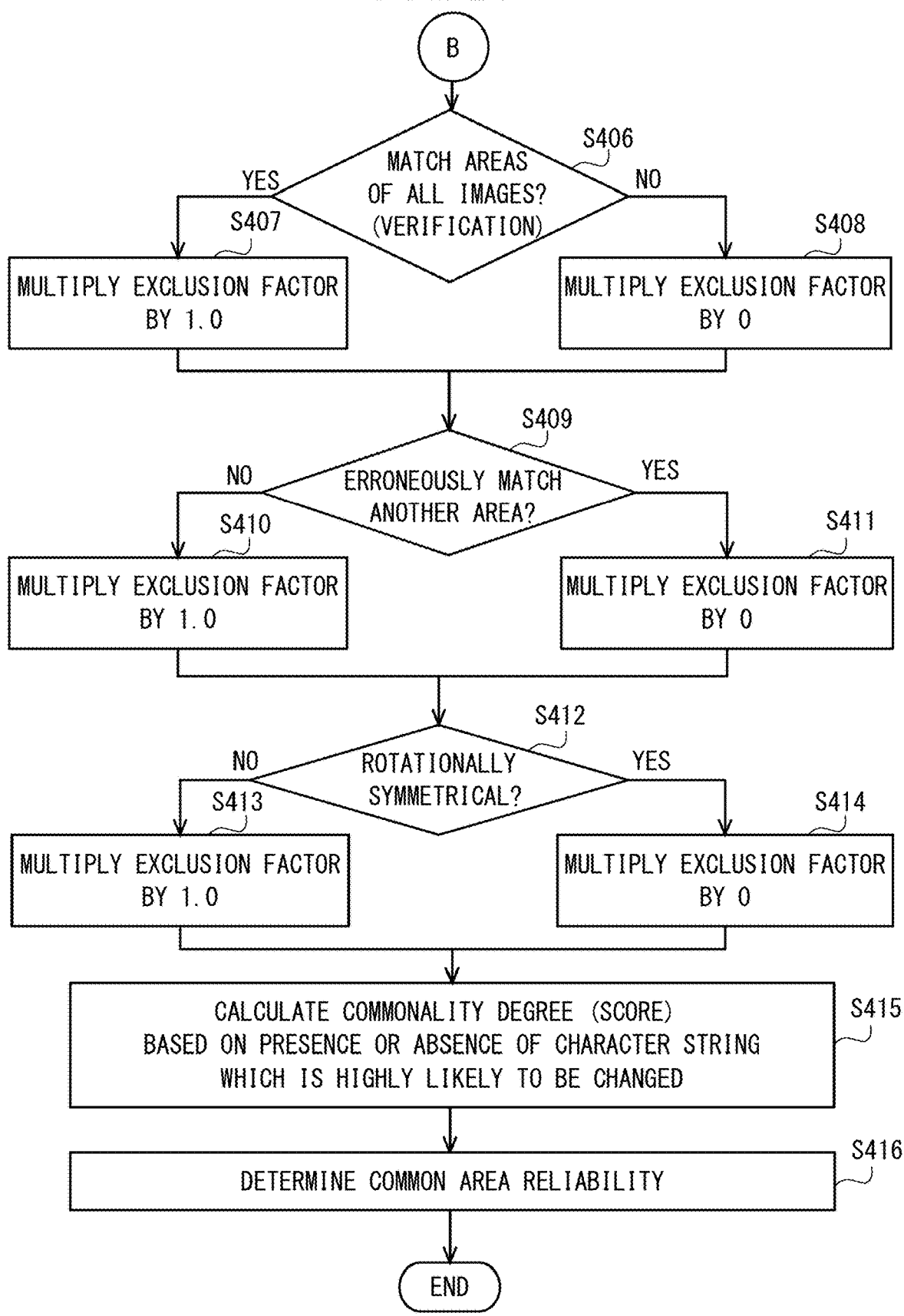
FIG. 24 is a flowchart (2) showing the outline of the flow of common area reliability determination processing according to the embodiment.

Each of FIGS. 23 and 24 is a flowchart showing the outline of the flow of common area reliability determination processing according to the present embodiment. The common area reliability determination processing according to the present embodiment is executed at a timing when the candidate for the feature area is generated in Step S305 in the determination information registration processing shown in FIG. 22. Note that the common area reliability determination processing (processing from Step S401 to Step S416) according to the present embodiment is executed on each candidate for the feature area individually.

In Step S401, initial values of the common area reliability, the commonality degree, and the exclusion factor are set. The commonality degree determination unit 32A sets an initial value C0 of the commonality degree C. to 1.0. The exclusion degree determination unit 32C sets an initial value E0 of the exclusion factor E to 1.0. In the present embodiment, the common area reliability is calculated by the common area reliability R=the commonality degree C.×the exclusion factor E, and the reliability calculation unit 32D sets an initial value R0 of the common area reliability R to 1.0 according to R0=C0×E0. Thereafter, the processing proceeds to Step S402.

Hereinbelow, in Step S402 to Step S415, every time the commonality degree C. (the scores c1 to c5 of the commonality degree) or the exclusion factor E is calculated (changed), the common area reliability is re-calculated (changed) by using the changed commonality degree or exclusion factor and a mathematical expression for calculating the common area reliability (R=C×E) by the reliability calculation unit 32D. Note that the calculation of the common area reliability is not limited thereto, and the common area reliability may also be calculated after the commonality degree and the exclusion factor are determined by Step S402 to Step S415.

In Step S402, the commonality degree (the score c1 of the evaluation index 1) is calculated based on the matching degree of the matching feature point related to the candidate for the feature area. The score c1 of the evaluation index 1 is determined such that the commonality degree of the candidate for the feature area increases as the matching degree of each matching feature point related to the candidate for the feature area (the matching feature point which matches in the matching processing in Step S304 in FIG. 22)

increases. The commonality degree determination unit 32A calculates the score c1 (n) of the matching degree of the matching feature point positioned in the area of the per-combination candidate for the feature area for each per-combination candidate for the feature area corresponding to the candidate for the feature area. Subsequently, the commonality degree determination unit 32A calculates the average of the scores (c1 (1) to c1 (N)) of the matching degrees of all of the per-combination candidates for the feature area corresponding to the candidate for the feature area as the score c1 of the candidate for the feature area. Further, the commonality degree determination unit 32A calculates (changes) the commonality degree by the commonality degree C.←C0*c1. Thereafter, the processing proceeds to Step S403.

In Step S403, the commonality degree (the score c2 of the evaluation index 2) is calculated based on the size (area size) of the area related to the candidate for the feature area. The score c2 of the evaluation index 2 is determined such that the commonality degree of the candidate for the feature area increases as the area size of the area related to the candidate for the feature area increases. The commonality degree determination unit 32A calculates the score c2 (n) of the area size of each per-combination candidate for the feature area corresponding to the candidate for the feature area. Subsequently, the commonality degree determination unit 32A calculates the average of the scores (c2 (1) to c2 (N)) of all of the per-combination candidates for the feature area corresponding to the candidate for the feature area as the score c2 of the candidate for the feature area. Further, the commonality degree determination unit 32A calculates (changes) the commonality degree by the commonality degree C.←C*c2. Thereafter, the processing proceeds to Step S404.

In Step S404, the commonality degree (the score c3 of the evaluation index 3) is calculated based on the density of the matching feature points related to the candidate for the feature area. The score c3 of the evaluation index 3 is determined such that the commonality degree of the candidate for the feature area increases as the density (the number of feature points per unit area size) of the matching feature points related to the candidate for the feature area increases. The commonality degree determination unit 32A calculates the score c3 (n) of the density of the matching feature points positioned in the area of the per-combination candidate for the feature area for each per-combination candidate for the feature area corresponding to the candidate for the feature area. Subsequently, the commonality degree determination unit 32A calculates the average of the scores (c3 (1) to c3 (N)) of all of the per-combination candidates for the feature area corresponding to the candidate for the feature area as the score c3 of the candidate for the feature area. Further, the commonality degree determination unit 32A calculates (changes) the commonality degree by the commonality degree C.←C*c3. Thereafter, the processing proceeds to Step S405.

In Step S405, the commonality degree (the score c4 of the evaluation index 4) is calculated based on the position of the area related to the candidate for the feature area. The score c4 of the evaluation index 4 is determined such that the commonality degree of the candidate for the feature area increases as the position of the area related to the candidate for the feature area approaches the upper edge or the lower edge of the manuscript (learning image (predetermined format)). The commonality degree determination unit 32A calculates the score c4 (n) of the position of each per-combination candidate for the feature area corresponding to the candidate for the feature area. Subsequently, the commonality degree determination unit 32A calculates the average of the scores (c4 (1) to c4 (N)) of all of the per-combination candidates for the feature area corresponding to the candidate for the feature area as the score c4 of the candidate for the feature area. Further, the commonality degree determination unit 32A calculates (changes) the commonality degree by the commonality degree C.←C*c4. Thereafter, the processing proceeds to Step S406 (FIG. 24). Note that, in Step S406, Step S409, and Step S412, it is determined whether the candidate for the feature area corresponds to the unsuitable area.

In Step S406, it is determined whether the candidate for the feature area is the area which fails to match each of the areas of all of the learning images in the erect state (the area which may not be capable of being detection). The unsuitability determination unit 32B determines whether the candidate for the feature area matches each of the areas of all of the learning images by determining (verifying) whether it is possible to determine the orientations of all of the learning images correctly (whether the candidate for the feature area succeeds in the erectness determination processing) in the case where the candidate for the feature area is used as the feature area. In the case where the candidate for the feature area matches each of the areas of all of the learning images (Step S406: YES), the processing proceeds to Step S407. On the other hand, in the case where the candidate for the feature area does not match the area of at least one of the learning images (Step S406: NO), the processing proceeds to Step S408.

In Step S407, the exclusion factor is determined. When it is determined that the candidate for the feature area does not correspond to the unsuitable area (the area which may not be capable of being detection), the exclusion degree determination unit 32C multiplies the exclusion factor by 1.0 (the exclusion factor E←E0*1.0). In other words, the candidate for the feature area which does not correspond to the unsuitable area is the area suitable as the feature area, and hence the exclusion factor is set such that the common area reliability is not reduced. Thereafter, the processing proceeds to Step S409.

In Step S408, the exclusion factor is determined. When it is determined that the candidate for the feature area corresponds to the unsuitable area (the area which may not be capable of being detection), the exclusion degree determination unit 32C multiplies the exclusion factor by 0 (the exclusion factor E←E0*0). In other words, the candidate for the feature area which corresponds to the unsuitable area is the area which is not suitable as the feature area, and hence the exclusion factor is set such that the common area reliability is reduced. Thereafter, the processing proceeds to Step S409.

In Step S409, it is determined whether the candidate for the feature area is the area (the area which may cause erroneous recognition in which the orientation of the image is erroneously recognized as another orientation) which erroneously matches (erroneously matches at another angle) an area (another area) of the learning image which is not in the erect state. The unsuitability determination unit 32B determines whether the candidate for the feature area matches each of the areas of all of the learning images which are not in the erect state by determining whether the orientation of the learning image which is not in the erect state is erroneously determined (whether the candidate for the feature area fails in the erectness determination processing) in the case where the candidate for the feature area is used as the feature area. In the case where the candidate for the feature area does not match (does not erroneously match (does not erroneously determine)) any of the areas of all of the learning images which are not in the erect state (Step S409: NO), the processing proceeds to Step S410. On the other hand, in the case where the candidate for the feature area matches (erroneously matches (erroneously determines)) the area of at least one of the learning images which are not in the erect state (Step S409: YES), the processing proceeds to Step S411.

In Step S410, the exclusion factor is determined. When it is determined that the candidate for the feature area does not correspond to the unsuitable area (the area which may cause erroneous recognition in which the orientation of the image is erroneously recognized as another orientation), the exclusion degree determination unit 32C multiplies the exclusion factor by 1.0 (the exclusion factor E←E*1.0). Thereafter, the processing proceeds to Step S412.

In Step S411, the exclusion factor is determined. When it is determined that the candidate for the feature area corresponds to the unsuitable area (the area which may cause erroneous recognition in which the orientation of the image is erroneously recognized as another orientation), the exclusion degree determination unit 32C multiplies the exclusion factor by 0 (the exclusion factor E←E*0). Thereafter, the processing proceeds to Step S412.

In Step S412, it is determined whether the candidate for the feature area is the rotationally symmetrical area (unsuitable area). The unsuitability determination unit 32B determines whether the candidate for the feature area is the rotationally symmetrical area by performing the pattern matching between the candidate for the feature area in the erect state and the candidate for the feature area in the rotated state (a state in which the candidate for the feature area in the erect state is rotated by, e.g., 90 degrees, 180 degrees, or 270 degrees). In the case where the candidate for the feature area is not the rotationally symmetrical area (the candidates for the feature area do not match each other as the result of the pattern matching) (Step S412: NO), the processing proceeds to Step S413. On the other hand, in the case where the candidate for the feature area is the rotationally symmetrical area (the candidates for the feature area match each other as the result of the pattern matching) (Step S412: YES), the processing proceeds to Step S414.

In Step S413, the exclusion factor is determined. When it is determined that the candidate for the feature area does not correspond to the unsuitable area (rotationally symmetrical area), the exclusion degree determination unit 32C multiplies the exclusion factor by 1.0 (the exclusion factor E←E*1.0). Thereafter, the processing proceeds to Step S415.

In Step S414, the exclusion factor is determined. When it is determined that the candidate for the feature area corresponds to the unsuitable area (rotationally symmetrical area), the exclusion degree determination unit 32C multiplies the exclusion factor by 0 (the exclusion factor E←E*0). Thereafter, the processing proceeds to Step S415.

In Step S415, the commonality degree (the score c5 of the evaluation index 5) is calculated based on the possibility of change of the character string in the candidate for the feature area. The score c5 of the evaluation index 5 is determined such that the commonality degree of the candidate for the feature area decreases as the ratio of the character strings of which the contents are highly likely to be changed and which are included in the area of the candidate for the feature area increases. The commonality degree determination unit 32A extracts the character string in the area of the candidate for the feature area by performing the OCR on the area of the candidate for the feature area, and determines whether the character string of which the contents are highly likely to be changed is included in the extracted (recognized) character string. Subsequently, the commonality degree determination unit 32A calculates the score c5 of the possibility of change of the character string in the candidate for the feature area by c5=(the area size of the candidate for the feature area−the area size of the area related to the character string which is highly likely to be changed)÷the area size of the candidate for the feature area. Further, the commonality degree determination unit 32A calculates (changes) the commonality degree by the commonality degree C.←C*c5. Thereafter, the processing proceeds to Step S416.

In Step S416, the common area reliability is determined. The common area reliability calculated based on the commonality degree C. and the exclusion factor E which are determined by Step S401 to Step S415 is determined to be the common area reliability of the candidate for the feature area by the reliability determination unit 32. Thereafter, the processing shown in the present flowchart is ended. Subsequently, the area determination unit 33 determines the feature area based on the common area reliability of each candidate for the feature area determined by the processing shown in the present flowchart.

Note that the processing from Step S401 to Step S405 (the calculation processing of c1 (n) to c4 (n) and c1 to c4) may also be executed for each combination at a timing when the per-combination candidate for the feature area is generated in Step S305 in FIG. 22. In addition, Step S402 to Step S405 are not in particular order. Similarly, Step S406 to Step S408, Step S409 to Step S411, and Step S412 to Step S414 are not in particular order. Further, the processing in Step S415 may be executed between Step S405 and Step S406.

In addition, in the present embodiment, the description has been given of the example in which, even in the case where the exclusion factor is calculated to be 0 in each of Step S408, Step S411, and Step S414 in FIG. 24, the processing proceeds to the next step. However, the present embodiment is not limited to the branch shown in FIG. 24 and, in the case where the exclusion factor is calculated to be 0, the processing shown in the present flowchart may be ended, and the common area reliability may be determined to be 0. In addition, in the present embodiment, the description has been given of the example in which, as shown in FIG. 23, the calculation processing of the commonality degree is performed first in the reliability calculation processing, but the present embodiment is not limited thereto, and the determination of whether the feature area corresponds to the unsuitable area may be performed first.

According to the information processing system shown in the present embodiment, the candidate for the feature area is extracted based on a plurality of the learning images, and the feature area is determined based on the common area reliability of each candidate for the feature area, and hence it becomes possible to automatically select (set) the feature area used when the image orientation determination (erectness determination) is performed. With this, it becomes possible to reduce the effort of the user to manually set the feature area, and improve convenience. In addition, the feature area is automatically determined based on the common area reliability (the area common to a plurality of the learning images is automatically learned), whereby, as compared with the case where the user manually selects the feature area, it becomes possible to extract the area which allows the orientation of the image to be determined more accurately (reliably) and is suitable for the orientation determination (orientation correction).

For example, with the automatic selection of the feature area based on the common area reliability, it is possible to prevent the area which is not capable of determining the orientation of the image from being selected as the feature area used in the erectness determination. Examples of the area which is not capable of determining the orientation of the image include (1) an area of which contents change (differ) depending on the form (manuscript) even when the forms are related to the same format, (2) an area in which a feature amount changes depending on the form (manuscript) due to a pattern such as "Copy" or "Confidential" (a part or the entire part thereof) included in the area, so that even manuscripts having the same format (form) are not determined to be manuscripts having the same format, and (3) an area which has a shape which is point-symmetrical with respect to a shape (rotationally symmetrical shape) at a predetermined position in a form having another format at a position which is point-symmetrical with respect to the predetermined position, and thereby causes an erroneous determination of the orientation of the form having another format.

Modification

Hereinbelow, modifications in the present embodiment will be described. The functional configuration of the information processing system 2 (the information processing apparatus 1 and a server 3) according to each of Modifications 1 to 8 is partially different from the information processing system described with reference to FIG. 17 in the present embodiment, and hence the information processing system 2 will be described with reference to FIGS. 25 and 26. Note that components (functional units) which are the same as those described in the first embodiment and the present embodiment are designated by the same reference numerals, and the description thereof will be omitted.

Figure 25:
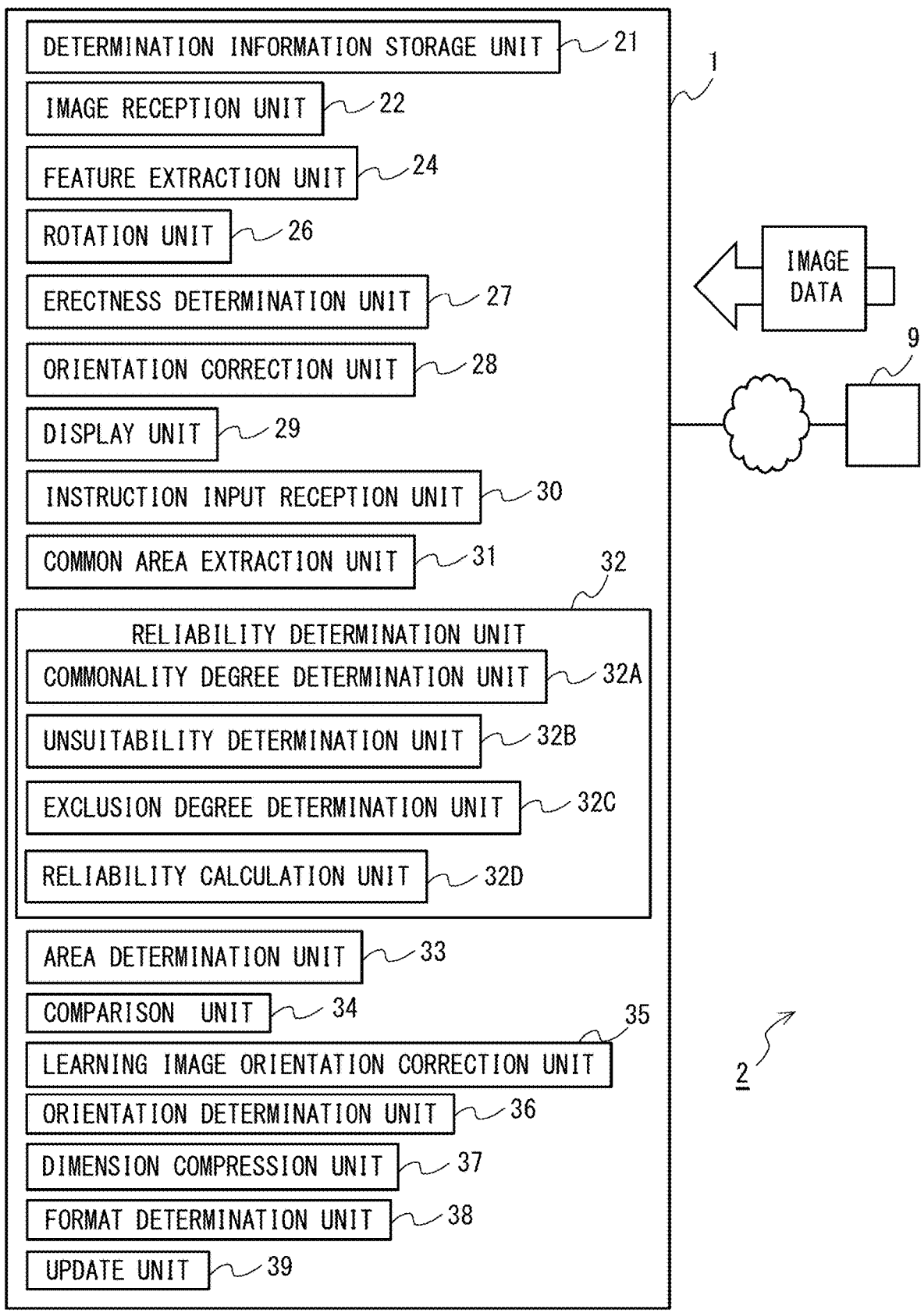
FIG. 25 is a diagram showing the outline of the functional configuration of the information processing apparatus according to each of Modifications 1 to 7 of the embodiment.

FIG. 25 is a diagram showing the outline of the functional configuration of the information processing apparatus according to each of Modifications 1 to 7 of the present embodiment. A program recorded in the storage device 14 is read into the RAM 13 and executed by the CPU 11 and each hardware provided in the information processing apparatus 1 is controlled, and the information processing apparatus 1 thereby functions as the information processing apparatus which includes a comparison unit 34, a learning image orientation correction unit 35, an orientation determination unit 36, a dimension compression unit 37, a format determination unit 38, and an update unit 39 in addition to the determination information storage unit (determination information database) 21, the image reception unit 22, the feature extraction unit 24, the rotation unit 26, the erectness determination unit 27, the orientation correction unit 28, the display unit 29, the instruction input reception unit 30, the common area extraction unit 31, the reliability determination unit 32, and the area determination unit 33.

Modification 1

In the present embodiment, the feature extraction processing and the matching processing are performed between the learning images in the erect state, and hence, with regard to the learning images which are not erect, the orientation of the learning images are corrected to the erectness direction in advance by receiving the rotation instruction by the user for each image. However, the method for correcting the orientation of the learning image to the erectness direction is not limited to the above method. For example, based on one (or a plurality of) erect learning image selected from among a plurality of the learning images, the orientation of another learning image may be automatically corrected to the erectness direction.

Modification 1 shows an example in which, based on one (or a plurality of) erect learning image, the orientation of another learning image is automatically corrected to the erectness direction. The comparison unit 34 performs the pattern matching (template matching) between one (or a plurality of) erect learning image and the other learning image other than the erect learning image to determine the orientation (erectness) of the other learning image. Specifically, the pattern matching between the erect learning image and the other learning image which is rotated by an angle which allows the outer edge shape of the other learning image to agree with the outer edge shape of the erect learning image in the erect state, and the orientation is determined based on a rotation angle when the highest degree of matching is obtained. Subsequently, the learning image orientation correction unit 35 corrects the orientation of the learning image which is determined not to be erect by the comparison unit 34 to the erectness direction.

For example, when the instruction to rotate one learning image which is not erect in the erectness direction is received from the user, the rotation unit 26 corrects the orientation of the learning image which is not erect to the erect orientation. Subsequently, the comparison unit 34 performs the pattern matching between the learning image of which the orientation is corrected to the erect orientation by the rotation unit 26 and the other learning image.

In addition, the rotation unit 26 may correct the orientation of the learning image which is not erect to the erect orientation based on the determination result of the orientation determination unit 36 which automatically determines the orientation of the learning image by performing, e.g., OCR processing on the learning image to determine whether a character is erect. That is, the rotation unit 26 corrects the orientation of the learning image determined not to be erect (another orientation) by the orientation determination unit 36 to the erect orientation. Subsequently, the comparison unit 34 performs the pattern matching between the learning image of which the orientation is corrected to the erect orientation by the rotation unit 26 and the other learning image.

In addition, for example, by receiving a specification of, among a plurality of the learning images, the learning image in the erect state from the user, the pattern matching between the specified learning image and the other learning image may be performed. Subsequently, the learning image orientation correction unit 35 corrects the orientation of the other learning image to the orientation determined by the pattern matching.

With the forgoing arrangement, the orientations of all of the learning images are automatically corrected to the erect orientation, and hence it becomes possible to reduce effort required to set all of the orientations of scanned manuscripts to the same orientation (erect orientation).

Modification 2

In the present embodiment, the features (the feature point and the feature amount) of each learning image are extracted by the feature extraction unit 24. The present modification shows an example in which the dimension of the extracted feature amount is compressed in order to increase the speed of processing required until the feature area is determined.

The dimension compression unit 37 compresses the dimension of the feature amount in each learning image extracted by the feature extraction unit 24. As a method for compressing the dimension of the feature amount, various known methods may be used, and the dimension compression of the feature amount (data) is performed by, e.g., principal component analysis (PCA). Note that, in the present modification, the common area extraction unit 31 performs the matching processing by using the feature amount of which the dimension is compressed by the dimension compression unit 37. With this, it becomes possible to increase the speed of the processing required until the feature area is determined.

Modification 3

In the present embodiment, the bar code is regarded as the rotationally symmetrical area (unsuitable area), and is excluded from the target of the feature area (the exclusion factor is set to 0). However, the present modification shows an example in which, in the case where, in a plurality of the learning images having a predetermined format, bar codes of the same type and substantially the same size are present at similar positions, the bar code is determined to be the feature area.

In the present modification, the area determination unit 33 determines whether one-dimensional codes (bar codes) or two-dimensional codes of the same type and substantially the same size are present at similar positions in a plurality of the learning images having the predetermined format. Subsequently, in the case where the code having the position, type, and size common to a plurality of the learning images having the predetermined format is present, the area of the code is determined to be the feature area by the area determination unit 33. Note that, in the case where it is determined that the code having the position, type, and size common to a plurality of the learning images is present, the area of the code may be determined to be the feature area by the area determination unit 33 irrespective of the value of the common area reliability of the area of the code. In addition, in the case where it is determined that the code having the position, type, and size common to a plurality of the learning images is present, the area of the code may be determined to be the feature area without calculating the common area reliability. Note that examples of the type of the code include, in the case of the one-dimensional code (bar code), the JAN code, EAN, and UPC.

Modification 4

The present modification shows an example in which, similarly to Modification 3, in the case where imprints of the same type and substantially the same size are present at similar positions in a plurality of the learning images having the predetermined format, the imprint is determined to be the feature area.

In the present modification, the area determination unit 33 determines whether imprints of the same type and substantially the same size are present at similar positions in a plurality of the learning images having the predetermined format. Subsequently, in the case where the imprint (seal) having the position, type, and size common to a plurality of the learning images is present, the area of the imprint is determined to be the feature area by the area determination unit 33. Note that, in the case where it is determined that the imprint having the position, type, and size common to a plurality of the learning images is present, the area of the imprint may be determined to be the feature area by the area determination unit 33 irrespective of the value of the common area reliability of the area of the imprint. In addition, in the case where it is determined that the imprint having the position, type, and size common to a plurality of the learning images is present, the area of the imprint may be determined to be the feature area without calculating the common area reliability. Note that examples of the type of the imprint include an imprint of a company (specific company) and an imprint of a registered seal of a specific individual.

Modification 5

In the present embodiment, features are extracted from the learning image which is the gray-scale image. However, the learning image used in feature extraction is not limited to the gray-scale image, and may also be a color image. The present modification shows an example in which feature extraction is performed on the learning images including a color image in each of components constituting color space (RGB (red, green, blue) color space, CMYK (cyan, magenta, yellow, black) color space or the like). In an image converted into a gray scale (e.g., the case where a color manuscript is subjected to monochrome scanning), a weight used when gray scale conversion is performed differs from one color component to another, and hence the feature amount changes (differs) depending on the color of an original manuscript, and there are cases where, even when manuscripts (images) of the same type which have different colors (e.g., a blue manuscript and a red manuscript) are used, it is not possible to extract a common area (features do not match each other) in the case of images converted into the gray scale.

In the present modification, the feature extraction unit 24 performs extraction of the feature point and the feature amount in each of a plurality of the learning images (including the color image) in each component of color space (e.g., color components (red, green, blue)). In addition, the common area extraction unit 31 performs the matching processing between the plurality of learning images between the same components of color space based on the feature point and the feature amount extracted in each component of color space (the matching processing between two learning images based on feature points and feature amounts extracted in the same component of color space in two learning images), and the matching processing between the plurality of learning images between different components of color space from each other based on the feature point and the feature amount extracted in each component of color space (the matching processing between two learning images based on feature points and feature amounts extracted in different components of color space from each other in two learning images). With this, it becomes possible to detect (extract) the common area displayed in color which differs from one learning image to another with high accuracy. For example, even in the case of manuscripts of the same type which have different colors such as the first transport slip and the second transport slip (two slips which have the same format but have different printing (print) colors (a copy for a customer (printed in red) and a copy for a store (printed in blue))), it becomes possible to properly extract an area common to these manuscripts.

Modification 6

As described above with reference to FIG. 22, the determination information registration processing (feature area determination processing) according to the present embodiment is executed at the timing when the new registration button or the like is pressed on the registration screen by the user and the image serving as the learning image is thereby acquired. Note that the registration processing of the feature area (determination information) is not limited to that which is executed at a timing of a manual operation by the user which starts the feature area extraction processing intentionally, and the registration processing may be automatically performed without being noticed by the user. The present modification shows an example in which the feature area (determination information) is automatically registered without being noticed by the user, i.e., without requiring the manual operation for starting the registration processing by the user.

In the present modification, for example, in the case where the user rotates a scanned image in any direction, the scanned image (or the feature of the image) is stored in the storage device 14. Subsequently, when the user rotates another scanned image in any direction, it is determined whether the scanned image and the stored scanned image are images of forms of the same type (the same format). Subsequently, in the case where these images are images having the same format, the determination information registration processing in the present embodiment (FIG. 22) is performed on these images and, when the feature area is found, the registration of the feature area is automatically performed. In the case where the user rotates the scanned image, it is presumed that it is usually intended to rotate the scanned image in the erectness direction, and hence, as described above, in the case where there are a plurality of images rotated by the user, by using these images as learning images, processing of automatically extracting and registering the feature area is started.

In the present modification, the instruction input reception unit 30 receives the instruction to rotate the image from the user, and the rotation unit 26 rotates the image related to the rotation instruction in a direction specified by the instruction. Subsequently, in the case where there are a plurality of images rotated by the rotation unit 26, the format determination unit 38 determines whether these images have the same format (whether the images are images of manuscripts of the same type). Then, the image reception unit 22 receives input of a plurality of the images determined to have the same format as a plurality of the learning images having the predetermined format. Note that the format determination unit 38 determines whether the images have the same format by, e.g., the pattern matching (template matching). With this, it becomes possible to automatically start the registration processing of the feature area, reduce effort required for the manual operation by the user for registering the feature area (determination information), and improve convenience.

Modification 7

While the present embodiment has shown the example in which the feature area is automatically extracted and registered, the present modification shows an example in which a registered feature area is updated. For example, by additionally scanning a manuscript of the same type (a manuscript having the same format) as that of a manuscript (predetermined format) related to a registered feature area, the determination information registration processing is executed again, and the feature area is updated. Note that, instead of additionally scanning the manuscript, a learning image having the same format which is not yet used in the registration of the feature area may be acquired.

In the present modification, the registered feature area is updated by the update unit 39 which updates the feature area (determination information) stored in the storage device (determination information database). Specifically, first, the image reception unit 22 receives input of another learning image (other learning images) having the predetermined format other than a plurality of learning images having the predetermined format which have been used when the feature area is determined. Subsequently, the area determination unit 33 redetermines one or more feature areas used in the erectness determination based on a plurality of the learning images having the predetermined format and another learning image (other learning images) having the predetermined format. Then, the update unit 39 updates the feature area (determination information) stored in the determination information storage unit 21 based on the redetermined feature area.

With this, in the case where only two learning images are present at first and a wrong feature area common only to the two learning images is registered, it becomes possible to modify (change) the feature area, and register an area which is more suitable for the erectness determination as the feature area. Thus, by updating the feature area on an as needed basis, it becomes possible to increase accuracy in image orientation determination (erectness determination).

Modification 8

Figure 26:
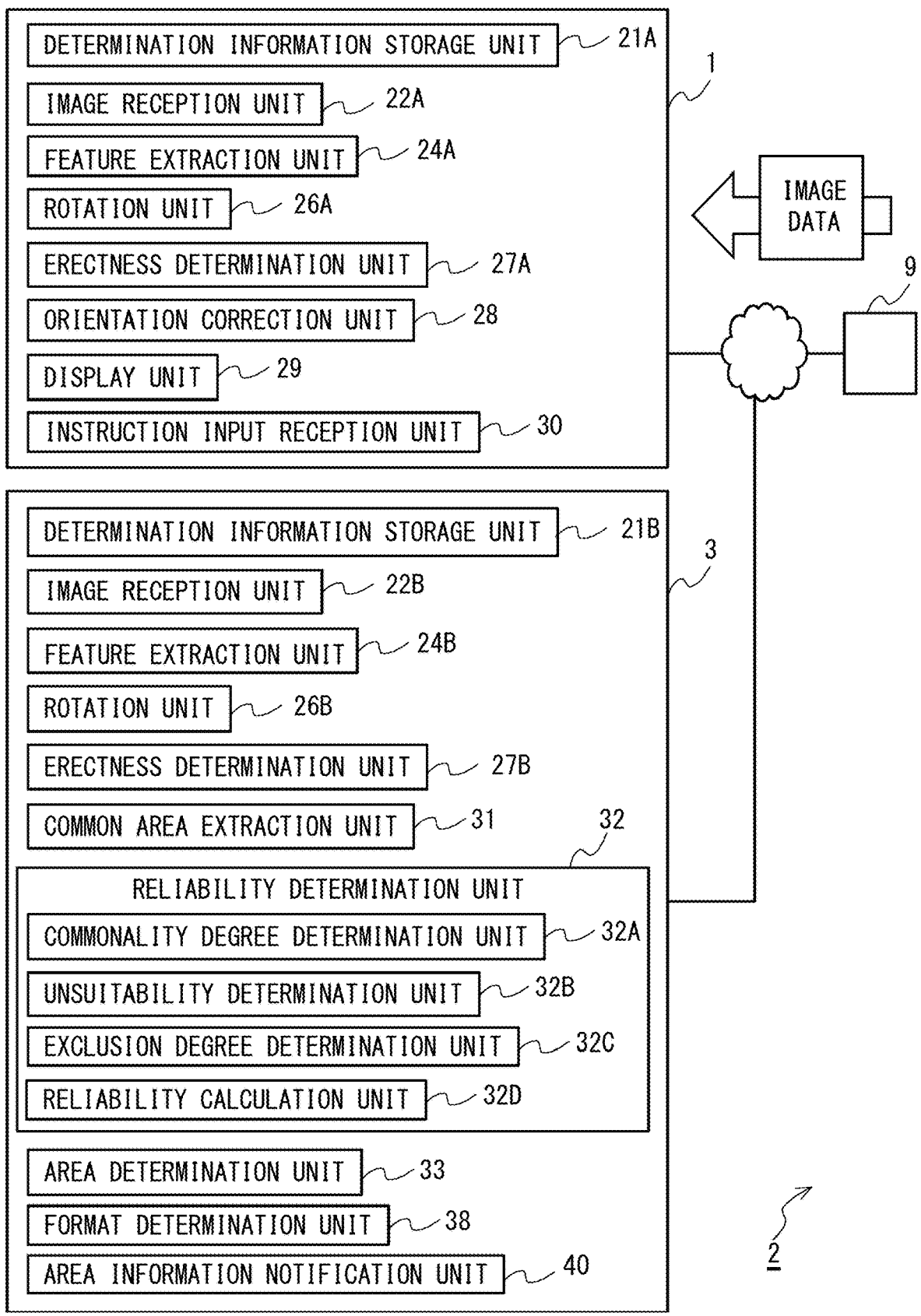
FIG. 26 is a diagram showing the outline of the functional configuration of the information processing system according to Modification 8 of the embodiment.

FIG. 26 is a diagram showing the outline of the functional configuration of the information processing system (the information processing apparatus and the server) according to Modification 8 of the present embodiment. The information processing system 2 includes the information processing apparatus 1 and the server 3. A program recorded in the storage device 14 is read into the RAM 13 and executed by the CPU 11 and each hardware provided in the information processing apparatus 1 is controlled, and the information processing apparatus 1 thereby functions as the information processing apparatus which includes a determination information storage unit (determination information database) 21A, an image reception unit 22A, a feature extraction unit 24A, a rotation unit 26A, an erectness determination unit 27A, the orientation correction unit 28, the display unit 29, and the instruction input reception unit 30.

The server 3 functions as an information processing apparatus which includes a determination information storage unit (determination information database) 21B, an image reception unit 22B, a feature extraction unit 24B, a rotation unit 26B, an erectness determination unit 27B, the common area extraction unit 31, the reliability determination unit 32, the area determination unit 33, the format determination unit 38, and an area information notification unit 40. Note that components (functional units) which are the same as those described in the first embodiment and the present embodiment are designated by the same reference numerals, and the description thereof will be omitted. In addition, the determination information storage unit (determination information database) 21A, the image reception unit 22A, the feature extraction unit 24A, the rotation unit 26A, the erectness determination unit 27A, the determination information storage unit (determination information database) 21B, the image reception unit 22B, the feature extraction unit 24B, the rotation unit 26B, and the erectness determination unit 27B have the same functions as those of the determination information storage unit (determination information database) 21, the image reception unit 22, the feature extraction unit 24, the rotation unit 26, and the erectness determination unit 27 which are described in the first embodiment and the present embodiment, and hence the description thereof will be omitted.

In the present embodiment, the feature area (determination information) is determined and registered in the information processing apparatus 1. However, the feature area (determination information) may also be determined and registered in the server 3 which can be connected to the information processing apparatus 1 via a network. The present modification shows an example in which the feature area (determination information) is determined and registered in the server 3.

In the present modification, the server 3 includes the individual functional units related to the determination information registration processing, and performs the feature area determination processing (determination information registration processing) based on the learning images acquired from the information processing apparatus 1. Further, the server 3 includes the area information notification unit 40 which notifies the information processing apparatus 1 of information (determination information and the like) related to the feature area determined by the area determination unit 33 in the feature area determination processing. Note that the server 3 may determine the feature area by using the learning images acquired from a plurality of the information processing apparatuses 1 and, in this case, the server 3 notifies the plurality of the information processing apparatuses 1 of the information related to the determined feature area. In the information processing apparatus 1 which is notified of the information related to the feature area, the information related to the feature area is reflected (stored) in the determination information database 21A. Note that the server 3 (the format determination unit 38) performs a determination of whether the learning images acquired from the information processing apparatus 1 have the same format, and the feature area is determined based on two or more learning images determined to have the same format by the format determination unit 38.

With this, it becomes possible to collectively manage the feature areas (determination information) of various forms (various predetermined formats) in the server 3. In addition, it becomes possible to use the same feature area (determination information) between the information processing apparatuses, and hence it becomes possible to improve convenience.

In addition, similarly to Modification 6, also in the server 3, the registration processing of the feature area (determination information) may be automatically performed without being noticed by the user. For example, in the case where the user rotates a scanned image in any direction in the information processing apparatus 1, the scanned image (or features in the image) is transmitted (transferred) to the server 3. Subsequently, in the server 3 having received the scanned image, the scanned image is stored as a rotation failure image or the like. The server 3 (the format determination unit 38) determines whether the images stored in the server 3 including the scanned image from another user (another information processing apparatus 1 or the like) have the same format. In the case where these images have the same format, the server 3 performs the determination information registration processing (FIG. 22) in the present embodiment on these images and, when the feature area is found, the server 3 automatically performs the registration of the feature area. Then, the area information notification unit 40 notifies (transfers) each user (the information processing apparatus 1) of the information related to the feature area and, in the information processing apparatus 1 notified of the information related to the feature area, the information related to the feature area is reflected (stored) in the determination information database 21A.

Other Modifications

The feature extraction unit 24 may extract feature points of which the number is suitable for the accuracy and performance of the matching processing by the common area extraction unit 31 by enlarging or reducing the learning image (scanned image). For example, in the case where the number of extracted feature points is extremely large, the number of extracted feature points may be reduced by reducing the image.

In addition, in the present embodiment, the feature extraction unit 24 extracts features from the entire area of each acquired learning image, but the extraction of features is not limited thereto. For example, in the first and second learning images, a common area is detected by extracting features from the entire area of each image and, in the third learning image, feature extraction is performed only in the vicinity of the common area detected in the first and second learning images. Similarly, in the fourth learning image, the feature extraction is performed only in the vicinity of the common area detected in the first, second, and third learning images. With this, it is possible to reduce time required for the feature extraction processing or the matching processing in the case where the number of learning images is large.

Similarly, as a method for narrowing (reducing the number of) the target area(s) of the feature extraction, for example, in the first and second learning images, a common area is extracted by extracting features from the entire area of each image, and the common area reliability of the common area is calculated. Subsequently, in the third and subsequent learning images, the feature extraction may be performed only in the vicinity of, in the common area detected in the first and second learning images, an area having high common area reliability. With this, similarly to the above case, it is possible to reduce time required for the feature extraction processing or the matching processing.

In addition, in the present embodiment, the area determination unit 33 determines one or more feature areas used in the erectness determination from one or more candidates for the feature area based on the common area reliability, but a threshold value of the common area reliability, the number of common areas (feature areas) or the like for determination (decision) of the feature area may be retained. Note that, in this case, the threshold value for the determination of the feature area may be changeable optionally by the user. In addition, the display unit 29 may display a result of change of the threshold value on a preview screen.

In addition, as described above, instead of acquiring the learning images by scanning the manuscripts when the feature area (determination information) is registered, an image(s) which is scanned in advance may be selected as the learning image(s) by the user. Note that the feature amount in the image changes due to an influence of entire image processing at the time of scanning, and hence processing of performing conversion such that a group of scanned images selected by the user (all selected images) has common image quality (resolution, color and/or the like) may be executed.

Further, in the present embodiment, after the matching processing, the feature area candidate extraction processing, and the common area reliability determination processing are executed after the features in the learning image are extracted, the feature area is determined and the determination information is registered. However, during the progress of the above processing, remaining time of the processing may be displayed to the user. For example, the remaining time of the processing may be predicted from the number of feature points extracted by the feature extraction processing, and the remaining time may be displayed to the user. In addition, similarly, during the automatic registration processing of the feature area (determination information), the degree of progress of the processing may be displayed to the user with animation or the like.

In addition, while the present embodiment has shown the example in which the feature area (determination information) of the image having the predetermined format (the manuscript of one type) is registered, the registration of the feature area is not limited thereto. For example, the automatic registration processing of the feature areas of manuscripts of a plurality of types may be performed in parallel simultaneously by collectively scanning the manuscripts of a plurality of formats (the manuscripts of a plurality of types) and causing the user to select (classify) the scanned images according to the type (format) of the manuscript.

Third Embodiment

Next, a third embodiment will be described. In the third embodiment, components which are the same as those described in the first embodiment and the second embodiment are designated by the same reference numerals, and the description thereof will be omitted.

In the present embodiment, a description will be given of the mode of implementation in which the information processing system shown in the first embodiment and the information processing system shown in the second embodiment are combined. Specifically, a description will be given of the mode of implementation in which the method for determining the feature area is changed according to the number of acquired learning images (scanned manuscripts). More specifically, in the case where the number of acquired learning images is more than one, the processing of automatically determining the feature area described in the second embodiment is executed. On the other hand, in the case where the number of acquired learning images is one, the processing in which the user selects the candidate for the feature area extracted by one of the methods which are "Auto", "Semi-auto", and "Manual", and the feature area is thereby determined, which is described in the first embodiment, is executed.

The configuration of the information processing system 2 according to the present embodiment is substantially the same as that described in the first embodiment with reference to FIG. 1, and hence the description thereof will be omitted. Note that the information processing system 2 according to the present embodiment may further include a server (not shown) which can be connected to the information processing apparatus 1 via a network. Hereinbelow, the functional configuration of the information processing apparatus 1 according to the present embodiment will be described.

Figure 27:
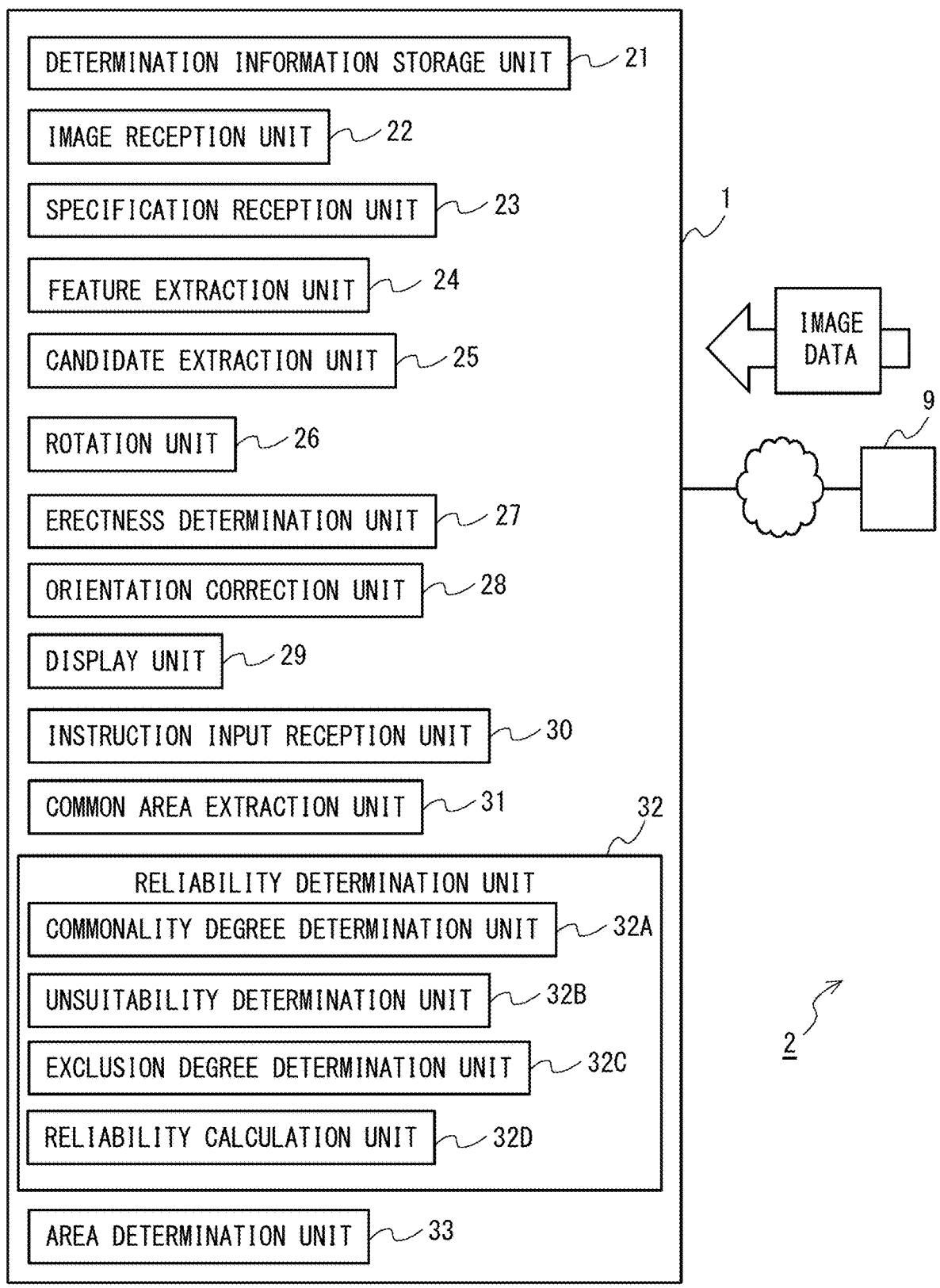
FIG. 27 is a diagram showing the outline of the functional configuration of the information processing apparatus according to the third embodiment.

FIG. 27 is a diagram showing the outline of the functional configuration of the information processing apparatus according to the present embodiment. A program recorded in the storage device 14 is read into the RAM 13 and executed by the CPU 11 and each hardware provided in the information processing apparatus 1 is controlled, and the information processing apparatus 1 thereby functions as the information processing apparatus which includes the determination information storage unit (determination information database) 21, the image reception unit 22, the specification reception unit 23, the feature extraction unit 24, the candidate extraction unit 25, the rotation unit 26, the erectness determination unit 27, the orientation correction unit 28, the display unit 29, the instruction input reception unit 30, the common area extraction unit 31, the reliability determination unit 32, and the area determination unit 33. Note that the reliability determination unit 32 includes the commonality degree determination unit 32A, the unsuitability determination unit 32B, the exclusion degree determination unit 32C, and the reliability calculation unit 32D. Note that functional units provided in the information processing apparatus 1 according to the present embodiment are substantially the same as those described in the first embodiment with reference to FIG. 2 and those described in the second embodiment with reference to FIG. 17, and hence the description thereof will be omitted.

Figure 28:
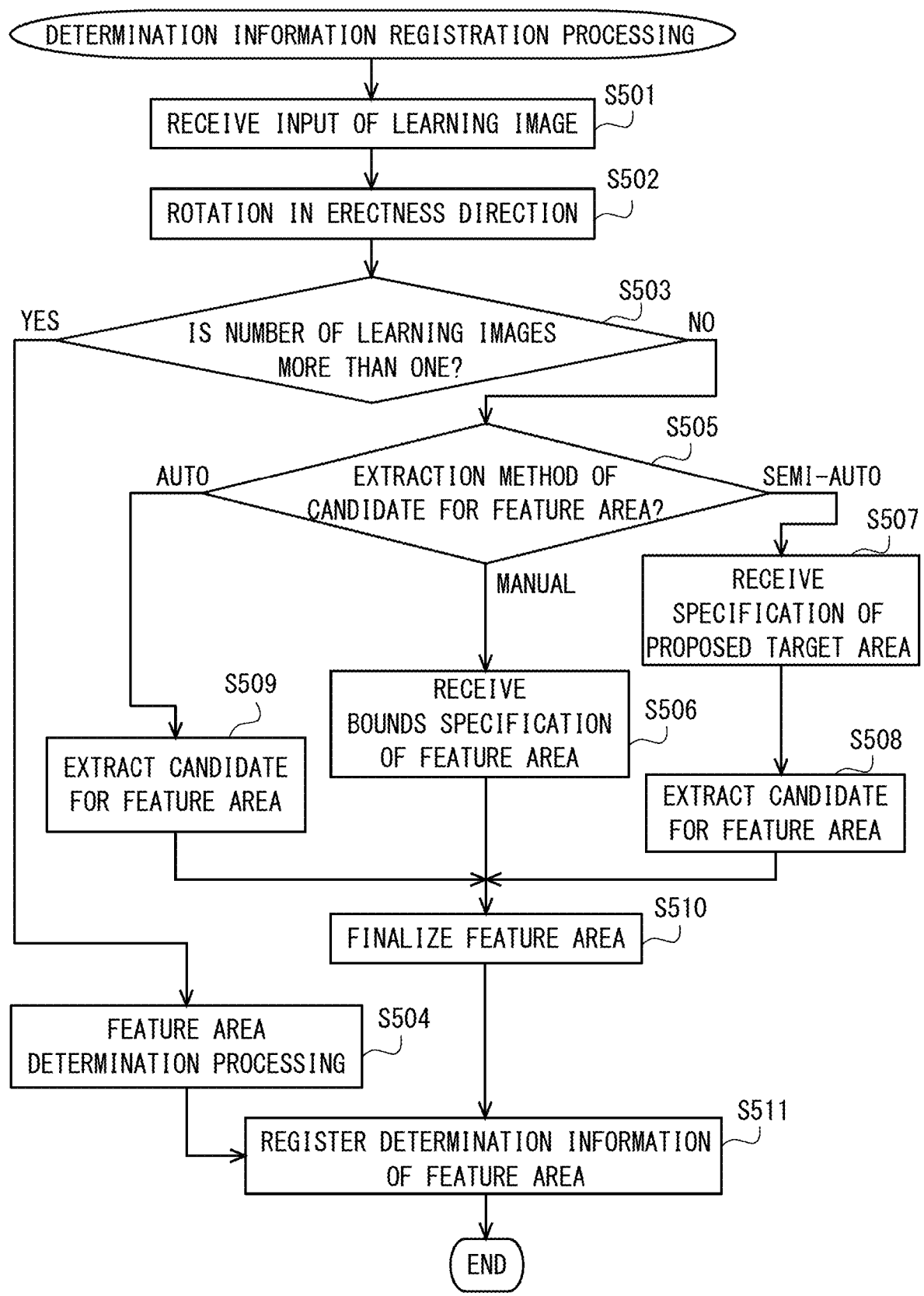
FIG. 28 is a flowchart showing the outline of the flow of the determination information registration processing according to the third embodiment.

FIG. 28 is a flowchart showing the outline of the flow of the determination information registration processing according to the present embodiment. The determination information registration processing according to the present embodiment is executed at a timing when, in the information processing apparatus 1, the new registration button or the like is pressed on the registration screen (not shown) by the user and the instruction to scan a form of which the determination information is to be newly registered is performed.

In Step S501, input of one or more learning images having the predetermined format is received. When scan processing of one or more manuscripts related to the form of which the determination information is to be registered (the form on which the erectness correction is to be performed) is performed in the image acquisition apparatus 9, the image reception unit 22 acquires images of one or more scanned manuscripts from the image acquisition apparatus 9. Note that, instead of acquiring the learning images from the image acquisition apparatus 9, the image reception unit 22 may acquire the learning images which are pre-stored in the storage device 14. Thereafter, the processing proceeds to Step S502.

In Step S502, with an instruction of the user, the learning image is rotated in the erectness direction. In the case where the learning image of which the input is received in Step S501 is not erect, the instruction input reception unit 30 receives the instruction to rotate the learning image in the erectness direction from the user. Subsequently, the rotation unit 26 rotates the learning image related to the rotation instruction in the erectness direction. Note that, in the case where the learning image of which the input is received in Step S501 is in the erect state, the processing in Step S502 does not need to be executed. Thereafter, the processing proceeds to Step S503.

In Step S503, the number of learning images of which the input is received is determined. The CPU 11 determines whether the number of learning images acquired in Step S501 is one or more than one. In the case where the number of learning images is more than one (Step S503: YES), the processing proceeds to Step S504. On the other hand, in the case where the number of learning images is one (Step S503: NO), the processing proceeds to Step S505.

In Step S504, the feature area determination processing is performed. Note that the processing in Step S504 is the same as the processing from Step S303 to Step S307 in FIG. 22, and hence the detailed description thereof will be omitted. Thereafter, the processing proceeds to Step S511.

In Step S505, as the extraction method of the candidate for the feature area, the specification of Auto, Manual, or Semi-auto is received. The user selects one of "Auto", "Manual", and "Semi-auto" on, e.g., the registration screen or the like, and the specification reception unit 23 thereby receives the specification of the extraction method of the candidate for the feature area. In the case where the specification of "Manual" is received, the processing proceeds to Step S506. In the case where the specification of "Semi-auto" is received, the processing proceeds to Step S507. In the case where the specification of "Auto" is received, the processing proceeds to Step S509.

In Step S506, the bounds specification of the feature area by the user is received. Note that the processing in Step S506 is the same as the processing in Step S106 in FIG. 12, and hence the detailed description thereof will be omitted. Thereafter, the processing proceeds to Step S510.

In Step S507, the specification of the proposed target area by the user is received. Note that the processing in Step S507 is the same as the processing in Step S107 in FIG. 12, and hence the detailed description thereof will be omitted. Thereafter, the processing proceeds to Step S508.

In Step S508, the candidate for the feature area is extracted in the proposed target area. Note that the processing in Step S508 is the same as the processing in Step S108 in FIG. 12, and hence the detailed description thereof will be omitted. Thereafter, the processing proceeds to Step S510.

In Step S509, the candidate for the feature area is extracted. Note that the processing in Step S509 is the same as the processing in Step S103 in FIG. 12, and hence the detailed description thereof will be omitted. Thereafter, the processing proceeds to Step S510.

In Step S510, from the area extracted by one of Auto, Manual, and Semi-auto, the feature area used in the orientation correction (erectness determination) is finalized. Note that the processing in Step S510 is the same as the processing in Step S109 in FIG. 12, and hence the detailed description thereof will be omitted. Thereafter, the processing proceeds to Step S511.

In Step S511, the determination information of the determined (finalized) feature area is registered (stored). Note that the processing in Step S511 is the same as the processing in Step S110 in FIG. 12 or the processing in Step S308 in FIG. 22, and hence the detailed description thereof will be omitted. Thereafter, the processing shown in the present flowchart is ended.

Note that, in the present embodiment as well, similarly to the first embodiment and the second embodiment, after the feature area is registered, the erectness determination processing of the determination target image is performed based on the determination information of the feature area. The flow of the erectness determination processing in the present embodiment is substantially the same as that described in the first embodiment with reference to FIGS. 15 and 16, and hence the description thereof will be omitted.

Fourth Embodiment

Next, a fourth embodiment will be described. In the fourth embodiment, components which are the same as those described in the first embodiment, the second embodiment, and the third embodiment are designated by the same reference numerals, and the description thereof will be omitted.

In the present embodiment, a description will be given of the mode of implementation in which the information processing system shown in the first embodiment and the information processing system shown in the second embodiment are combined. Specifically, a description will be given of the mode of implementation in which the method for determining the feature area is changed according to the extraction method of the candidate for the feature area selected by the user. More specifically, in the case where automatic extraction (determination) of the candidate for the future are (the feature area) is selected by the user, the processing of automatically determining the feature area which is described in the second embodiment is executed. On the other hand, in the case where extraction of the candidate for the feature area by "Semi-auto" or "Manual" is selected by the user, the processing in which the candidate for the feature area extracted by "Semi-auto" or "Manual" described in the first embodiment is selected by the user and the feature area is thereby determined is executed.

The configuration of the information processing system 2 according to the present embodiment is substantially the same as that described in the first embodiment with reference to FIG. 1, and hence the description thereof will be omitted. Note that the information processing system 2 according to the present embodiment may further include a server (not shown) which can be connected to the information processing apparatus 1 via a network. In addition, the functional configuration of the information processing apparatus 1 according to the present embodiment is substantially the same as that described in the third embodiment with reference to FIG. 27, and hence the description thereof will be omitted.

Figure 29:
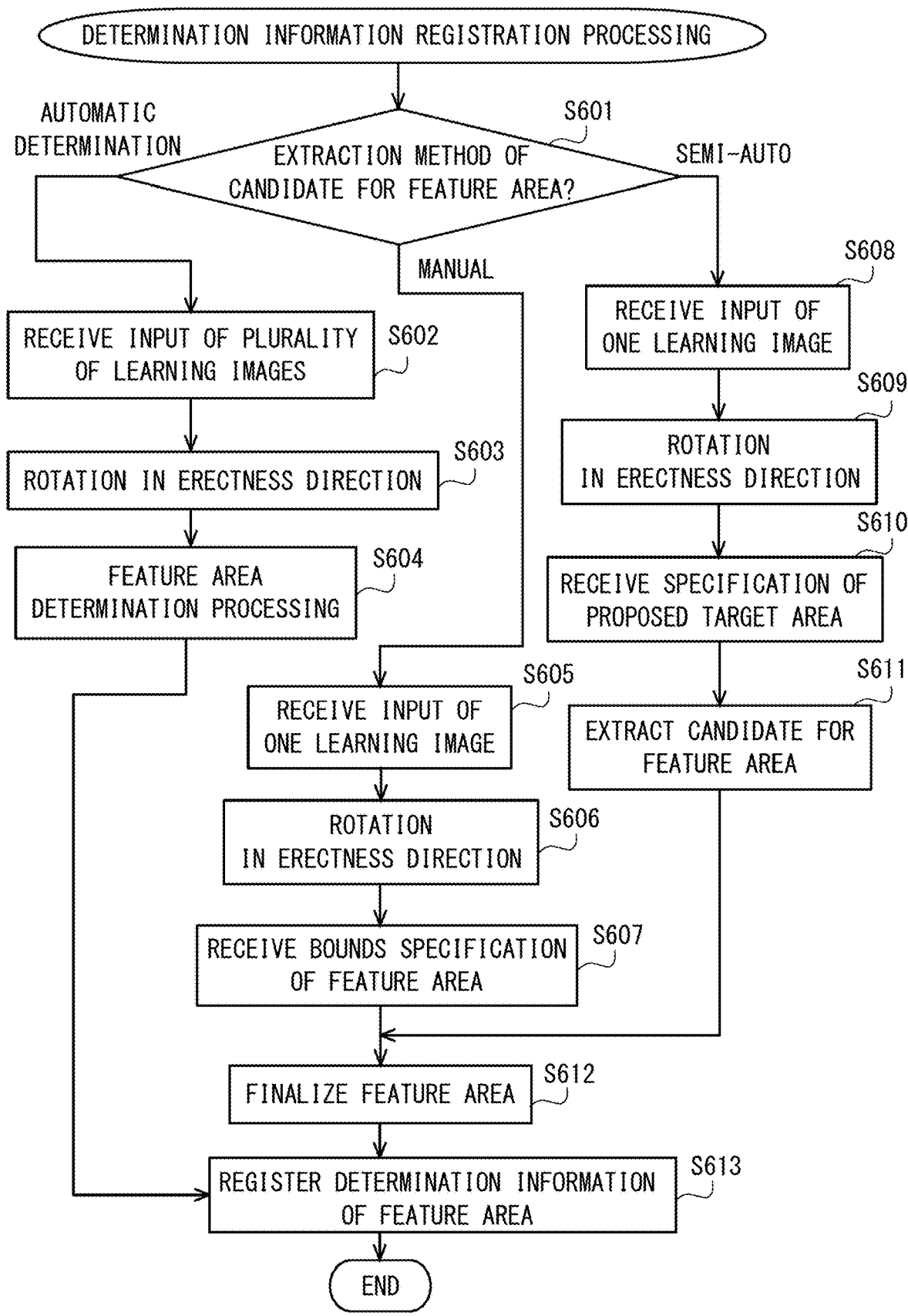
FIG. 29 is a flowchart showing the outline of the flow of the determination information registration processing according to the fourth embodiment.

FIG. 29 is a flowchart showing the outline of the flow of the determination information registration processing according to the present embodiment. The determination information registration processing according to the present embodiment is executed at a timing when the extraction method of the candidate for the feature area is selected on the registration screen (not shown) by the user in the information processing apparatus 1.

In Step S601, as the extraction (determination) method of the candidate for the feature area, the specification of Automatic Determination, Manual, or Semi-auto is received. For example, the user selects one of "Auto", "Manual", and "Semi-auto" on the registration screen or the like, and the specification reception unit 23 thereby receives the specification of the extraction method of the candidate for the feature area. In the case where the specification of "Auto (automatic determination)" is received, the processing proceeds to Step S602. In the case where the specification of "Manual" is received, the processing proceeds to Step S605. In the case where the specification of "Semi-auto" is received, the processing proceeds to Step S608.

In Step S602 to Step S604, input of a plurality of the learning images having the predetermined format is received, and the feature area determination processing is performed after the image which is not erect is rotated in the erectness direction. Note that the processing from Step S602 to Step S604 is the same as the processing from Step S301 to Step S307 in FIG. 22, and hence the detailed description thereof will be omitted. Thereafter, the processing proceeds to Step S613.

In Step S605 to Step S606, input of one learning image having the predetermined format is received, and the image which is not erect is rotated in the erectness direction. Note that the processing from Step S605 to Step S606 is the same as the processing from Step S101 to Step S102 in FIG. 12, and hence the detailed description thereof will be omitted. Thereafter, the processing proceeds to Step S607.

In Step S607, the bounds specification of the feature area by the user is received. Note that the processing in Step S607 is the same as the processing in Step S106 in FIG. 12, and hence the detailed description thereof will be omitted. Thereafter, the processing proceeds to Step S612.

In Step S608 to Step S609, input of one learning image having the predetermined format is received, and the image which is not erect is rotated in the erectness direction. Note that the processing from Step S608 to Step S609 is the same as the processing from Step S101 to Step S102 in FIG. 12, and hence the detailed description thereof will be omitted. Thereafter, the processing proceeds to Step S610.

In Step S610 to Step S611, the specification of the proposed target area by the user is received, and the candidate for the feature area is extracted in the proposed target area. Note that the processing from Step S610 to Step S611 is the same as the processing from Step S107 to Step S108 in FIG. 12, and hence the detailed description thereof will be omitted. Thereafter, the processing proceeds to Step S612.

In Step S612, from the area extracted by Manual or Semi-auto, the feature area used in the orientation correction is finalized. Note that the processing in Step S612 is the same as the processing in Step S109 in FIG. 12, and hence the detailed description thereof will be omitted. Thereafter, the processing proceeds to Step S613.

In Step S613, the determination information of the determined (finalized) feature area is registered (stored). Note that the processing in Step S613 is the same as the processing in Step S110 in FIG. 12 or the processing in Step S308 in FIG. 22, and hence the detailed description thereof will be omitted. Thereafter, the processing shown in the present flowchart is ended.

Note that, in the present embodiment as well, similarly to the first to third embodiments, after the feature area is registered, the erectness determination processing of the determination target image is performed based on the determination information of the feature area. The flow of the erectness determination processing in the present embodiment is substantially the same as that described in the first embodiment with reference to FIGS. 15 and 16, and hence the description thereof will be omitted.

The invention claimed is:

1. An information processing system determining a partial area used in an erectness determination which determines whether an input determination target image is erect based on a determination feature in the partial area in an image having a predetermined format and a position of the partial area in a state in which the image having the predetermined format is erect, the information processing system comprising a processor to:
    receive input of a plurality of learning images having the predetermined format;
    extract one or more areas common to the plurality of learning images in an erect state as one or more candidates for the partial area, each of which is a candidate for the partial area used in the erectness determination;
    determine, after extracting the one or more candidates for the partial area that are the one or more areas common to the plurality of learning images, for each of the one or more candidates for the partial area, a commonality degree indicative of a degree of a possibility that the candidate for the partial area is an area which a plurality of images that have the predetermined format and are different from each other have in common at substantially the same position;
    determine, after extracting the one or more candidates for the partial area that are the one or more areas common to the plurality of learning images, for each of the one or more candidates for the partial area, whether the candidate for the partial area corresponds to an unsuitable area which is an area unsuitable for the erectness determination;
    determine, for each of the one or more candidates for the partial area, an exclusion degree indicative of a degree of exclusion of the candidate for the partial area from a target of the partial area used in the erectness determination according to a result of determining whether the candidate for the partial area corresponds to the unsuitable area;
    calculate, for each of one or more candidates for the partial area, common area reliability indicative of a degree to which the candidate for the partial area is suitable as the partial area used in the erectness determination, based on the commonality degree and the exclusion degree that are determined as to the candidate for the partial area; and
    determine one or more partial areas used in the erectness determination from the one or more candidates for the partial area, based on the common area reliability,
    wherein the exclusion degree is set such that the common area reliability of the candidate for the partial area is reduced in a case where the candidate for the partial area is the unsuitable area; and
    the processor calculates, for each of the one or more candidates for the partial area, the common area reliability using a calculation method that adds, subtracts, or multiplies the exclusion degree that is determined as to the candidate for the partial area to the commonality degree that is determined as to the candidate for the partial area.

2. The information processing system according to claim 1, wherein the unsuitable area is at least one of an area which possibly is not capable of being detected, an area which may cause erroneous recognition in which an orientation of an image is erroneously recognized as another orientation, and/or an area of an object having a rotationally symmetrical shape.

3. The information processing system according to claim 2, wherein the area which possibly is not capable of being detected is an area which does not match at least one of the plurality of learning images in the erect state.

4. The information processing system according to claim 2, wherein the area which may cause erroneous recognition in which the orientation of the image is erroneously recognized is an area which erroneously matches at least one of the plurality of learning images which are not in the erect state.

5. The information processing system according to claim 1, wherein the processor determines the commonality degree of the candidate for the partial area, based on an attribute of the candidate for the partial area.

6. The information processing system according to claim 5, wherein the attribute is information on at least one of a degree of matching between the plurality of learning images in an area related to the candidate for the partial area, a size of the area related to the candidate for the partial area, a position of the area related to the candidate for the partial area, and/or a possibility of change of a character string in the area related to the candidate for the partial area.

7. The information processing system according to claim 6, wherein the degree of matching between the plurality of learning images in the area related to the candidate for the partial area includes information on at least one of the number of matching feature points in the area related to the candidate for the partial area and/or a matching degree of each of the matching feature points, wherein the matching feature points are the feature points included in a learning image in the plurality of learning images and match feature points included in another learning image in the plurality of learning images.

8. The information processing system according to claim 6, wherein
    the processor extracts the candidate for the partial area, based on an area common to two learning images selected from the plurality of learning images in the erect state, and wherein
    the area related to the candidate for the partial area is an area of the candidate for the partial area or the area common to the two learning images which serves as a base for the candidate for the partial area.

9. The information processing system according to claim 1, wherein
the processor further extracts a feature point and a feature amount for each of the plurality of learning images, and wherein the processor:
determines one or more combinations of two learning images from the plurality of learning images;
performs matching processing between the two learning images on each of the combinations, based on the extracted feature point and the extracted feature amount;
extracts an area including one or more matching feature points as a per-combination candidate for the partial area, for each of the combinations, wherein the matching feature points are the feature points included in a learning image in the two learning images and match the feature points included in another learning image in the two learning images as a result of the matching processing; and
extracts the candidate for the partial area, based on the per-combination candidate for the partial area of each of the combinations.

10. The information processing system according to claim 9, wherein the processor performs clustering on the matching feature points to thereby detect an area in which the matching feature points are densely positioned, and extracts the per-combination candidate for the partial area, based on the area in which the matching feature points are densely positioned.

11. The information processing system according to claim 1, wherein the processor further:
receives a rotation instruction of an image from a user;
rotates the image relating to the rotation instruction; and
determines, in a case where there are a plurality of the images rotated based on the rotation instruction, whether the plurality of the rotated images have the same format, and wherein
the processor receives input of the plurality of the images determined to have the same format as the plurality of learning images having the predetermined format.

12. The information processing system according to claim 1, wherein the processor further provides notification of information on the determined partial area.

13. The information processing system according to claim 9, wherein
the processor further compresses a dimension of the extracted feature amount, and wherein
the processor performs the matching processing by using the feature amount of which the dimension is compressed.

14. The information processing system according to claim 1, wherein
in a case where one-dimensional codes or two-dimensional codes of the same type and substantially the same size are present at similar positions in the plurality of learning images having the predetermined format, the processor determines an area related to the one-dimensional codes or the two-dimensional codes to be the partial area.

15. The information processing system according to claim 1, wherein
in a case where imprints of the same type and substantially the same size are present at similar positions in the plurality of learning images having the predetermined format, the processor determines an area related to the imprints to be the partial area.

16. The information processing system according to claim 9, wherein
the processor:
performs extraction of the feature point and the feature amount in each of the plurality of learning images in each component of color space, and
performs the matching processing between the two learning images based on feature points and feature amounts extracted in the same component of the color space in the two learning images, and the matching processing between the two learning images based on feature points and feature amounts extracted in different components of the color space from each other in the two learning images.

17. The information processing system according to claim 1, further comprising a memory, wherein
the memory stores information on the determined partial area used in the erectness determination, and wherein
the processor receives input of another learning image having the predetermined format other than the plurality of learning images having the predetermined format, and
the processor redetermines one or more partial areas used in the erectness determination, based on the plurality of learning images having the predetermined format and the another learning image having the predetermined format, and wherein
the processor further
updates the stored information, based on the one or more partial areas determined based on the plurality of learning images and the another learning image.

18. An area determination method for causing a computer, which determines a partial area used in an erectness determination which determines whether an input determination target image is erect based on a determination feature in the partial area in an image having a predetermined format and a position of the partial area in a state in which the image having the predetermined format is erect, to execute:
receiving input of a plurality of learning images having the predetermined format;
extracting one or more areas common to the plurality of learning images in an erect state as one or more candidates for the partial area, each of which is a candidate for the partial area used in the erectness determination;
determining, after extracting the one or more candidates for the partial area that are the one or more areas common to the plurality of learning images, for each of the one or more candidates for the partial area, a commonality degree indicative of a degree of a possibility that the candidate for the partial area is an area which a plurality of images that have the predetermined format and are different from each other have in common at substantially the same position;
determining, after extracting the one or more candidates for the partial area that are the one or more areas common to the plurality of learning images, for each of the one or more candidates for the partial area, whether the candidate for the partial area corresponds to an unsuitable area which is an area unsuitable for the erectness determination;
determining, for each of the one or more candidates for the partial area, an exclusion degree indicative of a degree of exclusion of the candidate for the partial area from a target of the partial area used in the erectness determination according to a result of determining whether the candidate for the partial area corresponds to the unsuitable area;

calculating, for each of one or more candidates for the partial area, common area reliability indicative of a degree to which the candidate for the partial area is suitable as the partial area used in the erectness determination, based on the commonality degree and the exclusion degree that are determined as to the candidate for the partial area; and determining one or more partial areas used in the erectness determination from the one or more candidates for the partial area, based on the common area reliability, wherein the exclusion degree is set such that the common area reliability of the candidate for the partial area is reduced in a case where the candidate for the partial area is the unsuitable area; and the computer calculates, for each of the one or more candidates for the partial area, the common area reliability using a calculation method that adds, subtracts, or multiplies the exclusion degree that is determined as to the candidate for the partial area to the commonality degree that is determined as to the candidate for the partial area.

19. A non-transitory computer-readable recording medium on which is recorded a program for causing a computer, which determines a partial area used in an erectness determination which determines whether an input determination target image is erect based on a determination feature in the partial area in an image having a predetermined format and a position of the partial area in a state in which the image having the predetermined format is erect, to execute a process comprising:

receiving input of a plurality of learning images having the predetermined format;

extracting one or more areas common to the plurality of learning images in an erect state as one or more candidates for the partial area, each of which is a candidate for the partial area used in the erectness determination;

determining, after extracting the one or more candidates for the partial area that are the one or more areas common to the plurality of learning images, for each of the one or more candidates for the partial area, a commonality degree indicative of a degree of a possibility that the candidate for the partial area is an area which a plurality of images that have the predetermined format and are different from each other have in common at substantially the same position;

determining, after extracting the one or more candidates for the partial area that are the one or more areas common to the plurality of learning images, for each of the one or more candidates for the partial area, whether the candidate for the partial area corresponds to an unsuitable area which is an area unsuitable for the erectness determination;

determining, for each of the one or more candidates for the partial area, an exclusion degree indicative of a degree of exclusion of the candidate for the partial area from a target of the partial area used in the erectness determination according to a result of determining whether the candidate for the partial area corresponds to the unsuitable area;

calculating, for each of one or more candidates for the partial area, common area reliability indicative of a degree to which the candidate for the partial area is suitable as the partial area used in the erectness determination, based on the commonality degree and the exclusion degree that are determined as to the candidate for the partial area; and determining one or more partial areas used in the erectness determination from the one or more candidates for the partial area, based on the common area reliability, wherein the exclusion degree is set such that the common area reliability of the candidate for the partial area is reduced in a case where the candidate for the partial area is the unsuitable area; and the processor calculates, for each of the one or more candidates for the partial area, the common area reliability using a calculation method that adds, subtracts, or multiplies the exclusion degree that is determined as to the candidate for the partial area to the commonality degree that is determined as to the candidate for the partial area.

* * * * *